(12) United States Patent
Actis

(10) Patent No.: US 10,631,465 B2
(45) Date of Patent: Apr. 28, 2020

(54) BAGGING ASSEMBLY

(71) Applicant: H.W.J. Designs for Agribusiness, Inc., Clovis, CA (US)

(72) Inventor: Bradley P. Actis, Clovis, CA (US)

(73) Assignee: H.W.J. Designs for Agribusiness, Inc., Clovis, CA (US)

( * ) Notice: Subject to any disclaimer, the term of this patent is extended or adjusted under 35 U.S.C. 154(b) by 0 days.

(21) Appl. No.: 16/653,220

(22) Filed: Oct. 15, 2019

(65) Prior Publication Data

US 2020/0037508 A1 Feb. 6, 2020

Related U.S. Application Data

(63) Continuation of application No. 15/240,808, filed on Aug. 18, 2016, which is a continuation of application
(Continued)

(51) Int. Cl.
| | |
|---|---|
| *B65B 63/00* | (2006.01) |
| *B65B 25/02* | (2006.01) |
| *A01F 25/14* | (2006.01) |
| *B65B 43/18* | (2006.01) |
| *B65B 43/46* | (2006.01) |
| *B65B 63/02* | (2006.01) |
| *B65B 5/04* | (2006.01) |
| *B65B 7/08* | (2006.01) |

(Continued)

(52) U.S. Cl.
CPC .............. *A01F 25/14* (2013.01); *B65B 5/045* (2013.01); *B65B 7/08* (2013.01); *B65B 35/10* (2013.01); *B65B 43/18* (2013.01); *B65B 43/465* (2013.01); *B65B 63/02* (2013.01); *B65B 65/00* (2013.01)

(58) Field of Classification Search
CPC ................. B65B 63/02; B65B 5/08; B65B 5/045; B65B 63/00
USPC ........................................... 53/235, 255, 563
See application file for complete search history.

(56) References Cited

U.S. PATENT DOCUMENTS

| | | |
|---|---|---|
| 557,088 A | 3/1896 | Swenson |
| 584,659 A | 6/1897 | Appel |
| (Continued) | | |

FOREIGN PATENT DOCUMENTS

| | | |
|---|---|---|
| AU | 465800 B2 | 6/1974 |
| AU | 6489286 A | 5/1987 |
| (Continued) | | |

OTHER PUBLICATIONS

Non-Final Office Action dated Apr. 5, 2019 from co-pending U.S. Appl. No. 15/240,808.
(Continued)

*Primary Examiner* — Gloria R Weeks
(74) *Attorney, Agent, or Firm* — Klein, O'Neill & Singh, LLP

(57) ABSTRACT

A bagging assembly for bagging bales of fibrous material is disclosed. The bagging assembly incorporates a chute defining a channel for receiving a bale, which is pushed there between by a stuffing assembly. Aspects of the bagging assembly include raising a bale using a bale elevator to a higher elevation position so that the bale could be stuffed by the stuffing assembly and using a bag retrieving mechanism for retrieving a bag from a bag location for use in bagging the bale.

30 Claims, 45 Drawing Sheets

Related U.S. Application Data

No. 13/842,908, filed on Mar. 15, 2013, now Pat. No. 9,463,885, which is a continuation of application No. 12/397,138, filed on Mar. 3, 2009, now Pat. No. 8,490,367.

(60) Provisional application No. 61/033,376, filed on Mar. 3, 2008, provisional application No. 61/118,330, filed on Nov. 26, 2008, provisional application No. 61/118,175, filed on Nov. 26, 2008.

(51) Int. Cl.
  *B65B 35/10* (2006.01)
  *B65B 65/00* (2006.01)

(56) References Cited

U.S. PATENT DOCUMENTS

| | | | |
|---|---|---|---|
| 983,492 | A | 2/1911 | Harriss |
| 1,922,046 | A * | 8/1933 | Hubbard ............... B65D 85/07 100/299 |
| 2,131,502 | A | 9/1938 | Elliot |
| 2,173,071 | A | 9/1939 | Gaus et al. |
| 2,346,220 | A * | 4/1944 | Kienzle ................ G01N 1/04 73/864.44 |
| 2,631,629 | A | 3/1953 | Lee |
| 2,834,212 | A | 5/1958 | Wollner |
| 2,866,504 | A | 12/1958 | Syers |
| 2,950,589 | A | 8/1960 | Litchard |
| 3,034,358 | A * | 5/1962 | Young ................. G01N 1/04 73/864.41 |
| 3,064,482 | A | 11/1962 | Wollner |
| 3,146,654 | A * | 9/1964 | Mathews ............ G01N 1/04 83/368 |
| 3,206,913 | A | 9/1965 | Fleigher et al. |
| 3,287,882 | A | 11/1966 | Smith |
| 3,347,102 | A | 10/1967 | Phillips |
| 3,382,643 | A * | 5/1968 | Hullhorst ............ B65B 63/028 53/434 |
| 3,464,298 | A | 9/1969 | Roach |
| 3,492,781 | A | 2/1970 | Ray |
| 3,524,782 | A | 8/1970 | Buske |
| 3,720,158 | A | 3/1973 | Sauer et al. |
| 3,777,908 | A | 12/1973 | Keller |
| 3,795,084 | A | 3/1974 | Richardson et al. |
| 3,830,038 | A | 8/1974 | Propst |
| 3,868,807 | A | 3/1975 | Noyes et al. |
| 3,869,065 | A | 3/1975 | Wang |
| 3,903,677 | A | 9/1975 | Bowman et al. |
| 3,948,021 | A | 4/1976 | Buck et al. |
| 3,973,683 | A | 8/1976 | Keller |
| 3,994,116 | A | 11/1976 | McCormick |
| 4,002,115 | A | 1/1977 | Nanoia |
| 4,023,330 | A | 5/1977 | Williams |
| 4,078,358 | A | 3/1978 | Henderson |
| 4,300,327 | A | 11/1981 | Bridger |
| 4,320,615 | A | 3/1982 | Gmiir |
| 4,356,784 | A | 11/1982 | Waters et al. |
| 4,363,585 | A | 12/1982 | Keller et al. |
| 4,370,845 | A | 2/1983 | Perolls et al. |
| 4,391,153 | A * | 7/1983 | Taylor ................. G01N 1/04 73/864.41 |
| 4,541,227 | A | 9/1985 | Coad et al. |
| 4,561,238 | A | 12/1985 | Odom |
| 4,566,378 | A | 1/1986 | Fleissner |
| 4,590,747 | A | 5/1986 | Schjeldahl |
| 4,644,735 | A | 2/1987 | Savigny |
| 4,704,845 | A | 11/1987 | Bruno |
| 4,823,686 | A | 4/1989 | Fleissner |
| 4,827,776 | A * | 5/1989 | Gale ................. G01N 1/08 408/208 |
| 4,939,891 | A | 7/1990 | Podini |
| 4,966,286 | A | 10/1990 | Muckenfuhs |
| 5,003,754 | A | 4/1991 | Stirling |
| 5,033,754 | A | 7/1991 | Finch |
| 5,048,266 | A | 9/1991 | Wieckowicz |
| 5,088,271 | A | 2/1992 | Westaway |
| 5,117,614 | A | 6/1992 | Johnsen |
| 5,127,212 | A | 7/1992 | Johnsen et al. |
| 5,141,005 | A | 8/1992 | Henderson et al. |
| 5,178,020 | A | 1/1993 | Elam et al. |
| 5,201,166 | A | 4/1993 | Johnsen |
| 5,302,266 | A | 4/1994 | Grabarz et al. |
| 5,369,935 | A | 12/1994 | Lang et al. |
| 5,371,938 | A | 12/1994 | Martin |
| 5,392,591 | A | 2/1995 | Simpson |
| 5,398,558 | A | 3/1995 | Wise et al. |
| 5,442,898 | A | 8/1995 | Gabree et al. |
| 5,479,766 | A | 1/1996 | Ransom |
| 5,489,028 | A * | 2/1996 | Binder ................ D01B 3/025 209/587 |
| 5,495,707 | A | 3/1996 | Lauzon |
| 5,511,364 | A | 4/1996 | Levi et al. |
| 5,628,168 | A | 5/1997 | Inman |
| 5,829,233 | A | 11/1998 | Stirling |
| 6,148,587 | A | 11/2000 | McDonald et al. |
| 6,332,711 | B1 | 12/2001 | Inuzuka et al. |
| 6,386,026 | B1 | 5/2002 | Zamfes |
| 6,394,727 | B1 | 5/2002 | Lundberg |
| 6,421,984 | B1 | 7/2002 | Murgatroyd et al. |
| 6,487,833 | B1 | 12/2002 | Jaenson et al. |
| 6,497,008 | B1 * | 12/2002 | Schlepfer ............ D01G 7/10 19/145.5 |
| 6,557,695 | B2 | 5/2003 | Gerber et al. |
| 6,662,532 | B1 | 12/2003 | Droog et al. |
| 6,672,038 | B2 | 1/2004 | McGrane et al. |
| 6,880,310 | B2 | 4/2005 | Main et al. |
| 6,895,726 | B2 | 5/2005 | Pinto et al. |
| 6,955,029 | B2 | 10/2005 | Palumbo |
| 6,976,350 | B2 | 12/2005 | Greening et al. |
| 7,013,625 | B2 | 3/2006 | Curles |
| 7,093,978 | B2 | 8/2006 | Tan |
| 7,134,256 | B2 | 11/2006 | Kujubu et al. |
| 7,428,865 | B1 | 9/2008 | Kasel et al. |
| 7,549,275 | B2 | 6/2009 | Monti |
| 7,603,833 | B2 | 10/2009 | Koke |
| 7,690,297 | B1 * | 4/2010 | Sagen ................. B30B 9/3003 100/19 R |
| 7,788,887 | B2 | 9/2010 | Baenninger |
| 7,841,272 | B2 | 11/2010 | Actis et al. |
| 7,886,904 | B1 | 2/2011 | Evans |
| 7,891,156 | B2 | 2/2011 | Beer |
| 7,958,699 | B2 | 6/2011 | Honegger |
| 7,987,651 | B2 | 8/2011 | Beeland et al. |
| 8,336,404 | B2 | 12/2012 | Actis |
| 8,490,367 | B2 | 7/2013 | Actis |
| 8,556,066 | B2 | 10/2013 | Honegger |
| 8,615,974 | B2 | 12/2013 | Suzuki et al. |
| 8,746,087 | B2 | 6/2014 | Actis |
| 9,027,278 | B2 | 5/2015 | Deppermann et al. |
| 9,038,355 | B2 | 5/2015 | Honegger |
| 9,061,779 | B2 | 6/2015 | Elliott et al. |
| 9,193,490 | B2 | 11/2015 | Actis |
| 9,387,949 | B2 | 6/2016 | Honegger |
| 9,463,885 | B2 | 10/2016 | Actis |
| 9,566,544 | B2 | 2/2017 | Iwasaki et al. |
| 9,599,544 | B2 * | 3/2017 | Hart ............... G01N 1/04 |
| 9,617,021 | B2 * | 4/2017 | McCorkle ............ B65B 5/045 |
| 9,725,199 | B2 | 8/2017 | Actis |
| 2003/0205033 | A1 | 11/2003 | Schmucker |
| 2004/0055250 | A1 | 3/2004 | Main et al. |
| 2004/0190796 | A1 | 9/2004 | Main et al. |
| 2004/0216431 | A1 | 11/2004 | Curles |
| 2005/0022467 | A1 | 2/2005 | Kujubu et al. |
| 2005/0031229 | A1 | 2/2005 | Tang |
| 2006/0059868 | A1 | 3/2006 | Melville |
| 2006/0096253 | A1 | 5/2006 | Cullen |
| 2006/0196150 | A1 | 9/2006 | Van De Sande |
| 2007/0017187 | A1 | 1/2007 | Chikatani |
| 2007/0201753 | A1 | 8/2007 | Curles et al. |
| 2009/0188332 | A1 | 7/2009 | Actis |
| 2009/0229226 | A1 | 9/2009 | Beeland et al. |
| 2010/0126118 | A1 | 5/2010 | Actis |

(56) References Cited

U.S. PATENT DOCUMENTS

| | | | |
|---|---|---|---|
| 2011/0072767 A1 | 3/2011 | Suzuki et al. | |
| 2011/0209439 A1 | 9/2011 | Actis | |
| 2013/0291485 A1 | 11/2013 | McCorkle et al. | |
| 2014/0096623 A1* | 4/2014 | Mansfield | G01N 1/04 73/863.21 |
| 2014/0360135 A1 | 12/2014 | Honegger | |
| 2016/0278295 A1 | 9/2016 | Johnson | |
| 2016/0303815 A1* | 10/2016 | Lininger | A01F 25/14 |
| 2018/0332773 A1 | 11/2018 | Roberts | |

FOREIGN PATENT DOCUMENTS

| | | |
|---|---|---|
| CA | 2113780 A1 | 8/1994 |
| CN | 2518101 | 10/2002 |
| CN | 2859503 Y | 1/2007 |
| JP | 64-020410 U | 2/1989 |
| KR | 20-0355927 Y1 | 7/2004 |
| WO | WO 2004/006642 A2 | 1/2004 |
| WO | WO 2005/051812 A1 | 6/2005 |
| WO | WO 2008/043912 | 4/2008 |
| WO | WO 2013/142842 | 9/2013 |

OTHER PUBLICATIONS

English Translation of the Office Action on corresponding foreign application (BR Application No. PI09102833) from the Brazilian Patent Office dated Oct. 23, 2018.

English Translation of the Office Action on corresponding foreign application (BR Application No. PI 0910283-3) from the Brazilian Patent Office dated May 14, 2019.

International Search Report completed and dated Oct. 13, 2009 from related PCT Application No. PCT/US2009/035914, filed Mar. 3, 2009 (5 pages).

Written Opinion completed and dated Oct. 13, 2009 from related PCT Application No. PCT/US2009/035914, filed Mar. 3, 2009 (5 pages).

Office Action dated Dec. 17, 2010 from corresponding U.S. Appl. No. 12/397,138.

Final Office Action dated May 24, 2011 from corresponding U.S. Appl. No. 12/397,138.

Office Action dated Dec. 16, 2011 from corresponding U.S. Appl. No. 12/397,138.

Final Office Action dated May 16, 2012 from corresponding U.S. Appl. No. 12/397,138.

Office Action dated Dec. 18, 2012 from corresponding U.S. Appl. No. 12/397,138.

Notice of Allowance dated Jul. 12, 2016 from corresponding U.S. Appl. No. 13/842,908.

Office Action dated Dec. 18, 2015 from corresponding U.S. Appl. No. 13/842,908.

U.S. Appl. No. 60/972,954 to Beeland.

W.S. Anthony and W.D. Mayfield, "Abstract", Cotton Ginners Handbook, Dec. 1994, U.S. Department of Agriculture, Agricultural Handbook 503.

"A Guide for Cotton Bale Standards," The National Cotton Council of America, Jul. 2001 revision, Memphis, TN, https://www.cotton.org/tech/bale/upload/guide-cotton-bale-standards.pdf.

AB40 AutoBagger brochure, Lummus Corporation, Savannah, Georgia, USA, 2006.

"2007 Specifications for Cotton Bale Packaging Materials", Joint Cotton Industry Bale Packaging Committee, May 2007.

United States District Court for the Eastern District of California, Defendant L.P. Brown Company, Inc.'s Responses to Second Set of Interrogatories, Civil Action No. 1:17-cv-00272-AWI-SKO, Jul. 17, 2017.

United States District Court Eastern District of California, Defendant Rethceif Enterprises LLC's Responses to Plaintiff H.W.J.'s Second Set of Interrogatories (Nos. 10-13), Case No. 1:17-CV-0272-AWI-SKO, Jul. 17, 2017.

(Part 1 of 2) Andreas Wolf et al., Grippers in Motion—The Fascination of Automated Handling Tasks, 2005, 167 pages, Springer, Italy.

(Part 2 of 2) Andreas Wolf et al., Grippers in Motion—The Fascination of Automated Handling Tasks, 2005, 81 pages, Springer, Italy.

CTC Design Inc AB-40 Auto Bagger, 2 pages, http://ctcdesigninc.com/product/autobagger-automated-bale-handling-system/, https://www.youtube.com/watch?v=a4jfeKJRgFA&feature=youtu.be, https://www.youtube.com/watch?v=e6T0u5VJB3Y&feature=youtu.be.

Demonstrations of the Louden Barn Hay Carrier—Maasdam Barns in Fairfield, Iowa, YouTube, 3 pages, https://www.youtube.com/watch?v=UE8rHwD9eQ0.

Deposition of Brad Actis; Superior Court of the State of California for the County of Fresno; *H.W.J. Designs for Agribusiness, Inc. and Samuel Son & Co. (USA) Inc.* vs. *Rethceif Enterprises, LLC* aka *Rethceif Packaging, and L.P. Brown Company, Inc.*, dba *International Fiber Packing*; No. 1:17-CV-0272-AWI-SKO; vol. 1; 54 pages; Nov. 19, 2019.

Deposition of Brad Actis; Superior Court of the State of California for the County of Fresno; *H.W.J. Designs for Agribusiness, Inc. and Samuel Son & Co. (USA) Inc.* vs. *Rethceif Enterprises, LLC* aka *Rethceif Packaging, and L.P. Brown Company, Inc.*, dba *International Fiber Packing*; No. 1:17-CV-0272-AWI-SKO; vol. 2; 32 pages; Nov. 20, 2019.

Lummus Corporation, "Bale Handling Systems: Dollies, Conveyors, & Baggers", Savannah, Georgia, 2004, 1 page.

Louden Machinery Company, Wikipedia, 3 pages, https://en.wikipedia.org/wiki/Louden_Machinery_Company.

Manual Sampling and Bagging of Bale, 1 page, https://www.youtube.com/watch?v=1XXr7dNQKR0&feature=youtu.be.

Tecnomeccanica Biellese—Bale Plucker, 2 pages, http://tbsrl.it/en/portfolio_page/bale-plucker/.

* cited by examiner

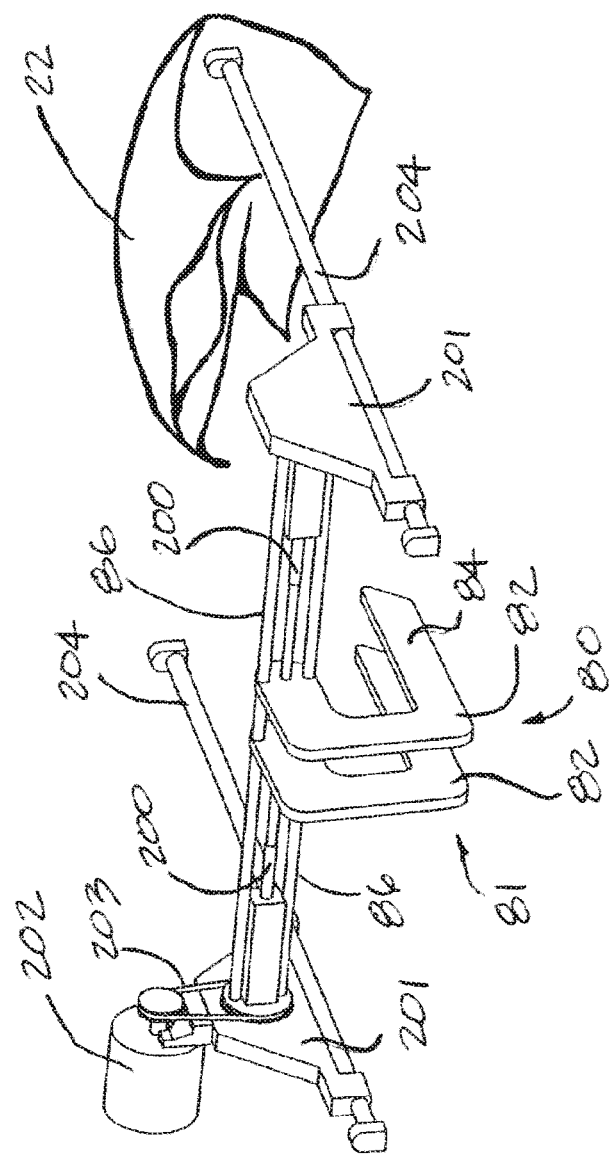

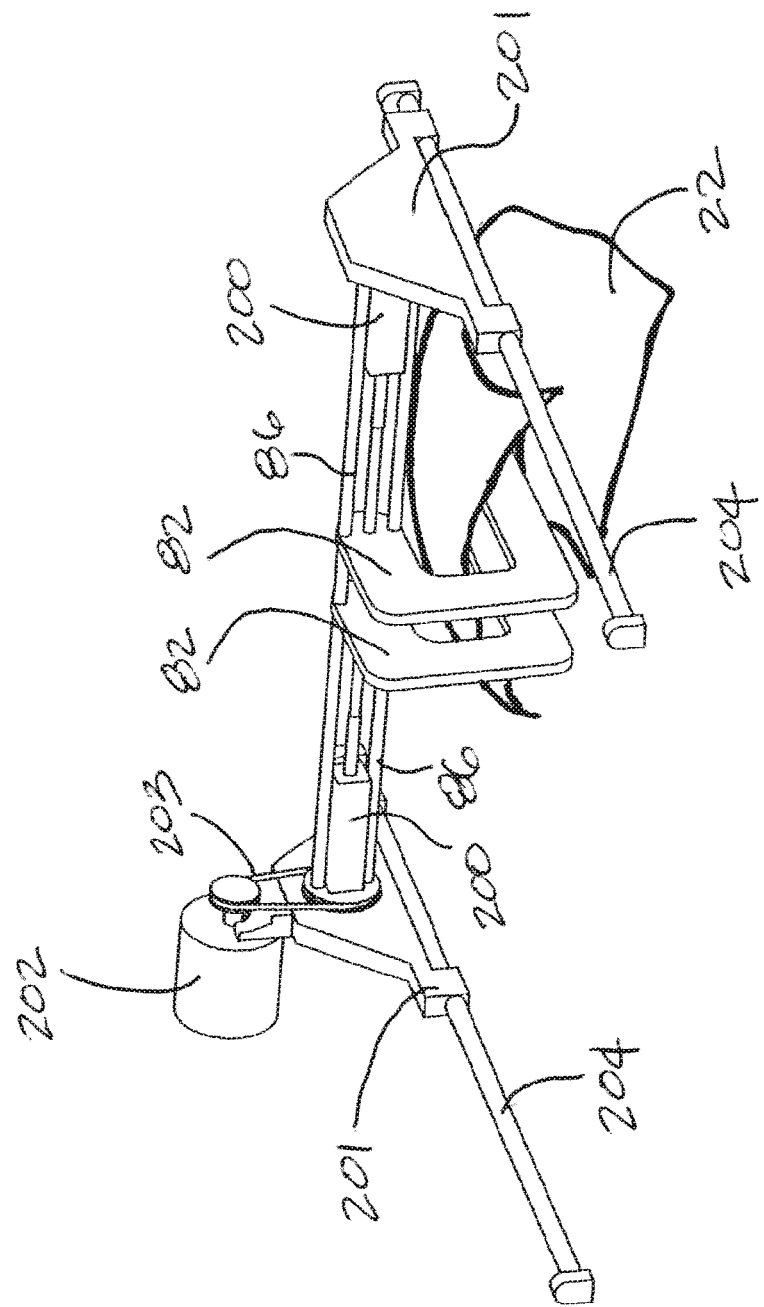

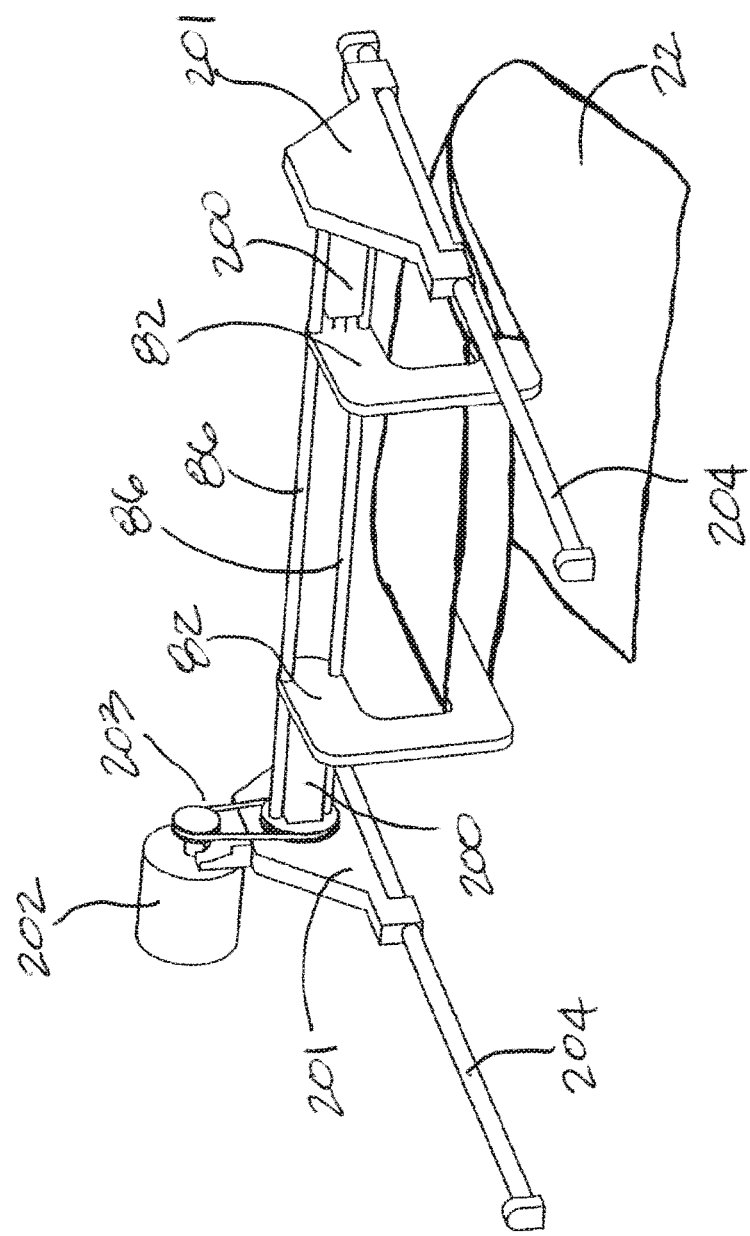

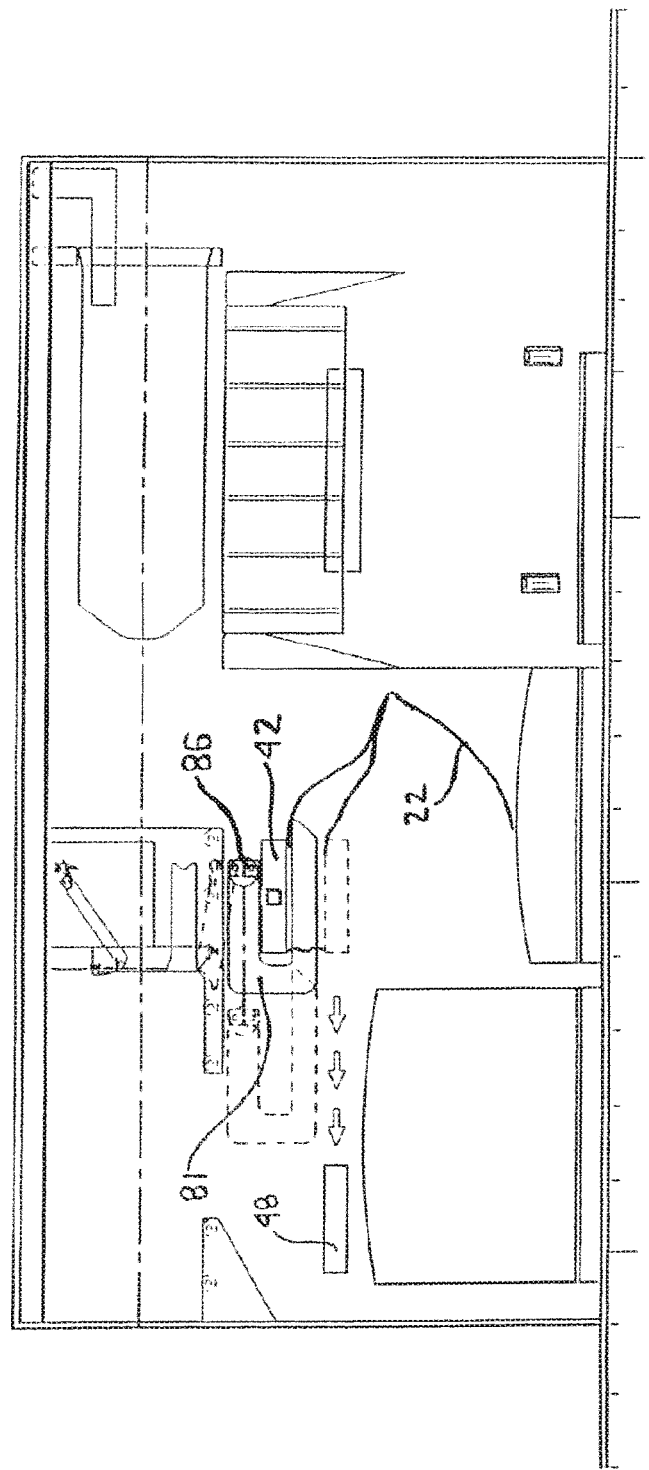

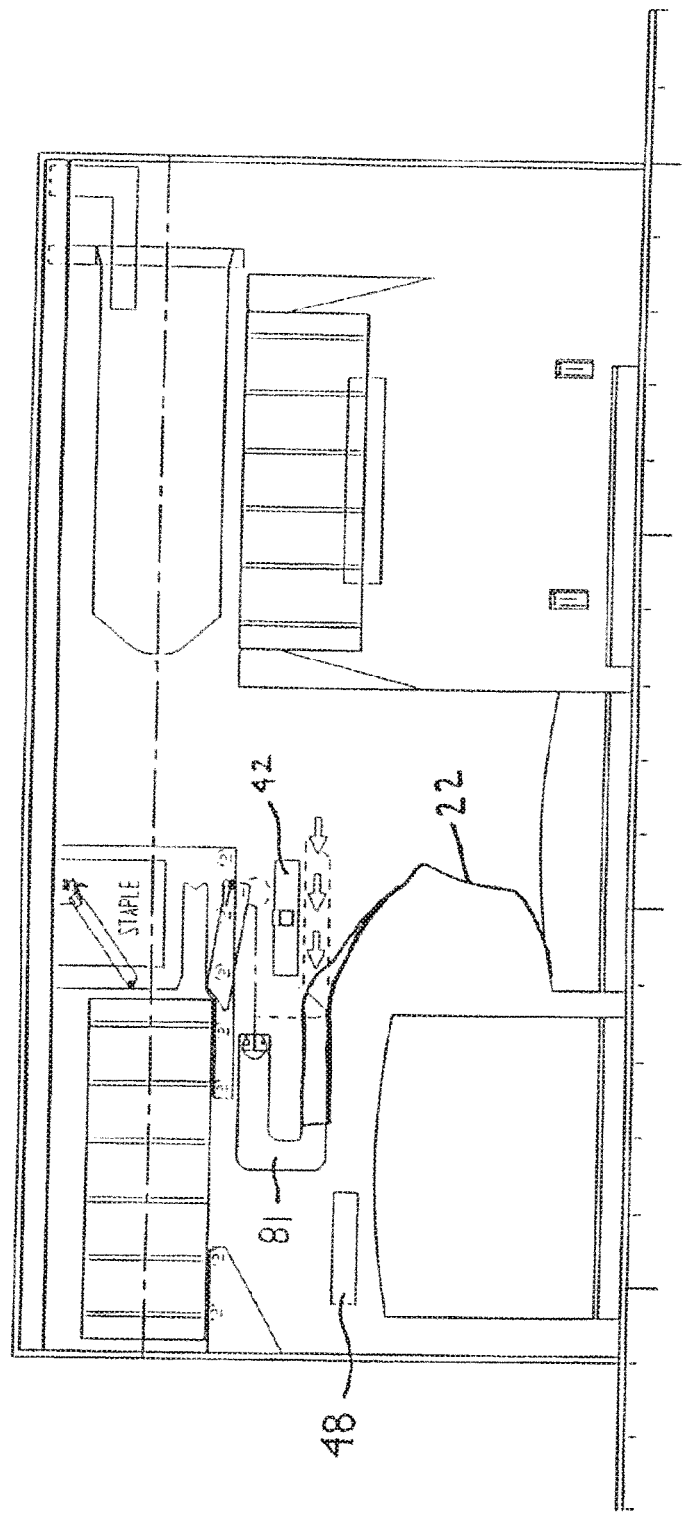

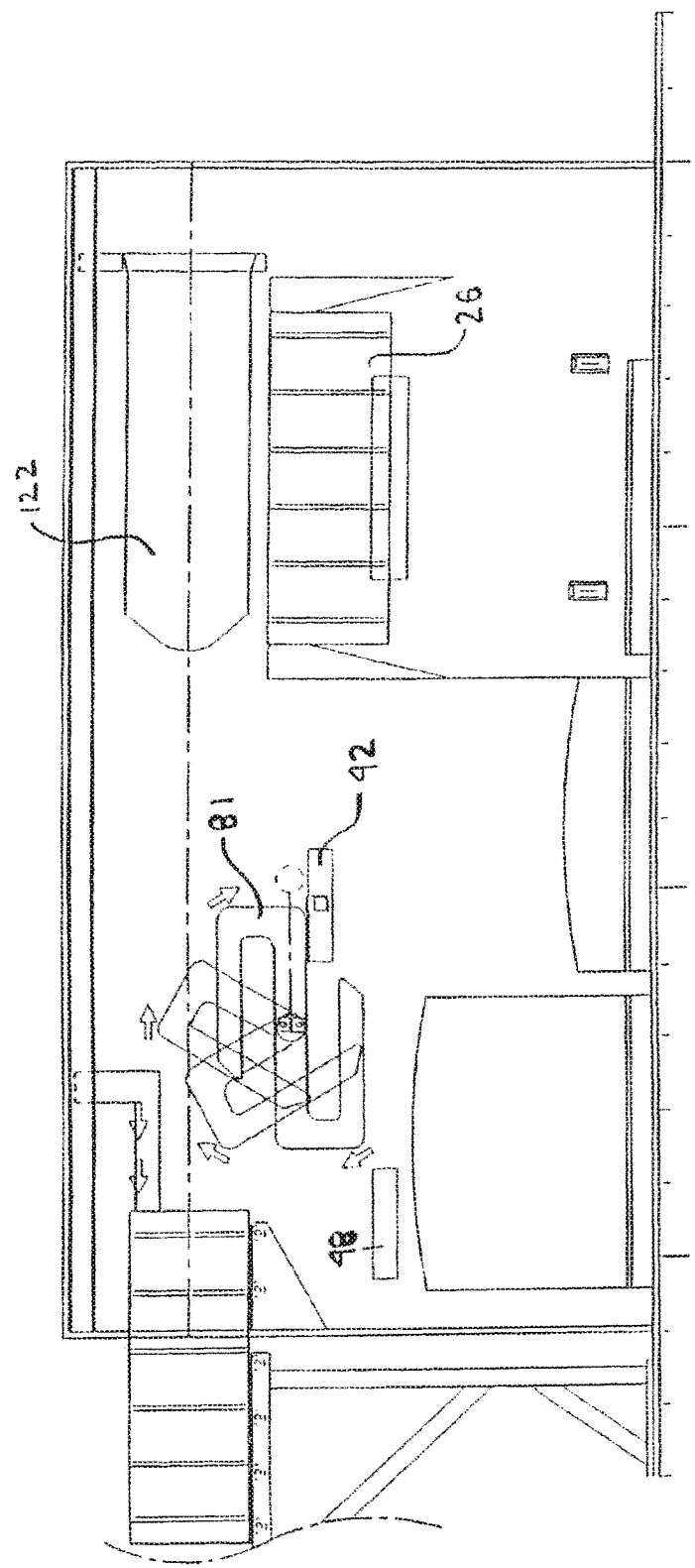

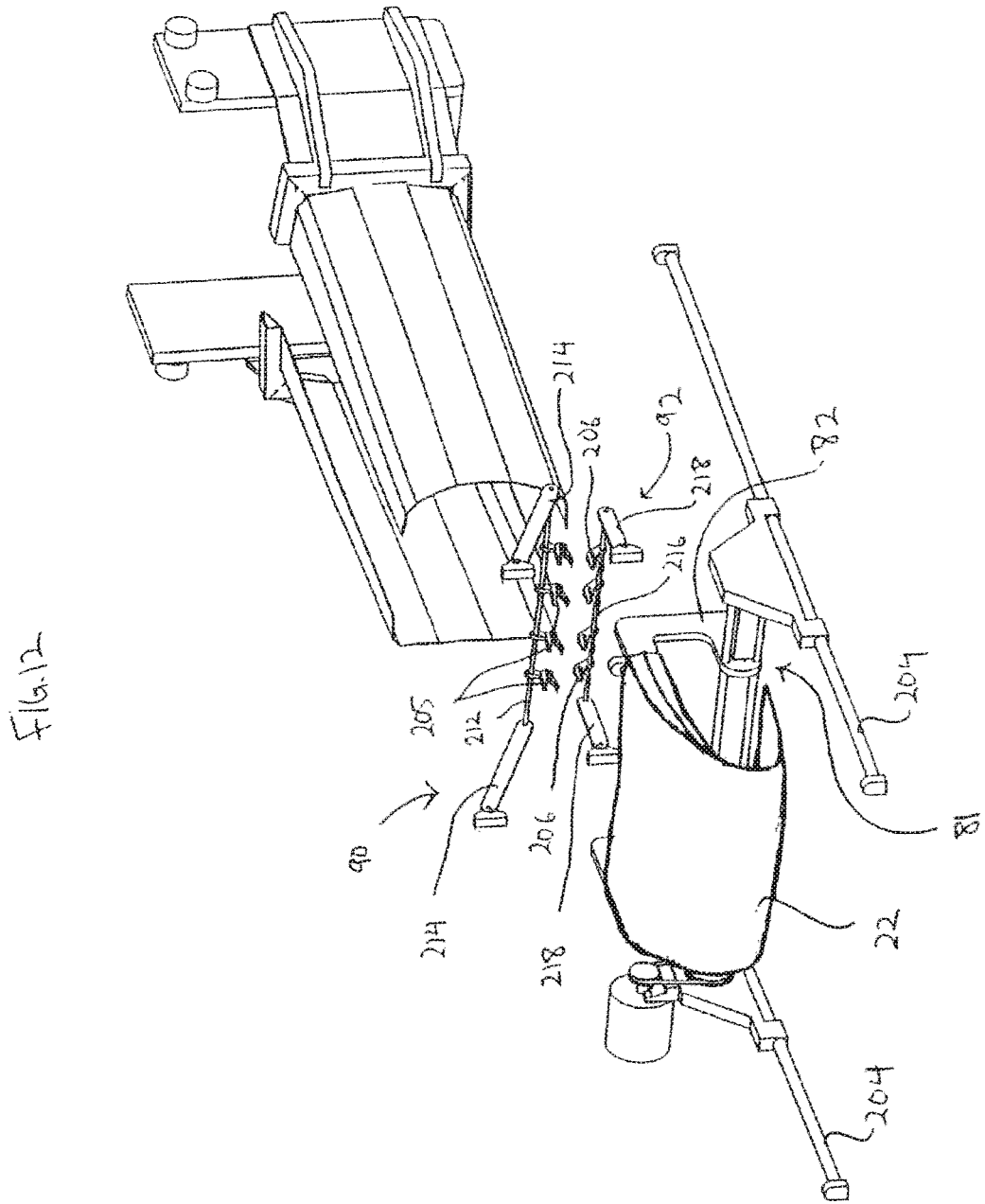

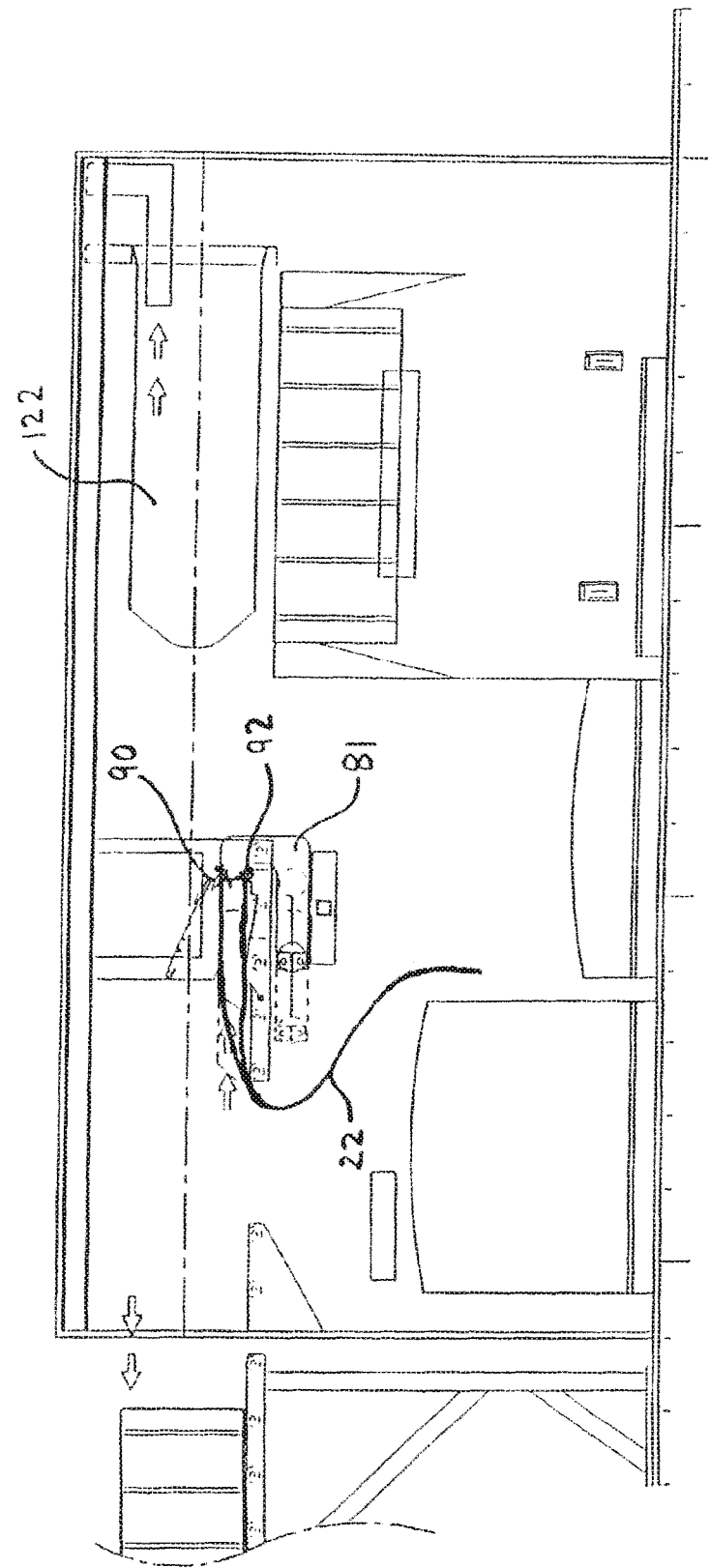

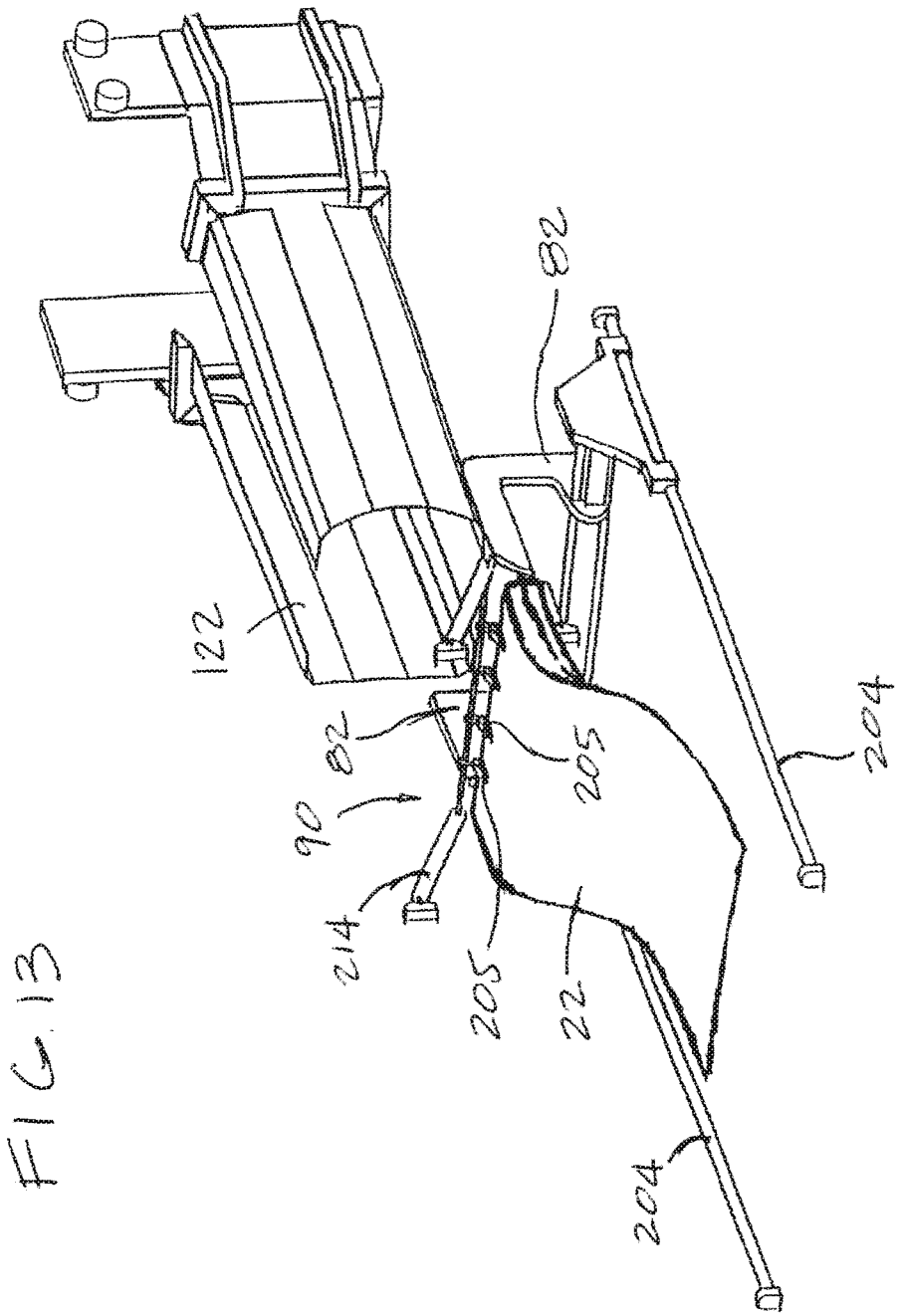

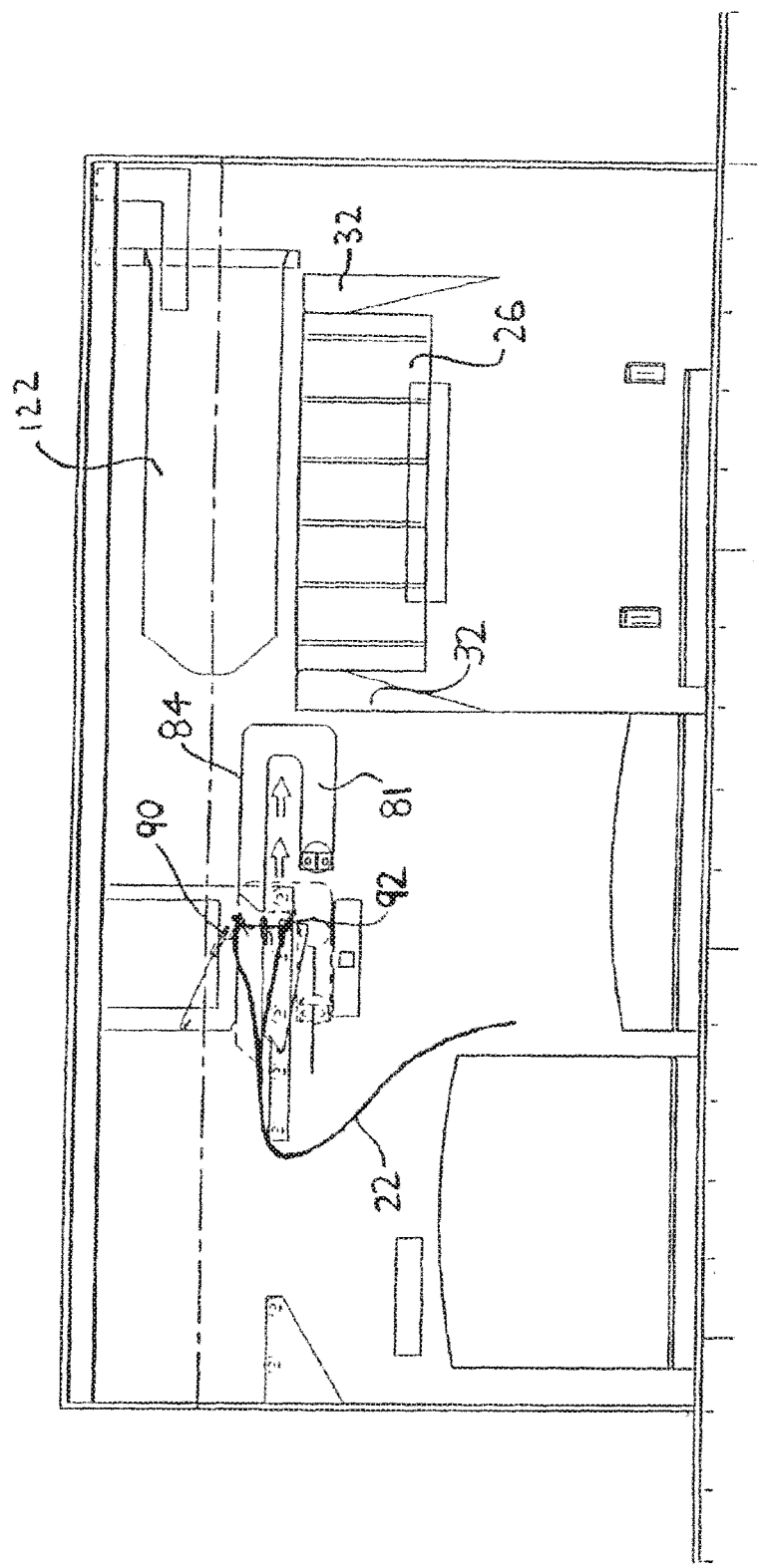

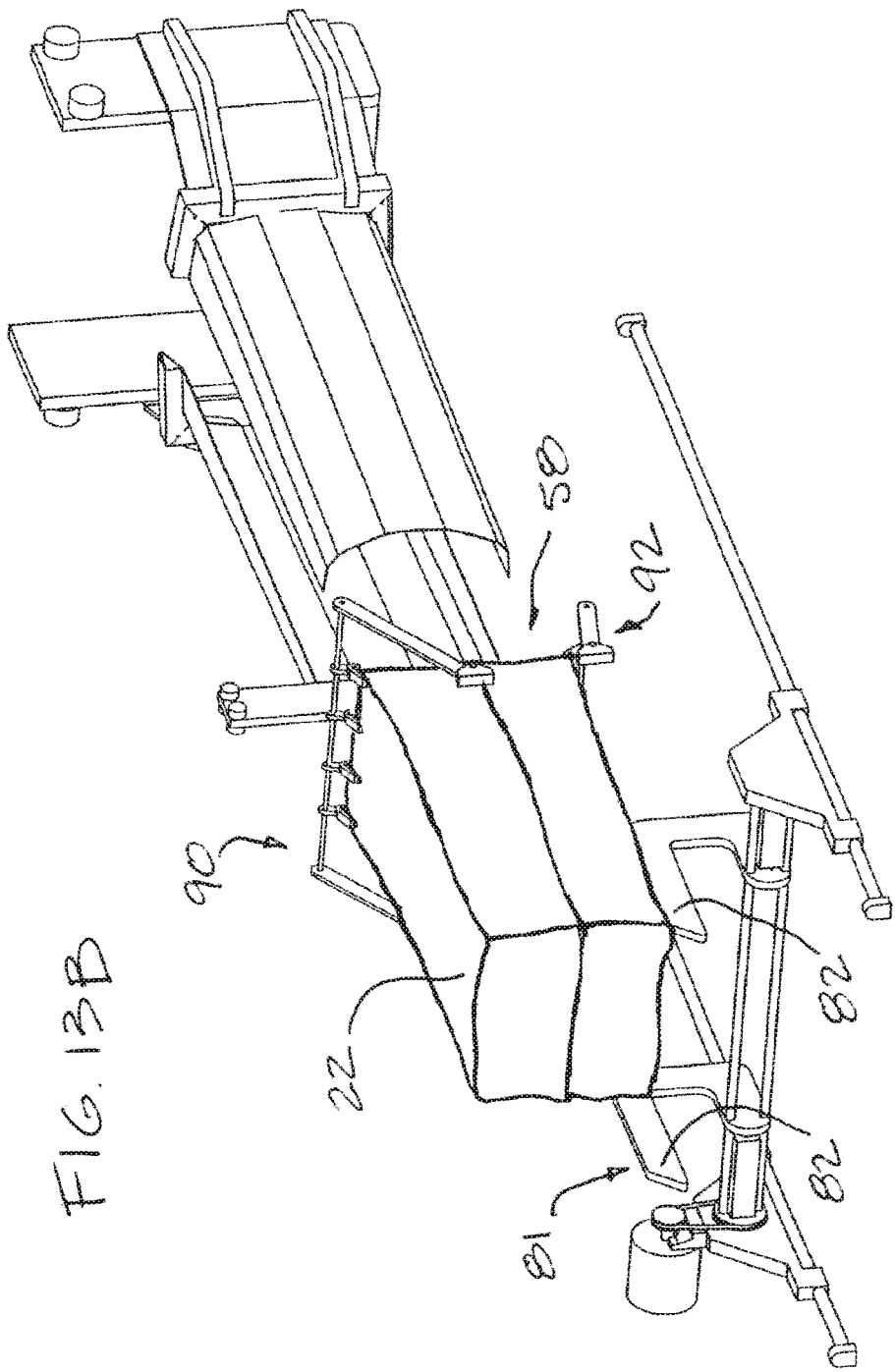

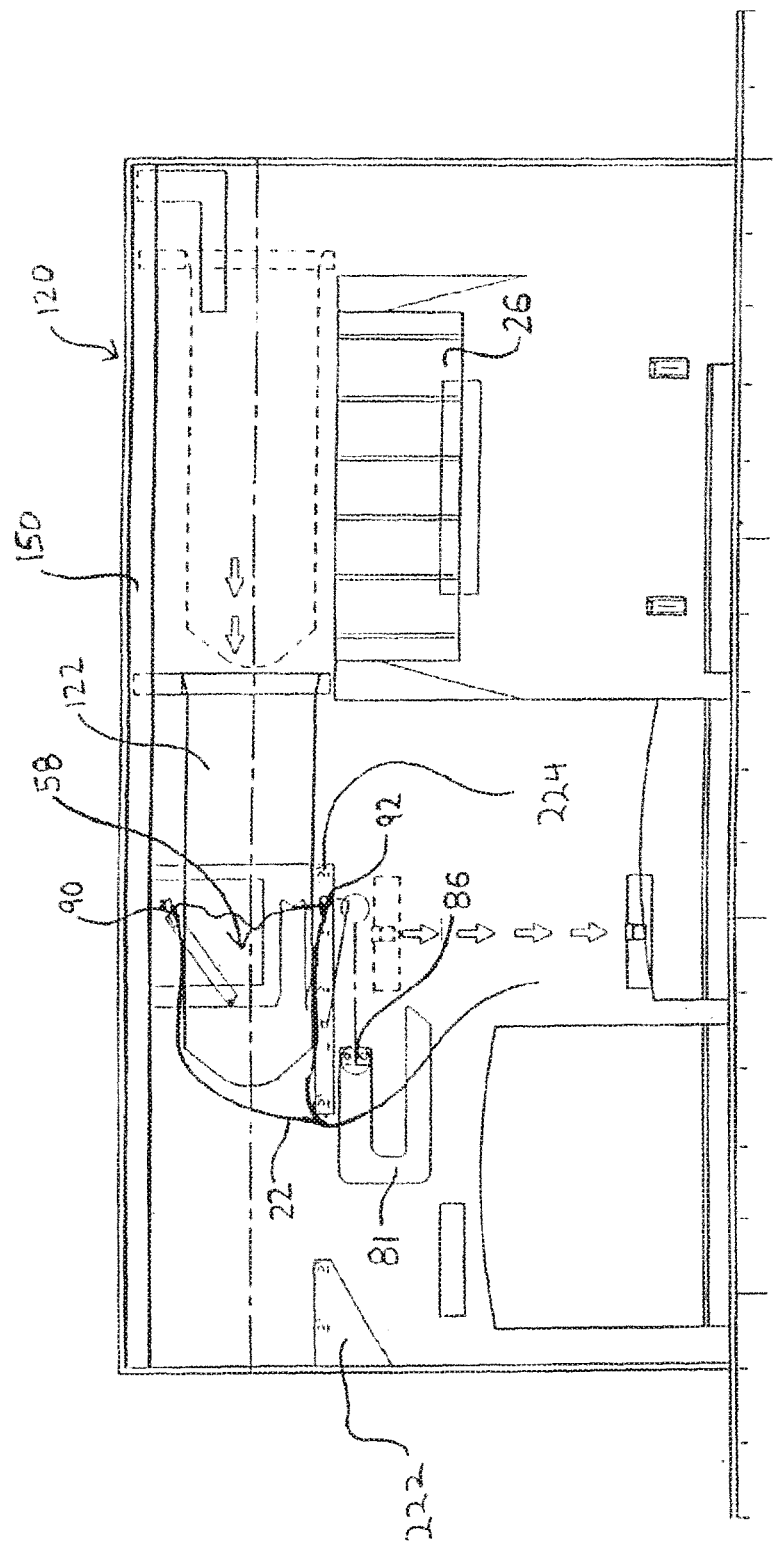

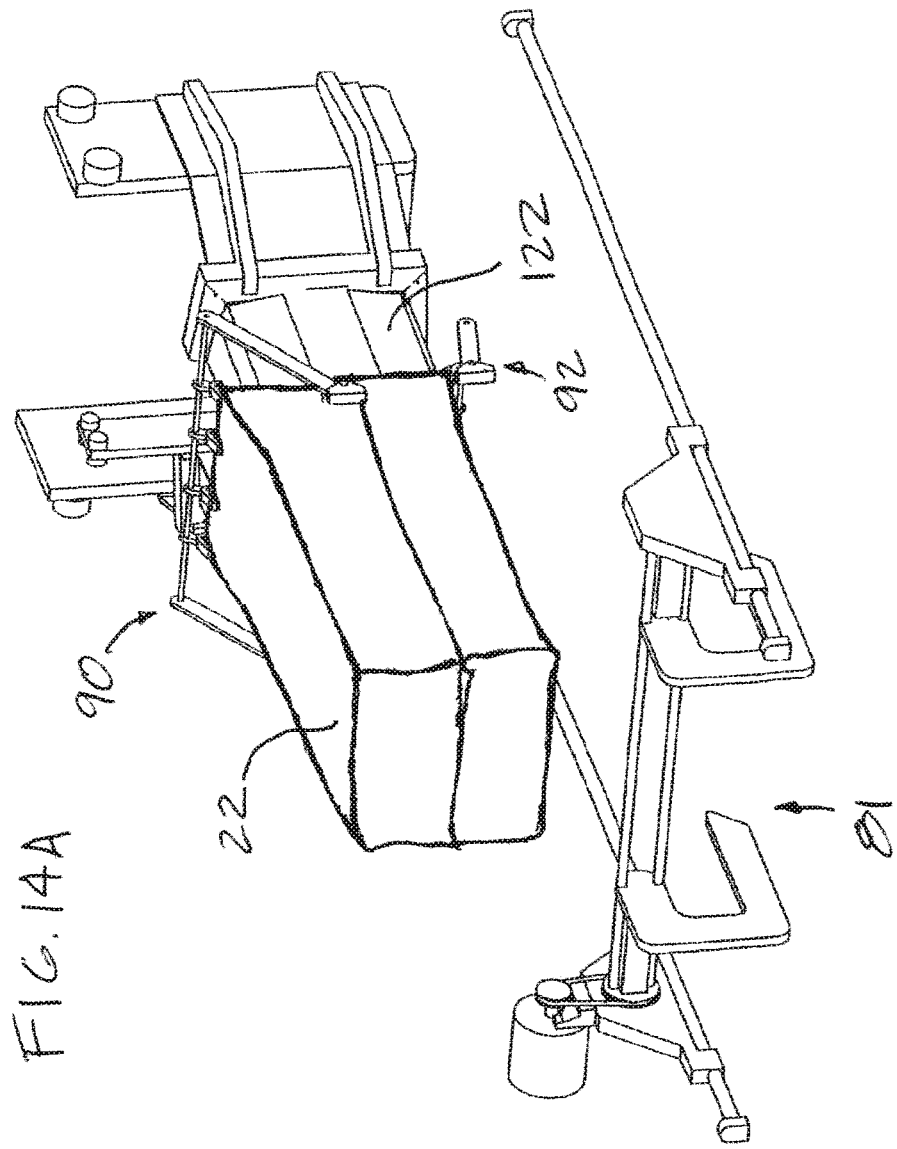

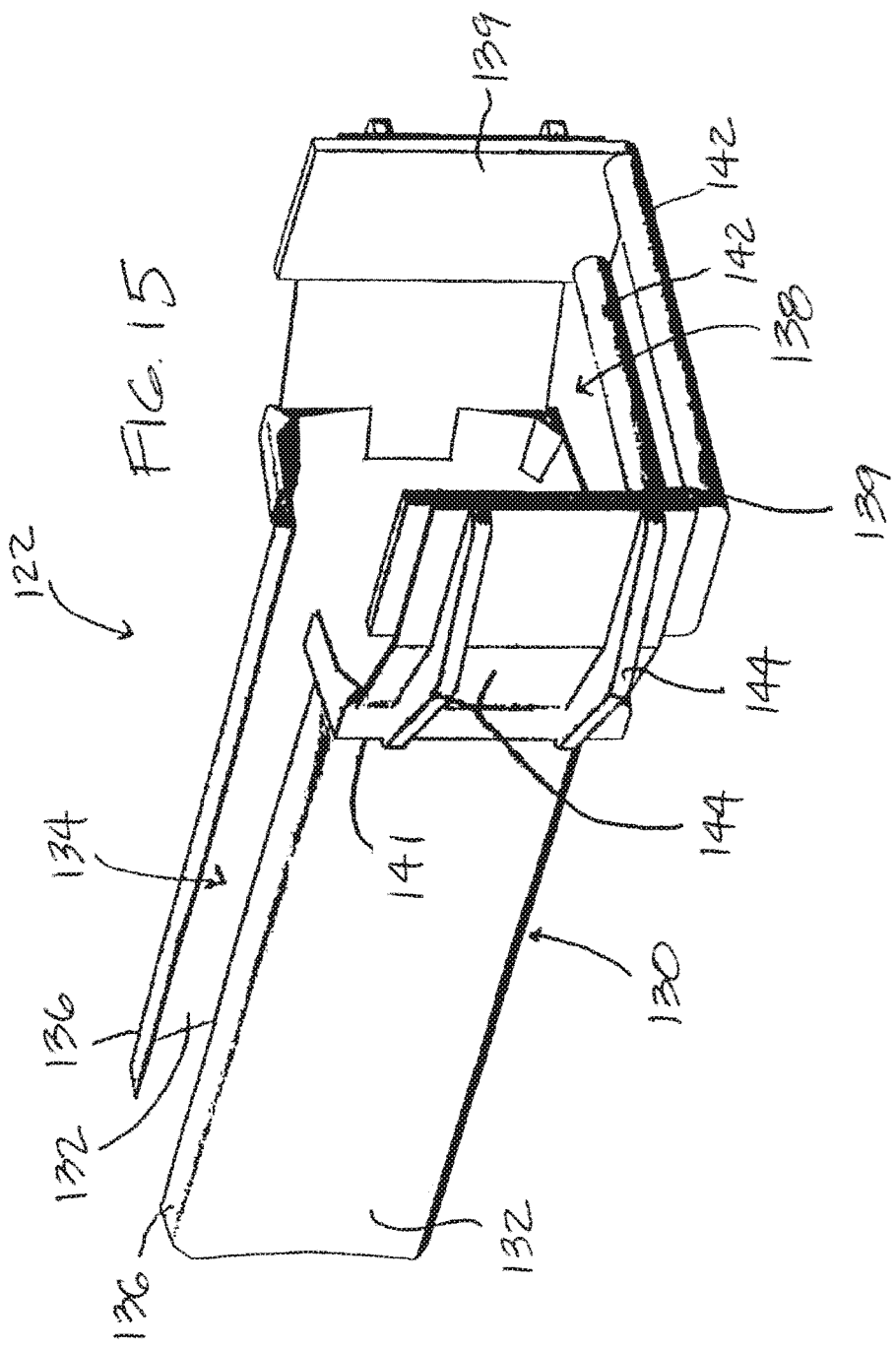

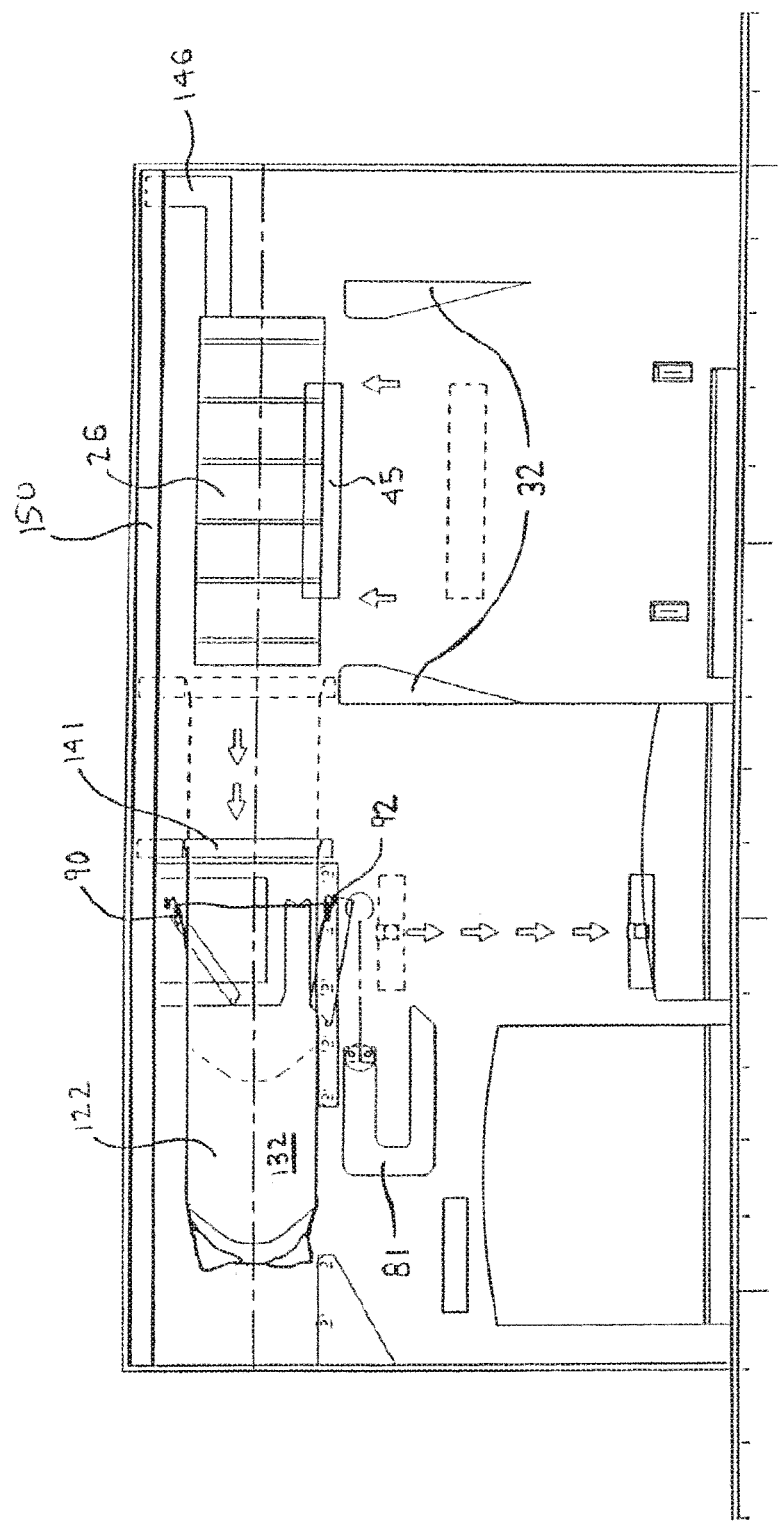

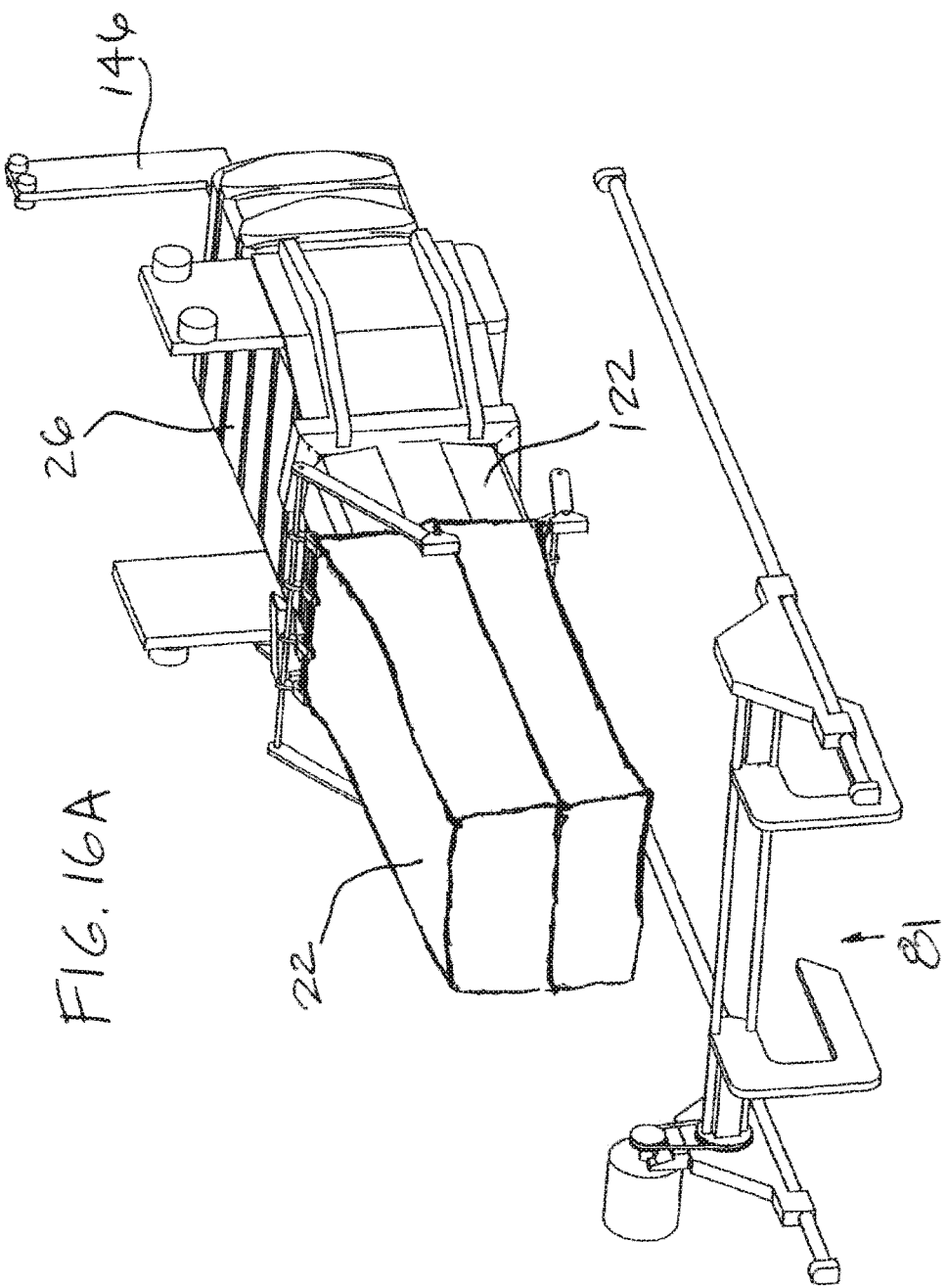

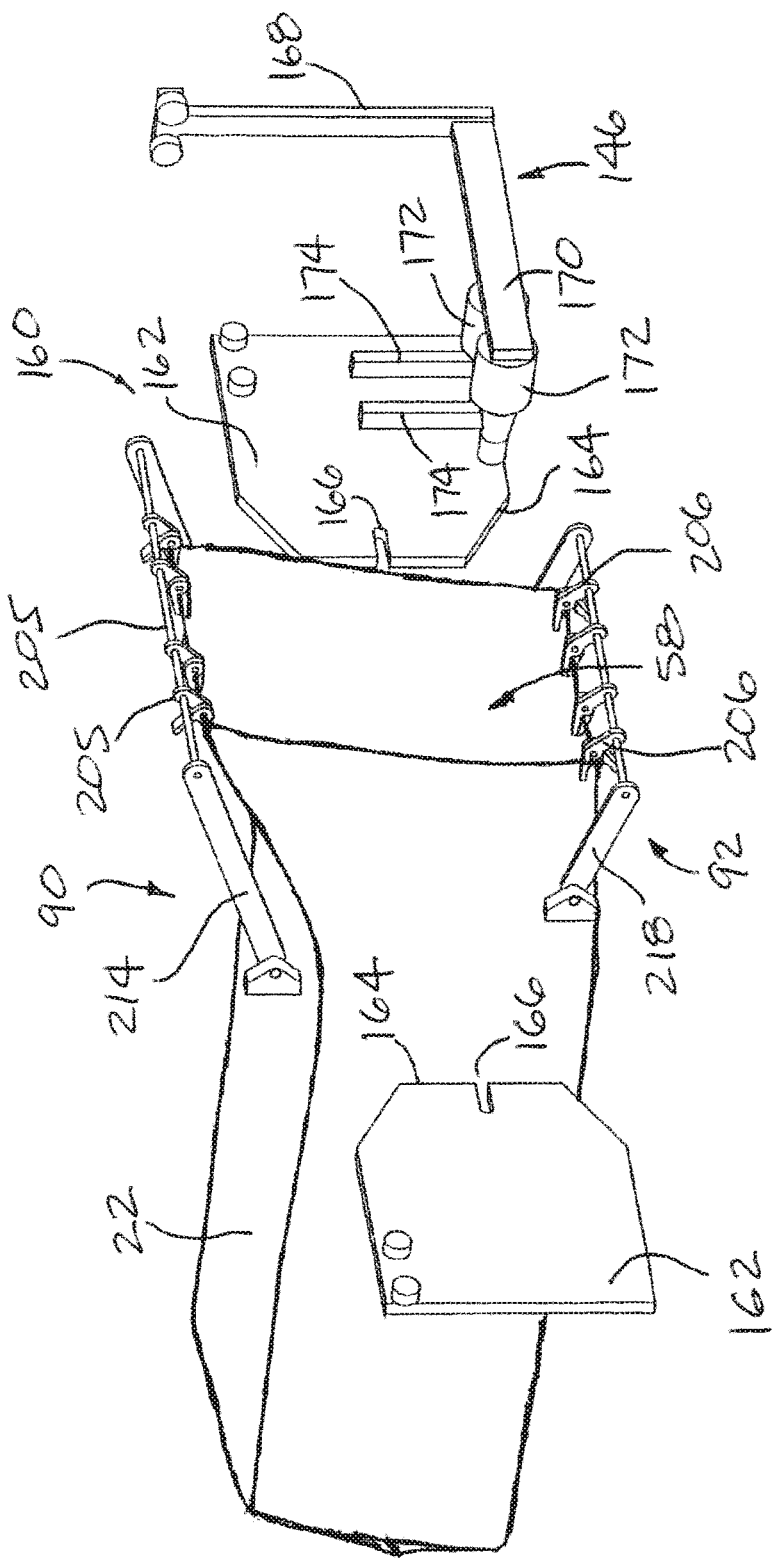

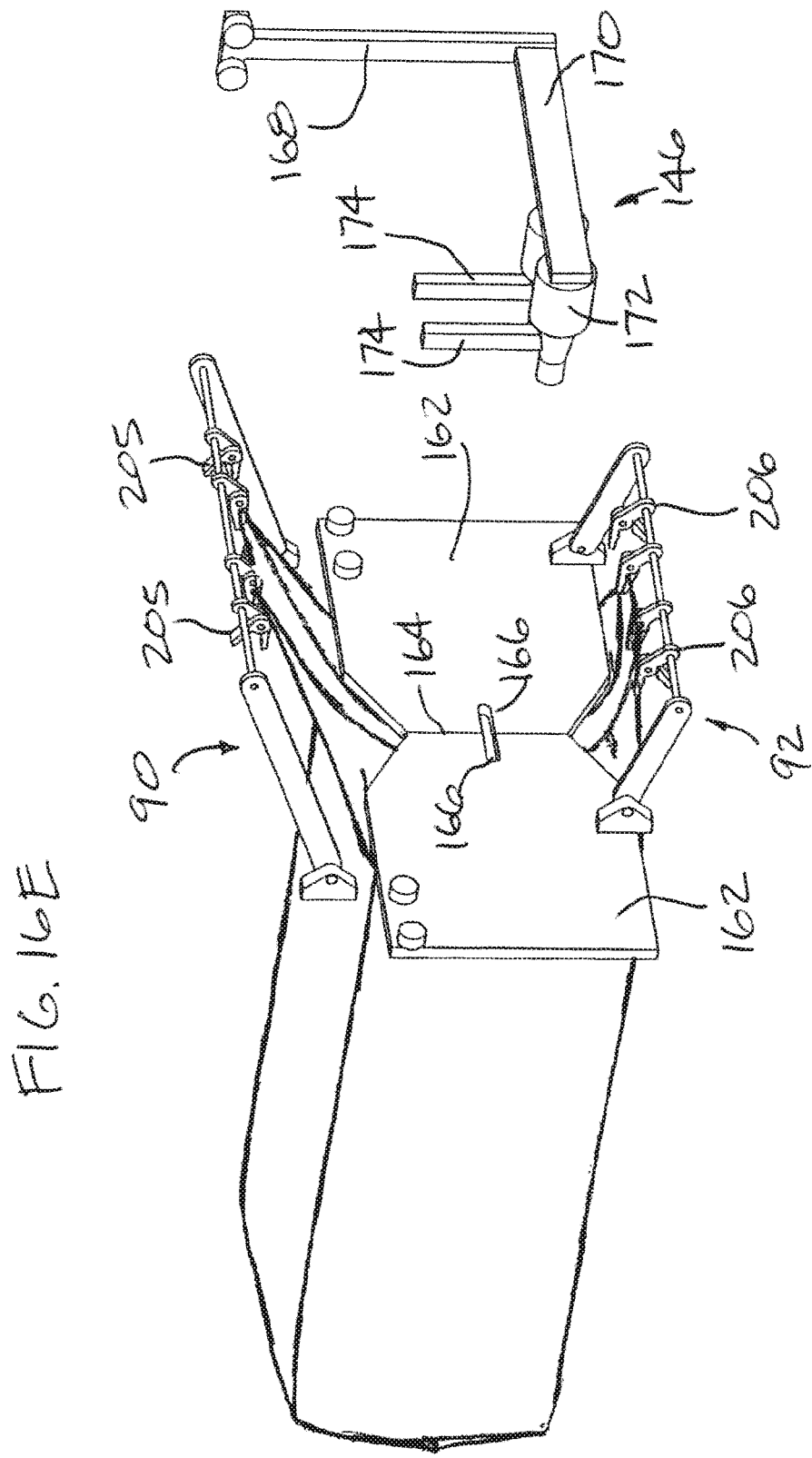

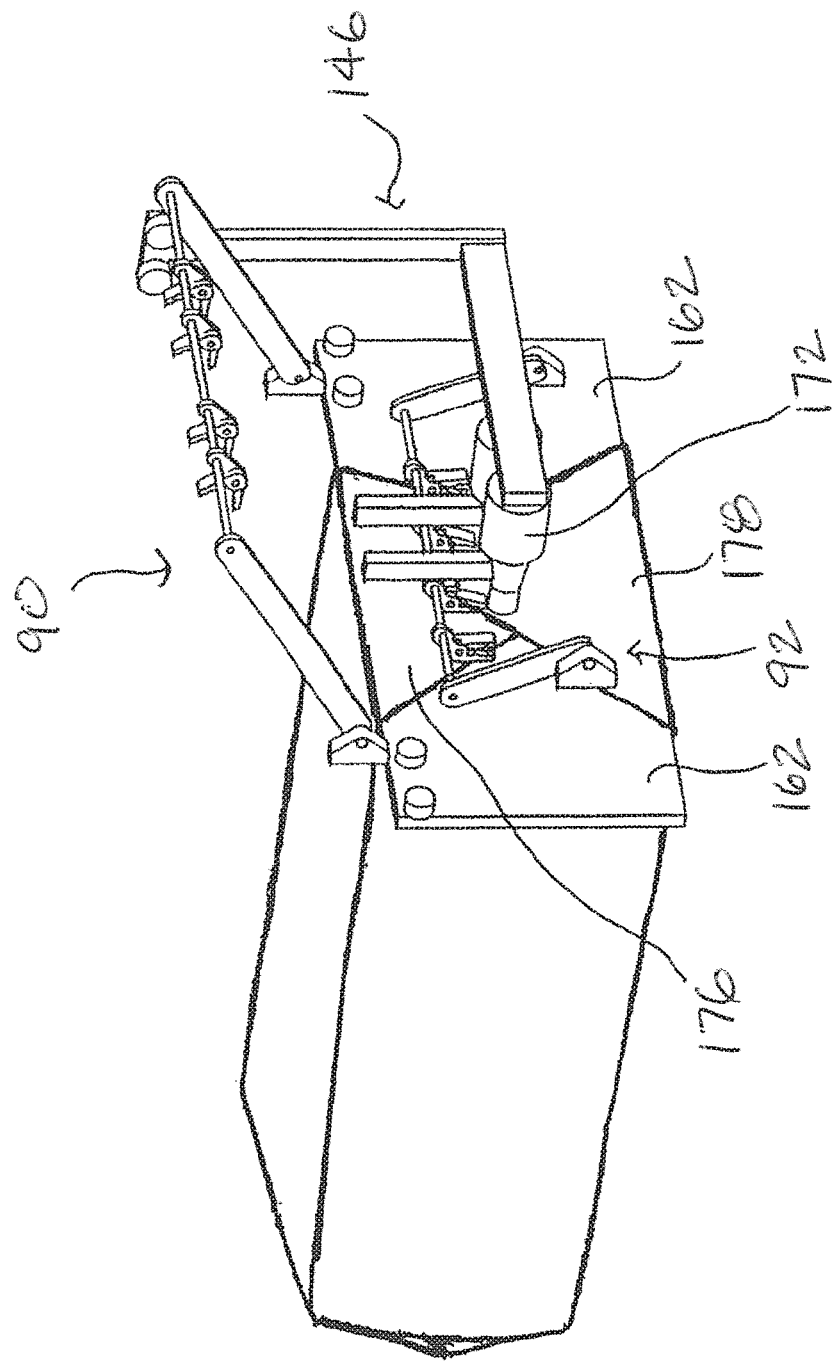

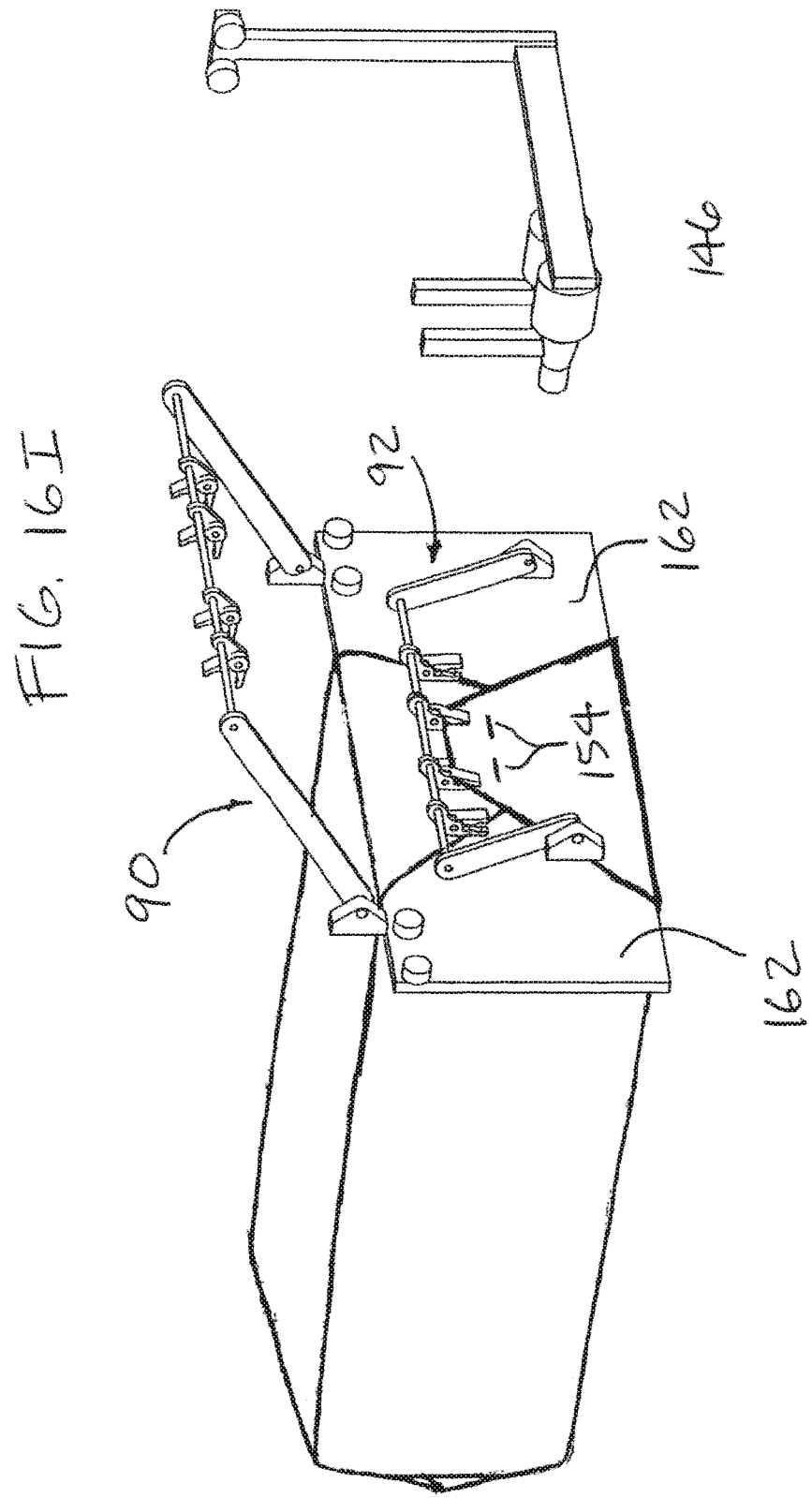

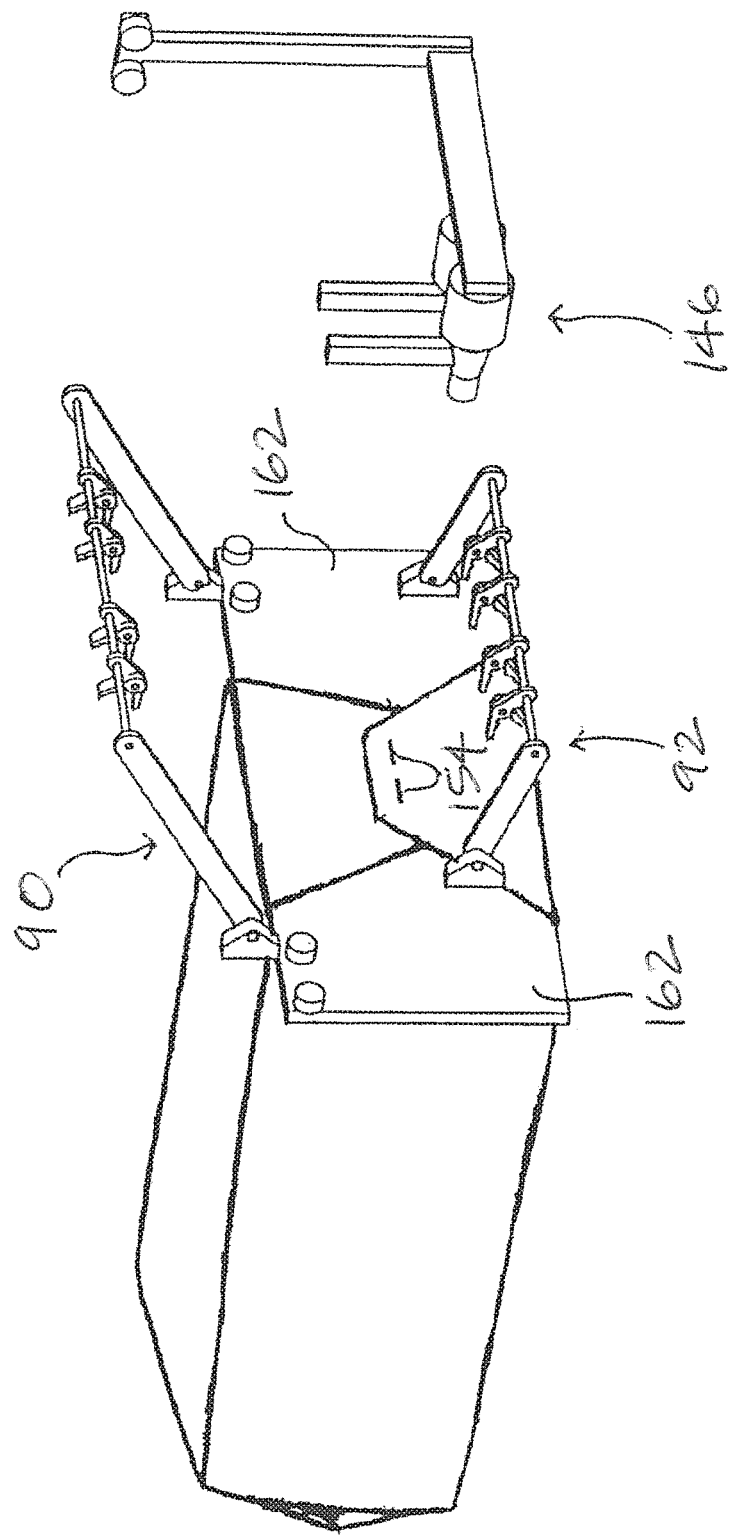

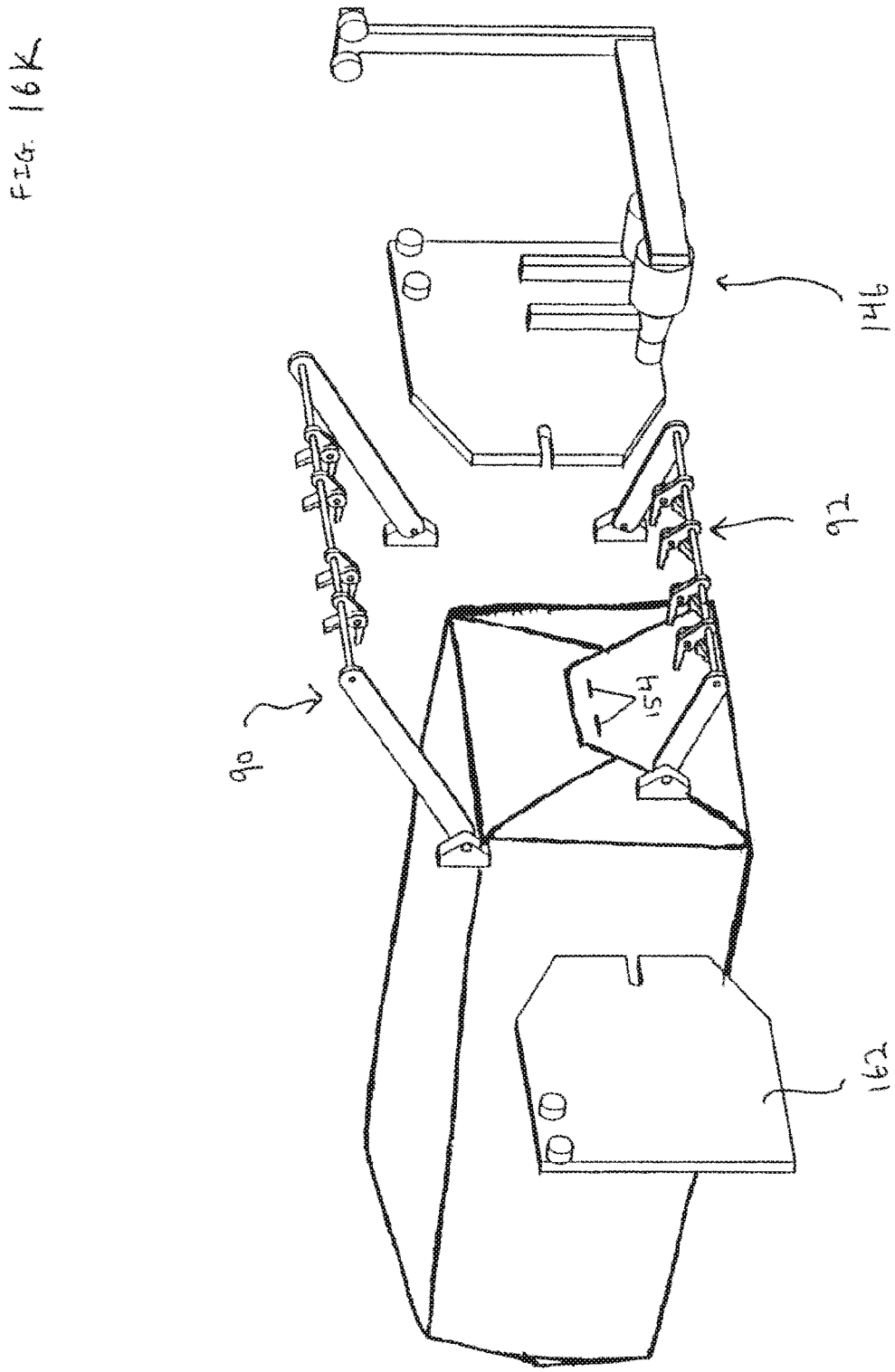

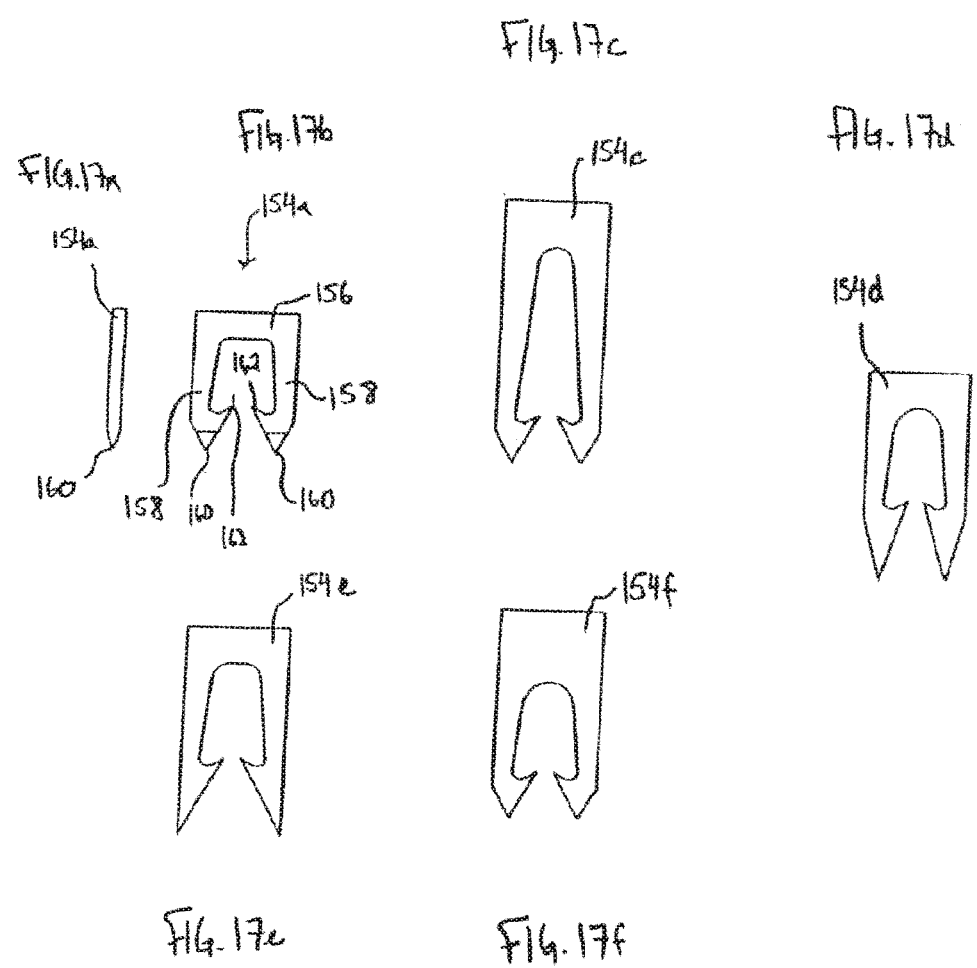

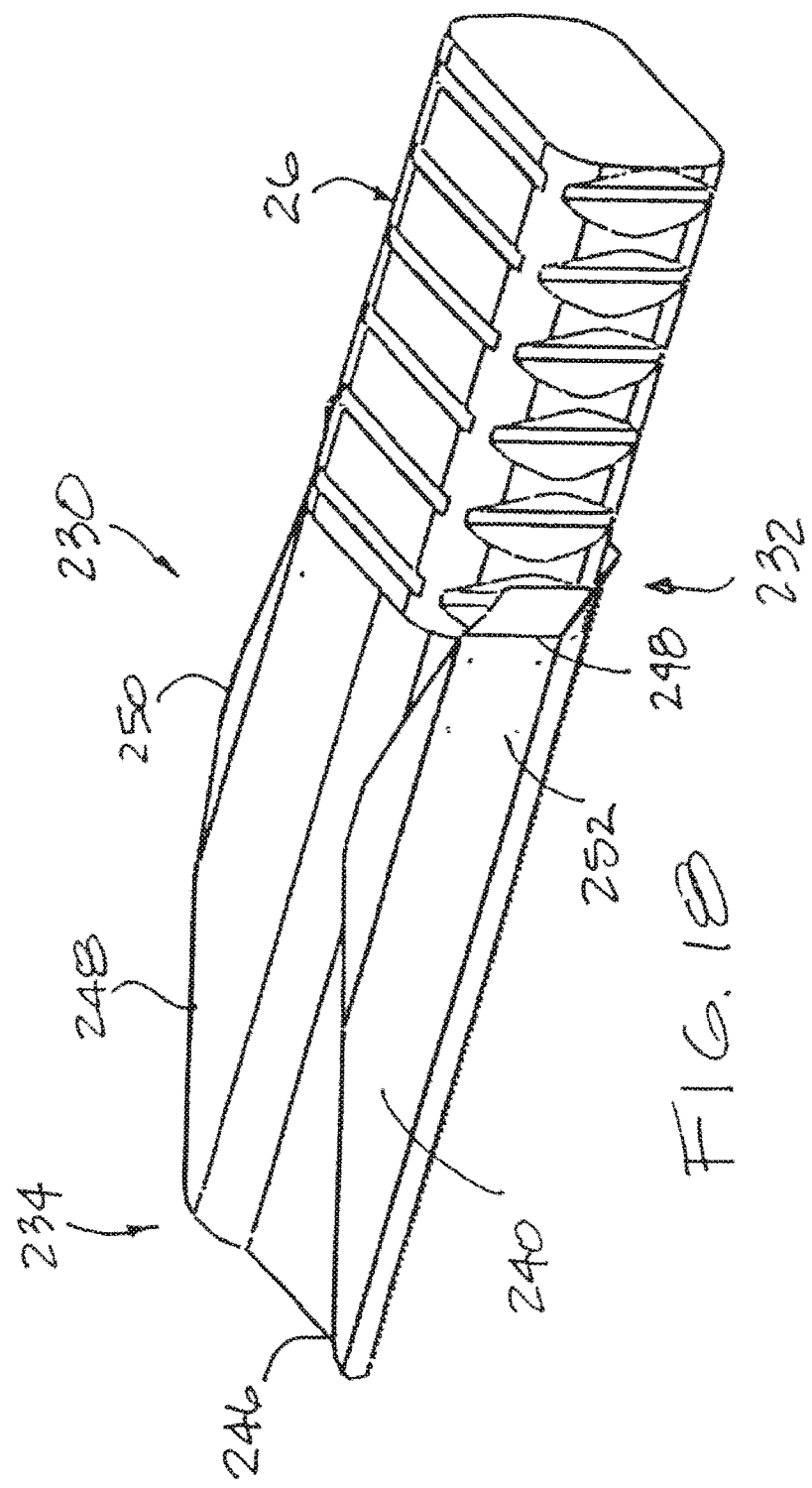

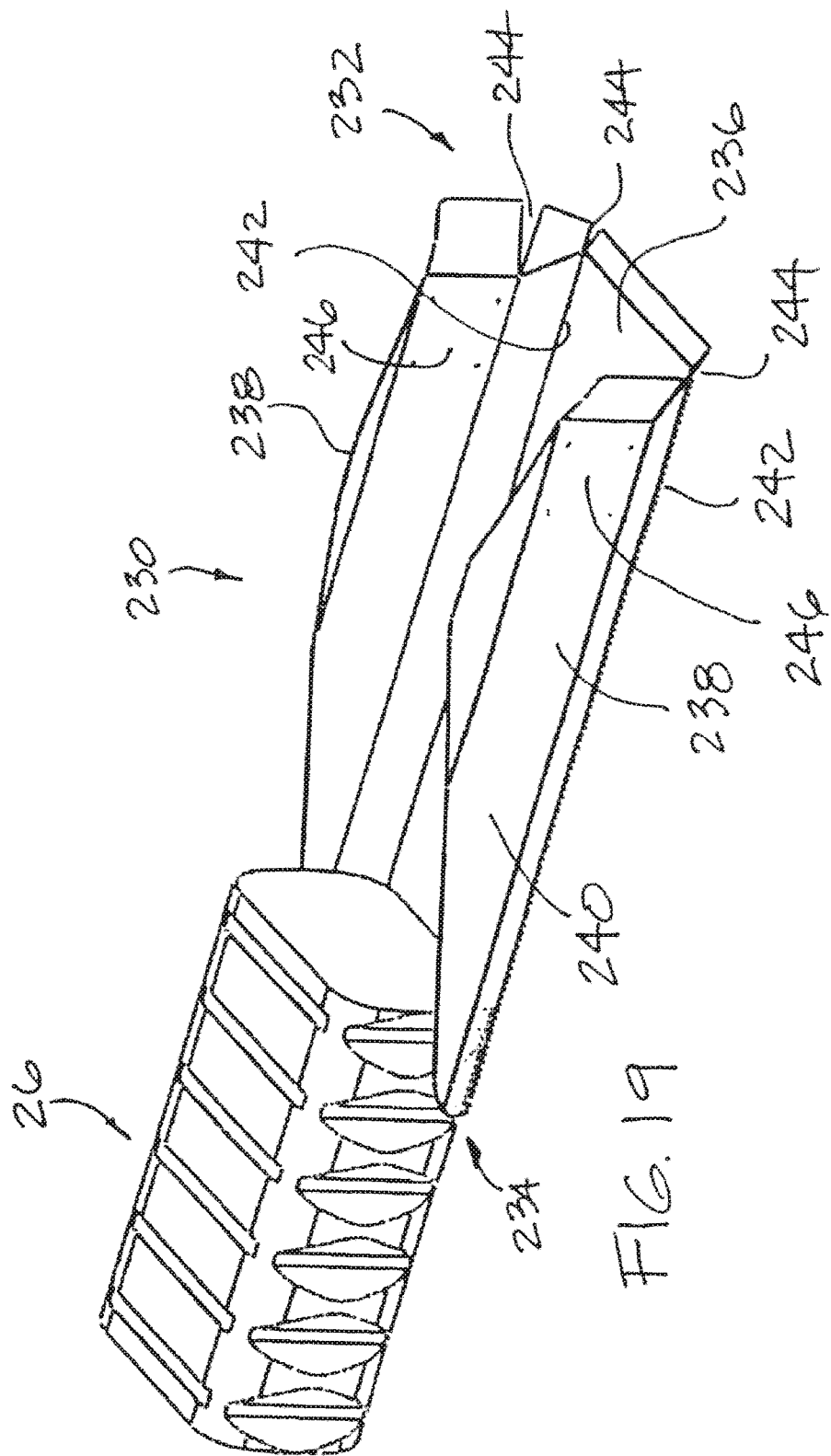

BAGGING ASSEMBLY

CROSS REFERENCE TO RELATED APPLICATION(S)

This is a Continuation Application of Ser. No. 15/240,808, filed Aug. 18, 2016, which is a Continuation Application of Ser. No. 13/842,908, filed Mar. 15, 2013, which is a Continuation of application Ser. No. 12/397,138, filed Mar. 3, 2009, which is an ordinary application of provisional application No. 61/033,376, filed Mar. 3, 2008, entitled BAGGING ASSEMBLY, and to provisional application No. 61/118,330, filed Nov. 26, 2008, entitled BAGGING ASSEMBLY. The contents of the foregoing two applications are hereby expressly incorporated herein by reference. The contents of provisional application Ser. No. 61/118,175, filed Nov. 26, 2008, entitled BAG RETRIEVAL ASSEMBLY AND BAG FOR PRESSED BALES are also hereby expressly incorporated herein by reference.

BACKGROUND

Conventionally, manual labor has been used to cover a bale of cotton or other fibrous material with a bag to protect the bale from damage or contamination during transport, and some instances to comply with trade requirements. To bag a bale using prior art methods, one or, more commonly, two or more workers must extend an open end of a bag over a bale chute in preparation for the bale to be inserted through the bale chute and into the bag. Additionally, the workers must hold the bag in position while the bale is inserted into the bag, preventing the workers from accomplishing other tasks during this time. Further, if a bale is not centered to enter the chute, the workers may attempt to move bales weighing up to 500 pounds, risking injuries and well as consuming time. Conventional bale bagging devices also contain numerous moving parts, on which workers may catch themselves or clothing, causing serious injuries, death, and/or property damage.

SUMMARY

A bagging assembly for bagging a pressed bale is provided including a chute comprising two spaced retaining structures defining a holding space and a channel therebetween, a bag positioning assembly for placing a bag around the chute, and a bag stuffing assembly for inserting the bale into the chute, wherein the chute is movable relative to the bag stuffing assembly.

In another exemplary embodiment, a bag sealing assembly is provided for sealing the bag once a bale has been inserted therein. Additionally, the bagging assembly may include also a bag removal assembly for removing the bagged bale from the bagging assembly and a bale positioning assembly to position the bale proximate to the chute before the bale is inserted into the chute and bag.

A further aspect of the present invention include a method for bagging a bale. Said method comprising using a bag positioning assembly on the bagging assembly to locate a bag in a position to received the bale; inserting a chute into the bag; using a bag stuffing assembly on the bagging assembly to insert the bale into the chute; and removing the chute from the bag.

A yet further aspect of the present invention comprises a bagging assembly for bagging a pressed bale comprising a bale elevator for raising a bale from a first position to a second higher position; a bag retriever assembly for retrieving a bag for bagging said bale raised by said bale elevator; a separator for opening an open end of said bag raised by said bag retriever, said separator rotatable about an axis of a rod; a chute for guiding said bale raised by said bale elevator into said bag retrieved by said bag retriever; and a bag stuffing assembly for pushing said bale raised by sale bale elevator into said chute and said bag retrieved by said bag retriever.

In still yet another aspect of the present invention, a bagging assembly for bagging a pressed bale is provided comprising a chute having a receiving end for facilitating insertion of a pressed bale into a bag; said chute comprising a one piece continuous center section having two side sections extending therefrom; the two side sections being spaced from one another and each having a radially outwardly flared section at the receiving end of the chute.

Still other aspect of the invention include a bagging assembly for bagging a pressed bale comprising a chute defining a cavity for sequentially receiving pressed bales positioned at a first elevation relative to a framed assembly of the bagging assembly and being movable between a position closer to a first side of the framed assembly and a position closer to a second side of the framed assembly. The assembly further comprises a bag retrieval system for retrieving bags positioned at a second elevation relative to the framed assembly and a plurality of bags for use to bag pressed bales located at a third elevation relative to the framed assembly; and wherein the third elevation is lower than the second elevation.

Other aspects and variations of the bale bagging assemblies summarized above are also contemplated and will be more fully understood when considered with respect to the following disclosure.

BRIEF DESCRIPTION OF THE DRAWINGS

FIGS. 8A-8C are schematic orthogonal views of an exemplary positioner of the bagging assembly of FIG. 1.

FIGS. 9-11 are side schematic views of the bagging assembly of FIG. 1 showing bagging steps of bagging a bale according to exemplary embodiments of the present invention.

FIG. 12 is a schematic orthogonal view of a positioner and bag expansion assemblies according to aspects of the present invention.

FIG. 12A is a side view of the positioner of FIG. 8A having a bag attached thereto.

FIGS. 13 and 13A are a schematic orthogonal view and a side view, respectively, of a positioner disengaging from a bag according to aspects of the present invention.

FIGS. 13B and 13C are a schematic orthogonal view and a side view, respectively showing further bagging steps according to aspects of the present invention.

FIGS. 14 and 14A are a schematic orthogonal view and a side view, respectively showing further bagging steps according to aspects of the present invention.

FIG. 15 is an orthogonal view of an exemplary chute of the bagging assembly of FIG. 1.

FIG. 16 is a side schematic views of the bagging assembly of FIG. 1 showing a bagging step of bagging a bale according to an exemplary embodiment of the present invention.

FIGS. 16A and 16B are schematic orthogonal views of bagging steps of bagging a bale according to aspects of the present invention.

FIGS. 16D-16K are schematic orthogonal views of a bag sealing assembly and bag sealing steps according to aspects of the present invention.

FIGS. 17a and 17b are a side view and a top view, respectively, of an exemplary staple according to aspects of the present invention.

FIGS. 17c-17f are other exemplary embodiments of staples according to aspects of the present invention.

FIGS. 18 and 19 are schematic views of an alternative chute provided in accordance with aspects of the present invention.

DETAILED DESCRIPTION

Figure 1:
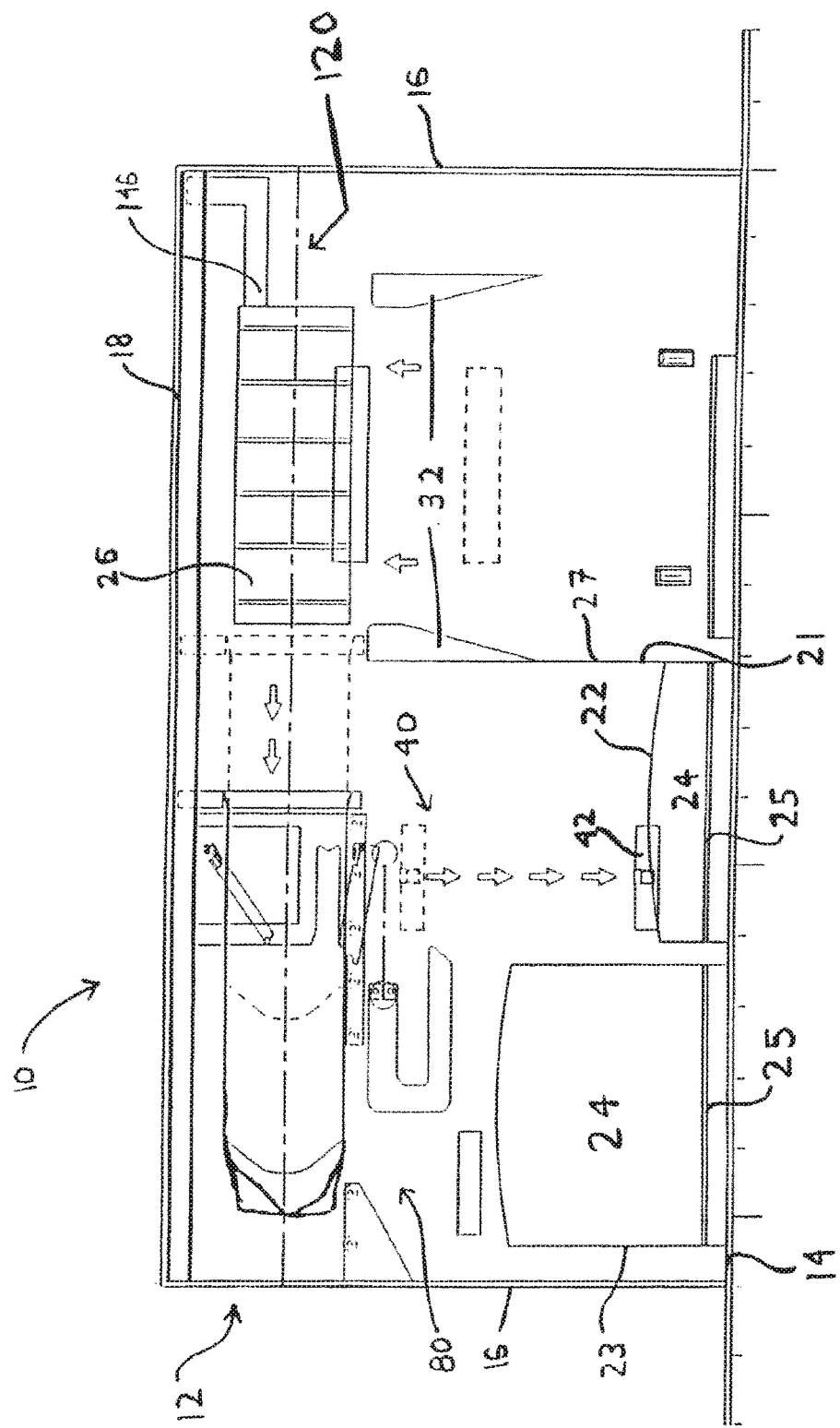
FIG. 1 is a side schematic view of an exemplary embodiment of a bagging assembly according to aspects of the present invention.

With reference to FIG. 1, a bagging assembly 10 in accordance with exemplary embodiments of the present invention is provided to efficiently and effectively insert an uncovered bale of fibrous material into a bag, seal the bag, and transport the sealed bag from the bagging assembly.

Referring now to FIG. 1, an exemplary embodiment of a bagging assembly 10 includes a system area 12, which houses various bale bagging components generally referred to herein as a housing, having a base 14, that may be a floor or a slab or a foundation, side walls 16, that may be metal, plastic, wood or steel frames or steel beams, and a top wall 18, that may be a roof of a building or an upper frame or beam. Although the housing 12 represented in FIG. 1 is an open space, a confined space for containing the components of the bagging assembly 10 or a different type of housing structure may be practiced without deviating from aspects of the present invention.

The bagging assembly 10 includes, within the housing 12, a bag retrieval assembly 40 for retrieving bags from a stack of bags 24, a bag positioning assembly 80 for opening the bag and preparing the bag on the chute 122 (FIG. 5) to receive a bale, and a bag stuffing assembly 120 for inserting the bale into the bag, as will be described in more detail below. Generally, the bagging assembly 10 operates continuously to retrieve a bag 22 from a stack of bags 24, position the bag to receive a bale 26, insert the bale into the bag, and seal the bag. As shown in the figures, the bagging assembly 10 may operate on more than one bale 26 simultaneously, but, for clarity, a description of operation of the bagging assembly will generally follow a full "bagging cycle" of a single bale from beginning to end. Optionally, the assembly 10 may be configured as a batch process and only work on one bale at a time.

As shown in FIG. 1, the bagging assembly 10 comprises first and second bag bins 21, 23 configured for holding a bag stack 24 of a plurality of bags 22 to be supplied to the bag retrieval assembly 40. Providing two bag bins 21, 23 allows the second bag bin to efficiently replace the first bag bin when the first bag bin is emptied thus allowing the bagging assembly 10 to continuously operate by using bags 22 supplied by the second bag bin while the first bag bin is being restocked, i.e., to minimize or eliminate down-time. Thus, the first bin 21 may be considered an operating bin while the second bin 23 a backup bin. However, one of ordinary skill in the art will appreciate that the bagging assembly 10 may operate with only a single bag bin. In one exemplary embodiment, when the operating bin 21 is emptied, it is removed or moved out of the way and back up bin 23 moved over to assume the position of the operating bin. In one embodiment, movement of the bins may be done manually, either with a lift truck, pallet jack or a forklift, or through automatic loading and unloading mechanisms (not shown, such as a movable platform, belt or conveyor system). Still alternatively, the bag retrieval assembly 40 may pick up a bag from any of the two stacks 21, 23 without having to wait for one of the bins to first go empty. In one exemplary embodiment, each bag bin 21, 23 comprises side walls 27 for containing bags 22 therein, such as a four-sided box, or it may simply embody a palette. The bags 22 are stacked in the first bag bin 21 such that an open end 58 (FIG. 3) of each bag is orientated in the direction of the second bag bin 23. Bags are normally folded at least once to simplify shipping to the user, however this is not required. As shown in the figures, the first bag bin 21 supplying bags 22 to the bag retrieval assembly 40 may be positioned to abut a side surface of a bale guide 32. Alternatively, the bag bins 21, 23 may be positioned at any location within reach of the bag retrieval assembly 40 and the opening of each bag may alternate in two or more different directions so that the bag retrieval assembly 40 has to move or re-position to grab an appropriate end of each bag. Most preferably, the bags are placed below, elevation-wise, the bag retrieval system 40. Alternatively, the bags are placed above, elevation-wise, the bag retrieval system 40. Still alternatively, the bags are provided in the form of a rolled stack of bags.

Figure 2:
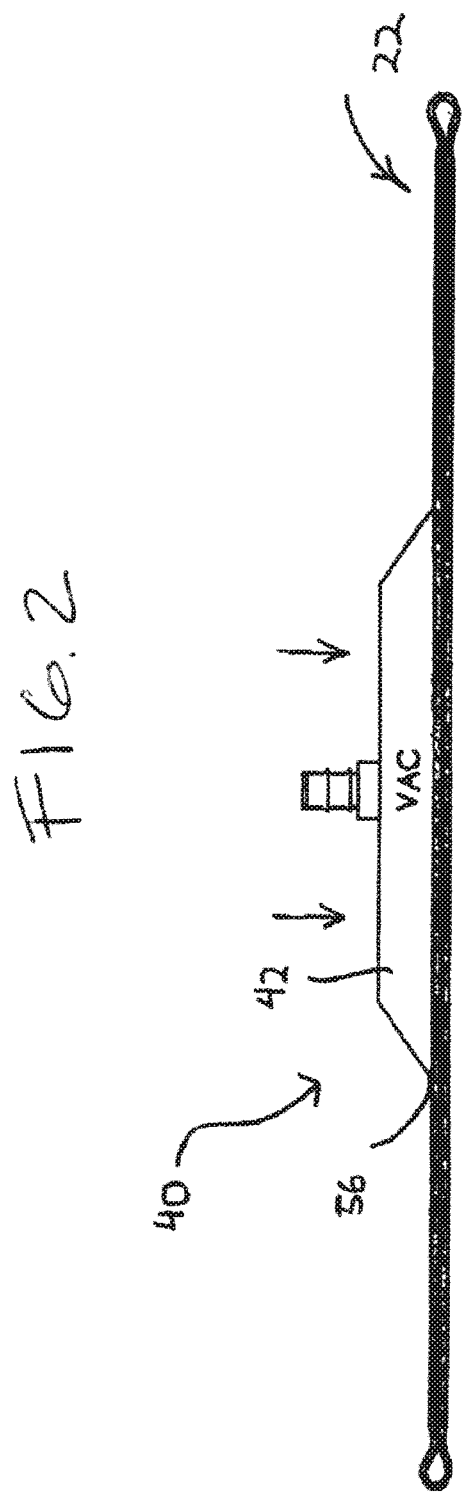
FIG. 2 is a schematic view of an exemplary bag retriever of the bagging assembly of FIG. 1.

With continued reference to FIG. 1 and also now with reference to FIG. 2, in one embodiment the bag retrieval assembly 40 includes a moveable bag retriever 42 comprising a head adapted to retrieve the bag 22. In certain embodiments, the moveable bag retriever 42 is a robot arm for picking up and delivering bags to the bag positioning assembly 80 while in other embodiments, the moveable bag retriever is a Cartesian coordinate robot. Aspects of a robot arm and a Cartesian coordinate robot for picking up bags are disclosed in Ser. No. 61/118,175, the contents of which are expressly incorporated herein by reference for all purposes. In an initial position, as shown in phantom in FIG. 1, the bag retriever 42 is located above the first bag bin 21 and configured to be lowered onto the bag stack 24 to retrieve the bag 22 on top of the stack. The bag retriever 42 may move vertically on a guide, track, or rail, powered by, for example, a motor with belt or chain, or a pneumatic or hydraulic cylinder. The bagging assembly 10 may be controlled by a computer, vector drives, servo drives, electro mechanical sensors and/or other common control devices known within the art. These controllers may be closely placed, producing a master control center, or each device may have its own controller, wherein signals coordinate functions between systems. The bag retriever 42 may be positioned such that one edge of the bag retriever is generally aligned with the open end 58 (FIG. 3) of the top bag 22 when the bag retriever is lowered from its initial position to a retrieval position as indicated by the arrows. When the bag retriever 42 encounters the top bag 22, a bag attachment mechanism on the bag retriever secures the bag to a bottom surface 50 of the bag retriever. In one exemplary embodiment, the bag attachment mechanism is a vacuum device capable of generating an effective amount of vacuum so that as the bag retriever is raised, the bag is held by vacuum force and rises with the device. In one embodiment, a sensor is incorporated in the retriever 42 so that as it contacts the bag 22, a signal is sent to a controller to activate a vacuum to enable the bag retriever to "grab" the bag. A plurality of vacuum cups may be used to further ensure that a bag is retrieved. It will be appreciated, however, that suction cups, a perforated vacuum plate, or any other device suitable to allow the bag 22 to be removably attached to the bag retriever 42 may also be used as the bag attachment mechanism instead of or in addition to a vacuum device. For example, articulating fingers mounted on a robotic arm may be used to grab the individual bags or alternatively a Cartesian coordinate robot may be used as disclosed in provisional application Ser. No. 61/118,175.

Figure 3:
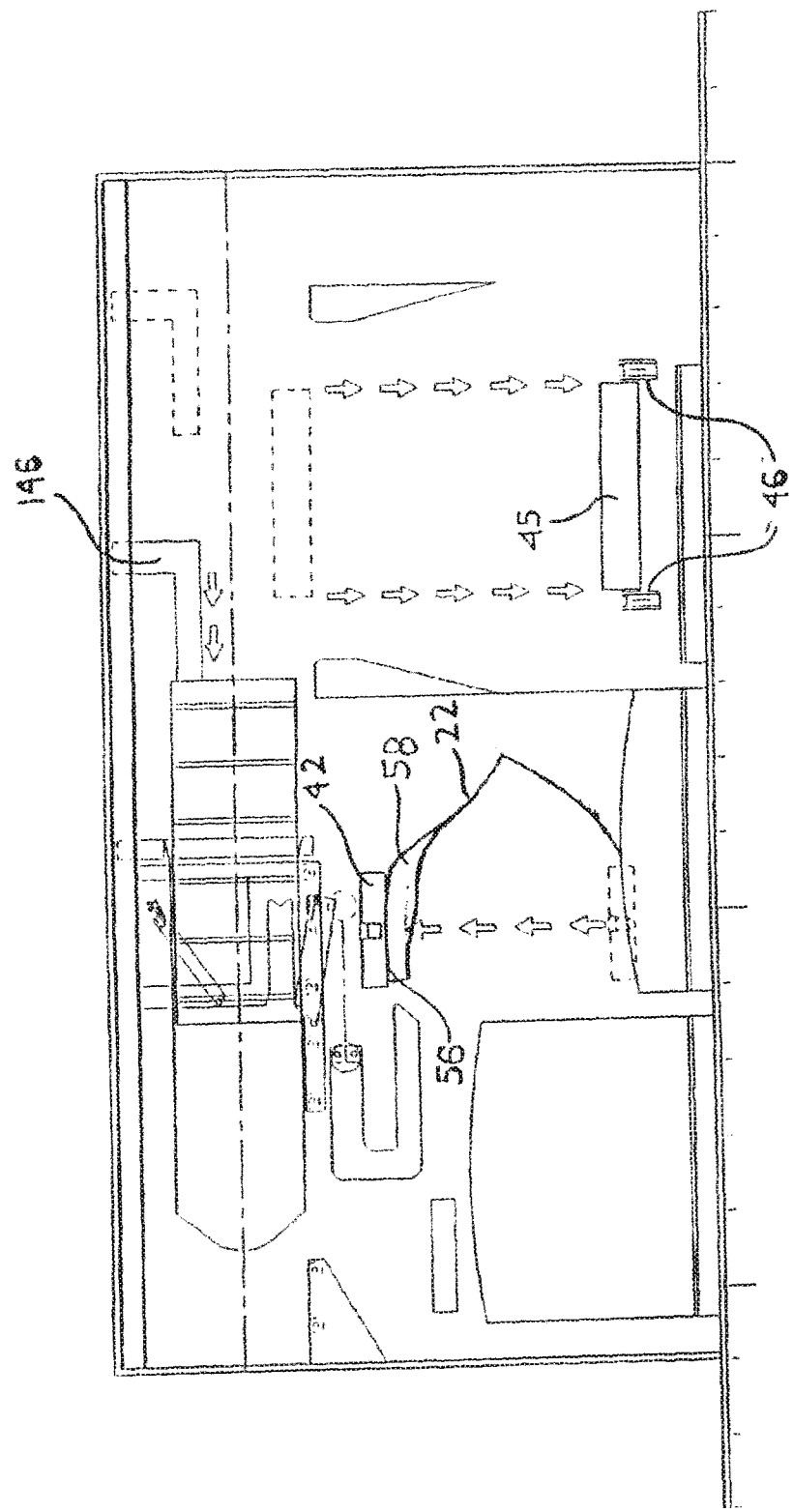
FIGS. 3-7 are side schematic views of the bagging assembly of FIG. 1 showing bagging steps of bagging a bale according to exemplary embodiments of the present invention.

With reference now to FIG. 3, once the bag 22 has been secured to the bag retriever 42, the bag retriever retreats up to its initial position, thereby lifting the bag from the bag stack 24. As the bag retriever 42 ascends, a bale elevator 45 simultaneously descends from an upper delivery position (shown in phantom) to a lower receiving position as indicated by the arrows. In one embodiment, a scissor lift mechanism with a support surface may be used to raise and lower the bales. As one of ordinary skill in the art will appreciate, a hydraulic, pneumatic, or electro-mechanical cylinder or motor with a belt/chain may also be used to raise or lower the support platform and the bale elevator 45, may move along rails, guides, tracks, or other suitable transportation means. In one exemplary embodiment, the bale elevator 45 is configured to stop at multiple positions on its way to an upper delivery position to allow operation on the bale before it is bagged, including grading, moisture testing, sample cutting, sample pulling, sizing, checking for missing bale ties, and other operations necessary for the storage, marketing, and protection of the product. Thus, an aspect of the present invention is a bale bagging assembly comprising a bag retriever movably positioned within a framed structure of the bagging assembly at a first elevation; and wherein a plurality of bags are positioned below the bag retriever at a second lower elevation.

In one exemplary embodiment, a blade or roller knife, like a pizza-pie cutter, protruding a set amount from a base position may be used to cut the bale as the bale is raised. As one of ordinary skill in the art will appreciate, any suitable device to move the blades vertically and/or horizontally over the bale to effectively cut the sample could be used. Still furthermore, the blades may be powered to provide added translating or rotating capability for cutting or sawing type motion. Once the strapped bale is cut, the cut sample or samples may be grabbed and processed in the manner disclosed in Provisional Application No. 61/023,812, entitled BALE SAMPLER, filed Jan. 25, 2008, the contents of which are expressly incorporated herein by reference for all purposes. The mechanism for grabbing the cut sample(s), as taught in the '812 application, may be placed at a location in the bagging assembly so that the cut samples are grabbed prior to the stuffing assembly 120 pushing and stuffing the strapped bale into a bag for bagging.

Figure 20:
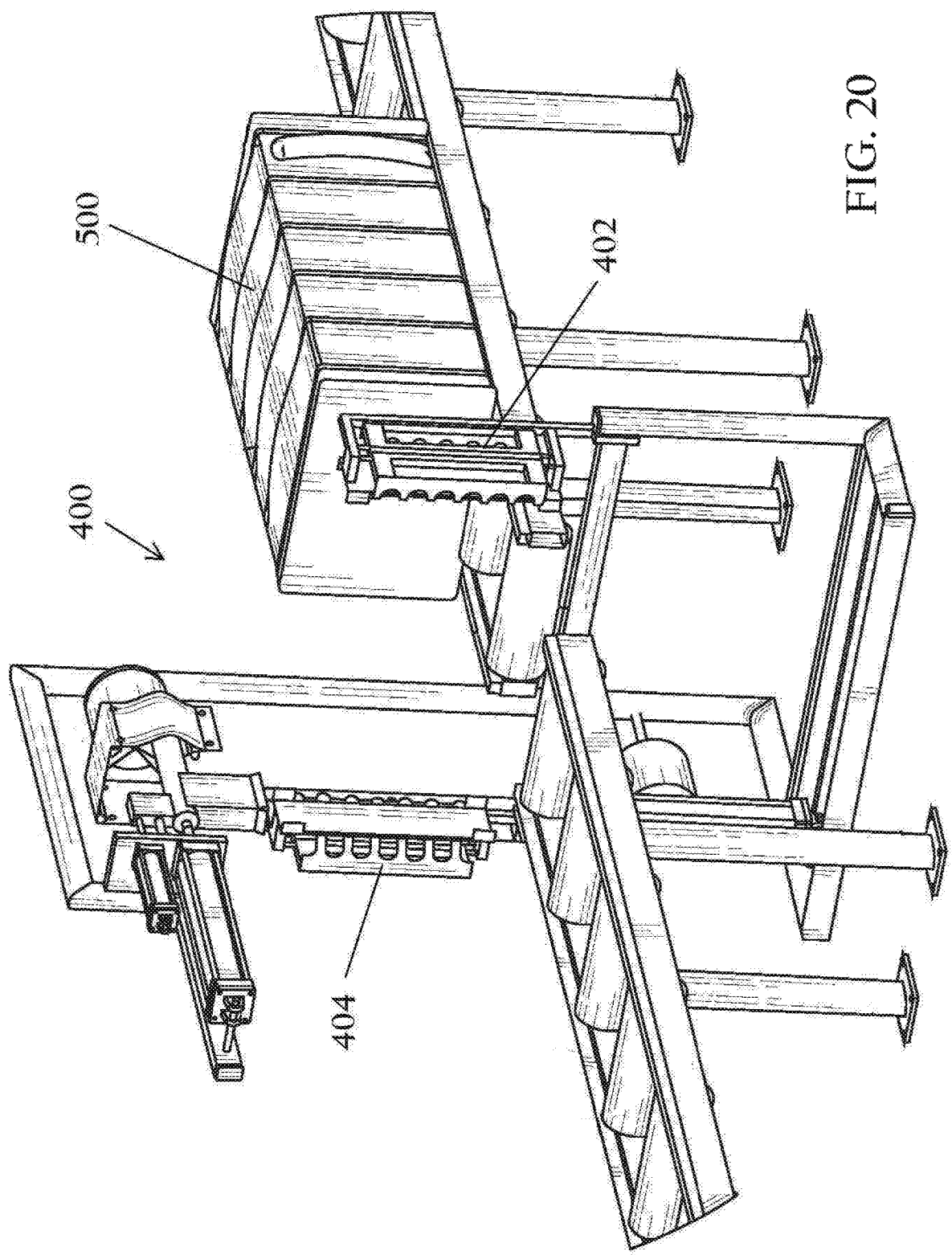
FIG. 20 is a schematic diagram showing a bale sampling device or assembly.

FIG. 20 shows a bale sampling device or assembly 400 as disclosed and described in the '812 application, noted immediately above. As shown, the bale sampling device 400 comprises a first gripper 402 and a second gripper 404 having gripping edges for gripping a bale sample from a bale 500, as described in the '812 application.

Figure 5:
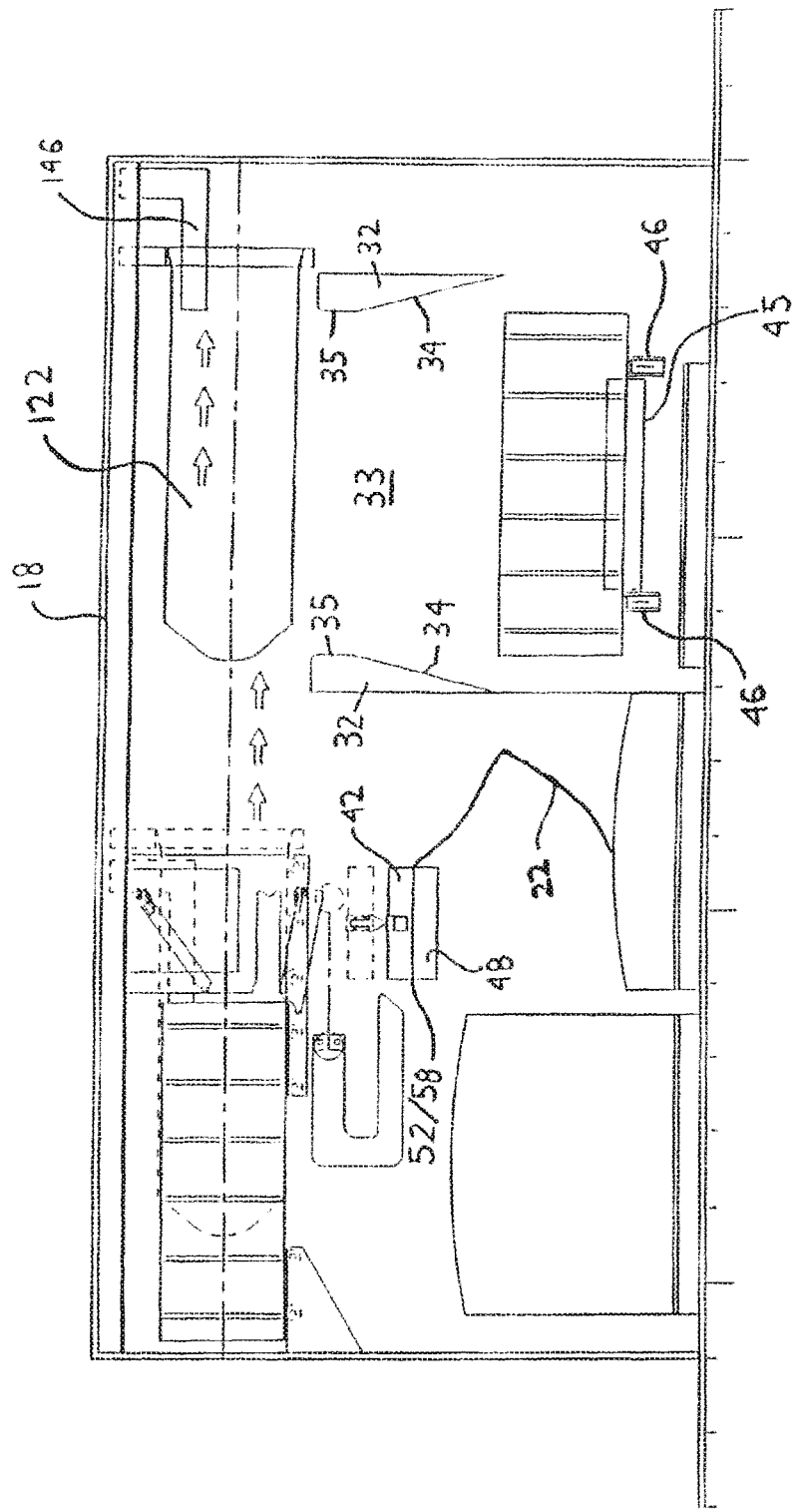

In the lowered receiving position, the bale elevator 45 is located to receive a bale 26 (FIG. 5) from a bale conveyor, or another bale transport means such as a forklift or a hand truck. As shown in FIG. 3, the bale elevator 45 is positioned between rails 46 of a bale conveyor such that the bale conveyor can transport the bale 26 directly onto the bale elevator (FIG. 5). In one exemplary embodiment, the support surface of the bale elevator 45 comprises a generally rectangular platform with a length and width sized to sufficiently support a conventional bale 26. However, one of ordinary skill in the art will appreciate that a specific surface area of the bale elevator 45 is not critical as long as the bale elevator can support a bale 26. In one exemplary embodiment, the bale may be delivered by external conveyer to the raised position, eliminating the need for a bale elevator 45.

Figure 4:
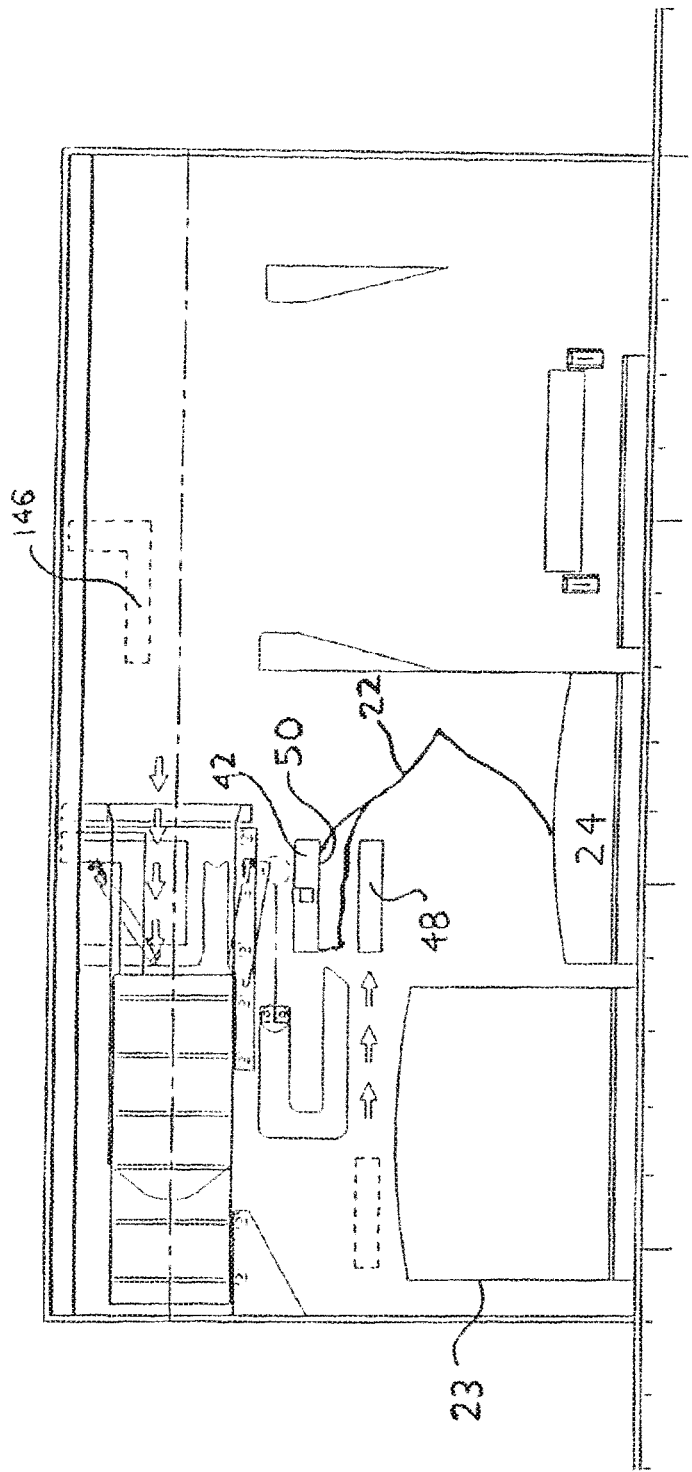

Referring now to FIG. 4, a lower bag separator 48 is located generally away from a line of movement of the bag retriever 42 during the retrieving action of the bag retriever, such as in a stowed position (shown in phantom) near the second bag bin 23. The lower bag separator 48 comprises a head and is laterally moveable on a swing arm, a track, or guide between its stowed position and a use position. Further, the lower bag separator 48 has a bag attachment mechanism, such as a vacuum, suction cups, or any other suitable attachment device, similar to the bag retriever 42. When the bag retriever 42 returns to its initial position with a bag 22 attached to its bottom surface 50, the lower bag separator 48 moves laterally from its stowed position to its use position such that it is spaced from, but generally aligned with the bag retriever 42.

With reference now to FIG. 5, when the lower bag separator 48 reaches its use position, the bag retriever 42 having the bag 22 attached to its bottom surface 50 is lowered toward the lower bag separator, sandwiching the open end 58 of the bag 22 between the bottom surface of the bag retriever and a top surface 52 of the lower bag separator 48. With the bag retriever 42 and the lower bag separator 48 in this configuration, a controller activates the bag attachment mechanism on the top surface 52 of the lower bag separator 48 to allow the lower bag separator to attach to the open end 58 of the bag 22. Movement of the lower bag separator to the used position and subsequent movement of the bag retriever may be implemented using a motorized drive chain or a piston cylinder and through a timer, a proximity switch, a magnetic switch or other devices known in the art can be located and properly sequenced to perform the necessary tasks. In an alternative embodiment, a lower bag separator is not used. Instead, a blast of air or gravity is relied on to permit the lower edge of the bag opening to drop or open to accommodate the arm of the bag positioning assembly, as further discussed below. An exemplary embodiment in which a lower bag separator 48 is not used is disclosed in provisional application Ser. No. 61/118,175, the contents of which were previously incorporated by reference.

Figure 6:
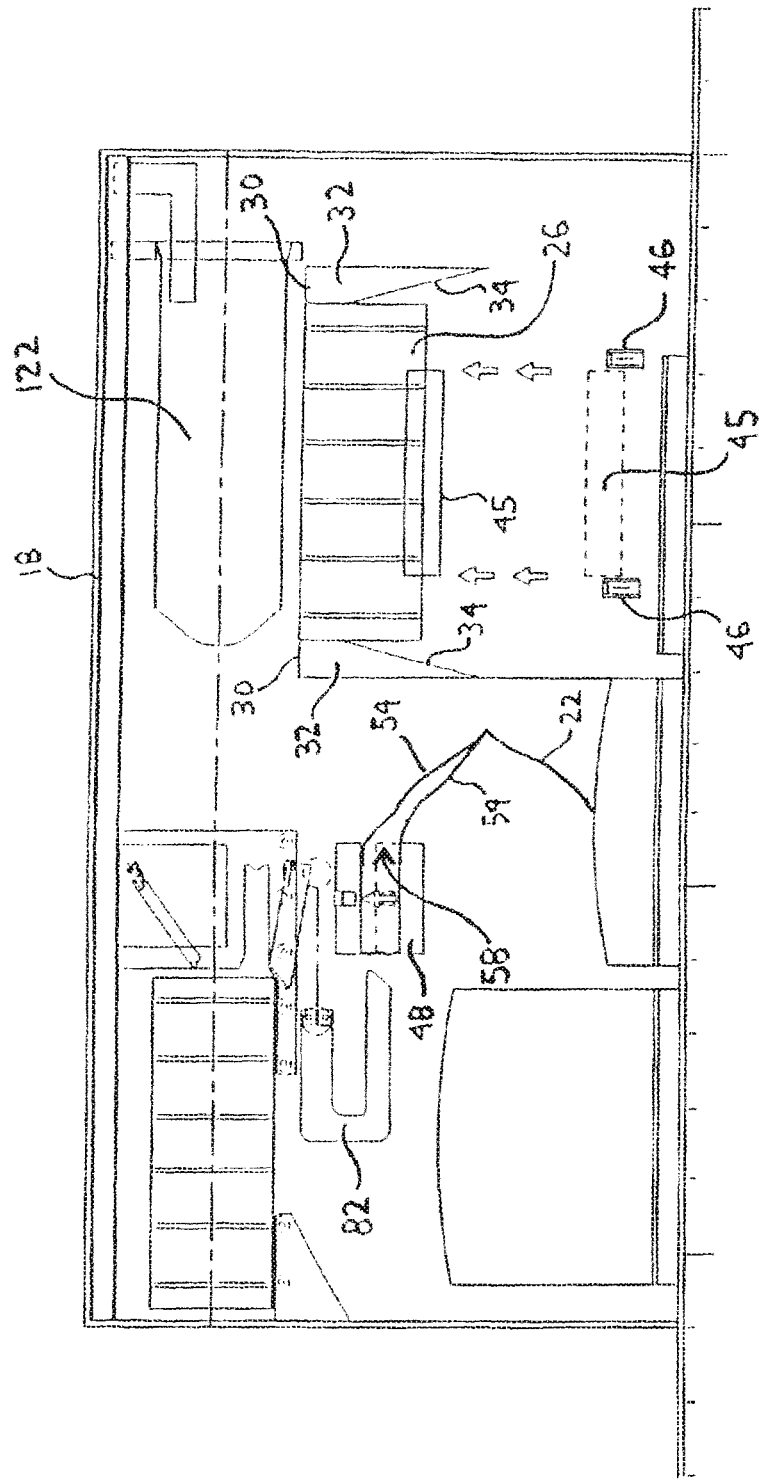

With reference now to FIG. 6, when the open end 58 of the bag 22 is attached to both the bag retriever 42 and the lower bag separator 48, the bag retriever 42 returns to its initial position, thus separating the two sides 54 of the bag and expanding its open end 58. In one embodiment, only part of the open end is opened by the bag retriever 42 and the lower bag separator, i.e., the open end is only partially opened by the device. Thus, if the open end has a width X, the opening is X-Y, which is a smaller increment than X. In one exemplary embodiment, the open end 58 is expanded enough to allow a separator 81 (FIG. 7) to be inserted into the opening of the bag, as described in more detail below. Specifically, the open end 58 of the bag may be opened by an amount in a vertical direction approximately equal to the gap defined by the bag retriever 42 and the lower bag separator 48 (FIG. 6).

As also shown in FIGS. 5 and 6, the bagging assembly 10 includes a pair of opposing bale guides 32 forming a channel 33 through which the bale elevator 45 travels. In one exemplary embodiment, the bale guides 32 are attached to and protrude from a side wall of the housing 12. Each bale guide 32 comprises an angled interior side wall 34 angled towards the channel 33 such that a width of the channel between the bale guides narrowingly tapers in a direction of the top wall 18 of the housing to align the bale as it is raised by the bale elevator. Alternatively or in addition thereto, a second set of bale guides are incorporated in a traverse position to align the bale along the transverse direction. Still alternatively, the assembly does not incorporate any guides and instead rely on a worker or an attendant to manually straighten the bale.

With further reference to FIG. 6, the bale elevator 45 ascends upward from its receiving position to an intermediate position defined in one exemplary embodiment as when a top surface 28 of the bale 26 is generally aligned with a top surface 30 of bale guides 32. More generally, in the intermediate position, the bale 26 does not interfere with movement of a chute 122 for bagging another bale that has previously been raised for bagging, as will be described in more detail below. Thus, an aspect of the present invention is a method for operating a bale bagging assembly comprising the step of raising a pressed bale from a first position to a higher intermediate position, the higher intermediate position being a position in which the upper surface of the pressed bale is lower, elevation-wise, than a traversing stuffing assembly.

Figure 7:
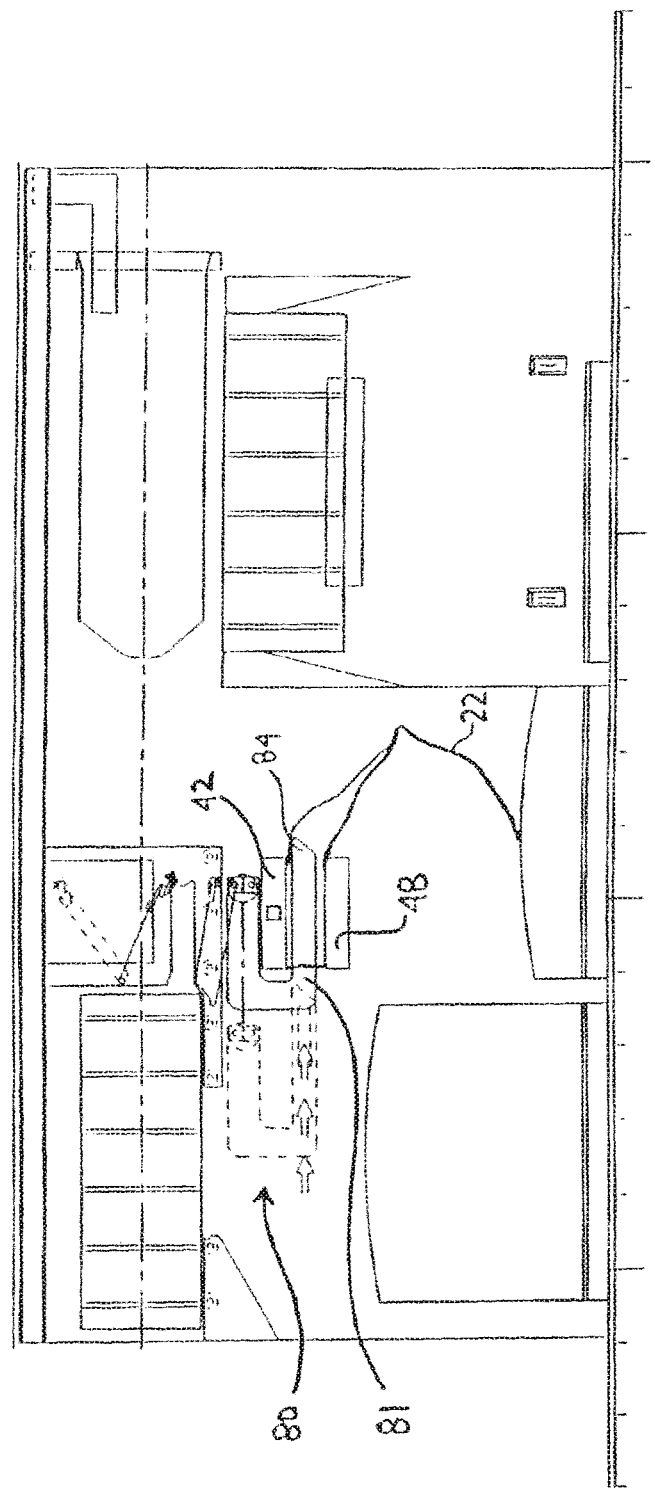
Figure 11A:
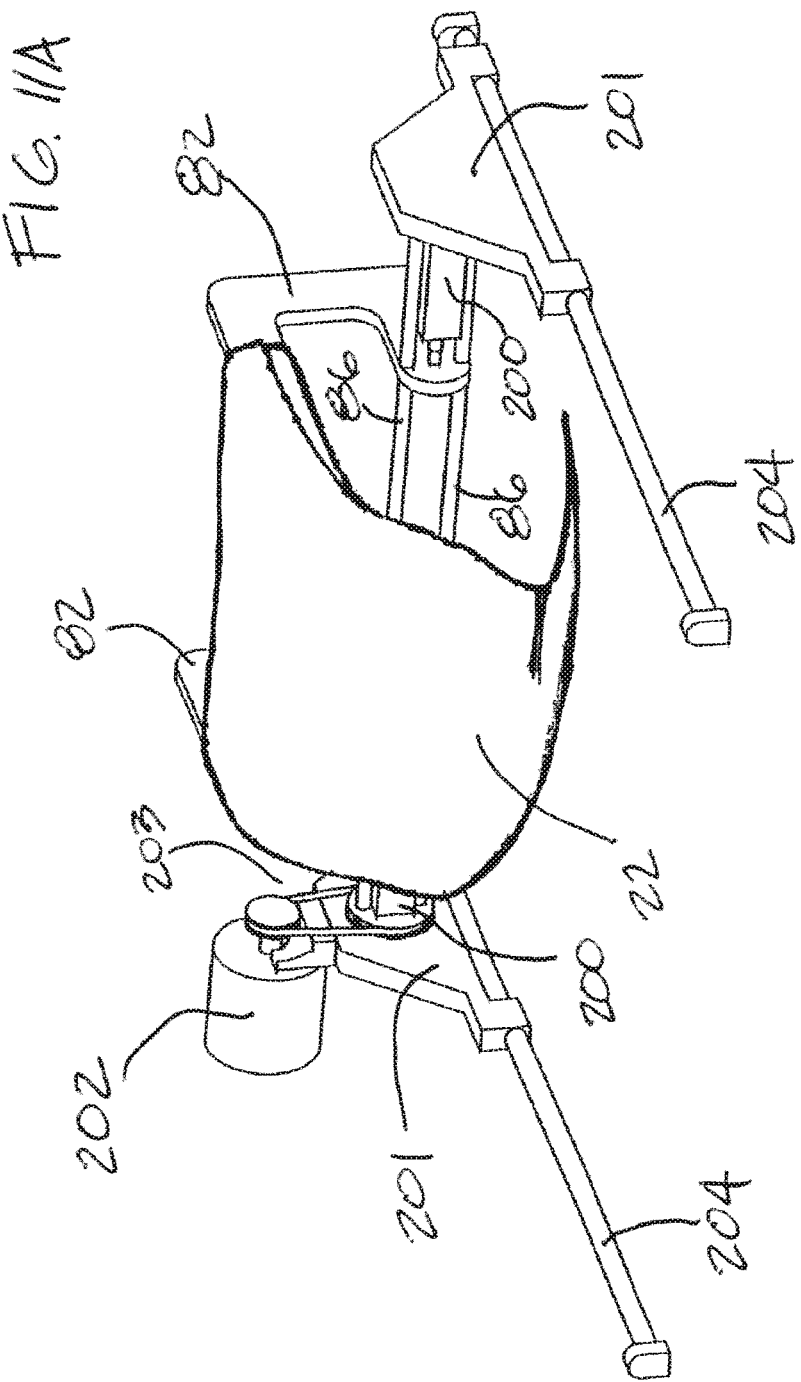
FIG. 11A is a schematic orthogonal view of the positioner of FIG. 8A in a rotated position.

Referring now to FIGS. 7 and 8A-8C, the bag positioning assembly 80 includes a separator 81 having two substantially identical positioning arms 82 attached along rotatable guide rods 86, the positioning arms each having a generally U-shaped configuration in which an upper section is attached to the rotatable rod 86 and a lower section or operating finger 84 is used to fully open the bag, as further discussed below. As shown in FIGS. 7, 8A and 8B, the separator 81 moves from an initial position (FIG. 8A) to an inserted position (FIG. 8B) wherein the operating fingers 84 penetrate the open end 58 of the bag 22 that has been opened by the bag retriever 42 and the lower bag separator 48, or alternatively by a robot arm or a Cartesian coordinate robot in combination with gravity or a burst of air. In a preferred embodiment, the two arms 82 come together so that they touch or almost touch in the initial position to present a relatively small profile to facilitate insertion into the open end of the bag. In one exemplary embodiment, carriages 201 located on opposing sides of the bag positioning assembly 80 provide support for the guide rods 86, a motor 202 and belt 203, and hydraulic or pneumatic cylinders 200 for laterally moving the positioning arms 82, as described in more detail below. The carriages 201 are slidable along a track 204 to move the bag positioning assembly 80 from the initial position to the inserted position. Once the separator 81 is in the inserted position, the positioning arms 82 are separated along the guide rods 86 such that the positioning arms abut opposite sides 54 of the bag 22 in an engaged position, as shown in FIG. 8C. In the engaged position, the bag 22 is tensioned between the positioning arms 82 such that the bag can be manipulated by the separator 81 without disengaging from the separator. In one exemplary embodiment, hydraulic or pneumatic cylinders 200 (FIG. 8A) move the two arms 82 together and apart along the guide rods 86. Alternatively, the arms 82 may be separated and/or brought together by, for example, one or more motorized acme threaded rods, or a rack and gear configuration. Thus, another aspect of the present invention is a bale bagging assembly comprising a bag positioning assembly comprising a separator, wherein said separator comprising two displaceable arms configured to move away from one another to place an open end of a bag in tension.

With reference now to FIGS. 9-11A, the bag attachment mechanisms on the bag retriever 42 and on the lower bag separator 48 are deactivated following positioning of the positioning arms 82 against the two sides of the bag (FIG. 8) with sufficient force so that the bag does not unintentionally separate from the separator 81. It is also possible to expand the position arms 82 outward inside the bag until they come to an external 'outside' plate or stop to then pinch or pin the bag between the positioning arms and the stops. This would prevent the bag from slipping off of the arms. The lower bag separator 48 then returns to its stowed position (FIG. 9) and the separator 81 returns to its initial position (FIG. 10) on carriage 201 with the bag 22 engaged thereto thereby moving the bag to the left of FIG. 9. Note that left and right locations denote two distinct positions, such as a first location or position compared to a second location or position. In one embodiment, the separator 81 is moved sufficiently to the left of FIG. 1 in returning to its initial position so that the bag is unfolded from its folded position when located on the bin. From its initial position, the guide rods 86 (FIG. 8C) are rotated 180 degrees along their longitudinal axis on pivots mounted on carriages 201 (FIGS. 11 and 11A) by the motor 202 and belt 203, thereby rotating the separator 81 so that the open end 58 of the bag faces the chute 122 such that a lower side of the bag is generally aligned with the lower edge of the chute 122. Rotation of the guide rods 86 is accomplished in one exemplary embodiment with the motor 202 and the belt 203, but in alternate embodiments, a rack and gear, pneumatic or hydraulic rotator may also be used.

With reference now to FIGS. 12-13A, an upper bag expansion assembly 90 includes a plurality of upper bag grippers 205 spaced along a rod 212 supported by upper bag expansion arms 214. Similarly, a lower bag expansion assembly 92 includes a plurality of lower bag grippers 206 spaced along a rod 216 supported by lower bag expansion arms 218. The separator 81 advances along the track 204 toward the upper and lower expansion assemblies 90, 92. The relative positions of the opening of the bag and the grippers 205, 206 are such that the upper and lower bag grippers 205, 206 engage the upper and lower sides of the bag 22 between the two positioning arms 82 (FIG. 12A) as the separator move toward the grippers. In one embodiment, one or more sensors (not shown) are used to detect the approaching bag 22 to then stop the advancing motion and toggle the grippers 205, 206 to initiate gripping. However, as one of ordinary skill in the art will appreciate, other means could be used to attach the bag to the expansion assemblies 90, 92, such as a vacuum system. When the upper and lower bag grippers 205, 206 are attached to the bag 22, the positioning arms 82 move toward each other slightly to disengage from the bag, i.e., to release pressure on the sides of the bag. The separator 81 then continues to slide toward the chute by a distance adequate to allow the operating finger 84 of each positioning arm to exit the end of the bag (FIGS. 13 and 13A). In another embodiment, the separator 81 may continue to advance towards the chute to separate from the bag without having to first move the positioning arms 82 together since the width of the bag will reduce when the opening is opened by the upper and lower expansion assemblies and therefore should not cause interference. In one embodiment, the grippers 205, 206 may incorporate frictional features, such as rubber inserts, roughened plastic pieces, etc., to provide a firmer grip around the opening of the bag.

Figure 13C:
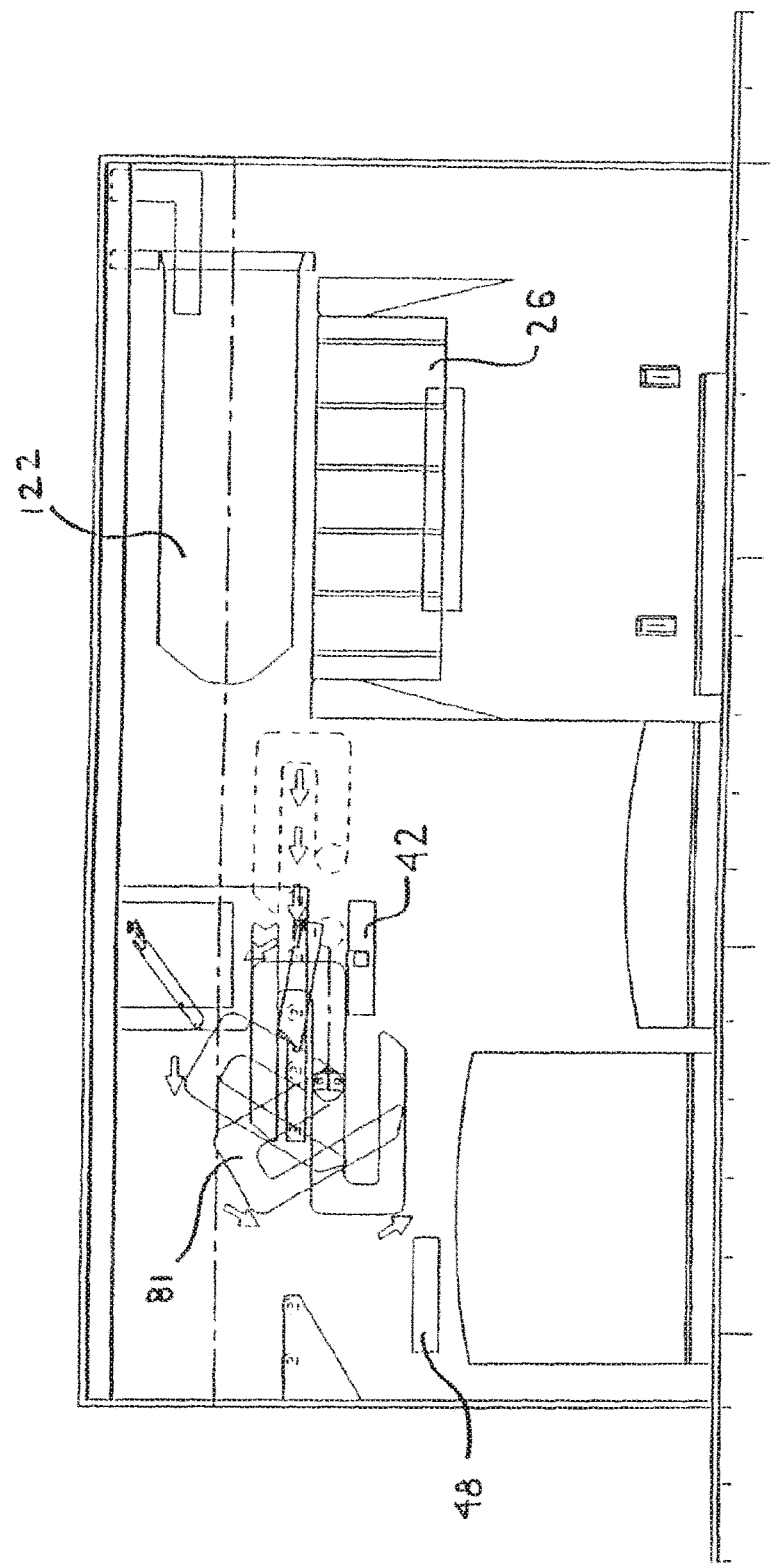

With reference now to FIGS. 13B and 13C, the upper expansion assembly 90 is rotated upwardly towards the top wall 18 to a raised position and the lower expansion assembly 92 is rotated downwardly to a lowered position to widen the open end 58 of the bag 22 so that the bag can be positioned over the chute 122. Simultaneously, the positioning arms 82 move along the guide rods 86 to their full expanded position such that when the separator 81 moves away from the bale guide 32 and is rotated back to its initial position, the arms 82 do not interfere with or become ensnared on the bag 22.

The bag stuffing assembly 120 will now be described with reference to FIGS. 14-15. The bag stuffing assembly 120 comprises the chute 122 moveable into the bag 22 to expand the bag, thereby more easily allowing the bale 26 to be inserted into the bag. Alternatively, the chute may be stationary and the bag moved over the chute. More generically, the chute is located inside the bag. With reference specifically to FIG. 15, in one exemplary embodiment, the chute 122 comprises a base wall 130 and a pair of side walls 132 extending from the base and forming an open-ended channel 134 therebetween. A ledge 136 may extend orthogonally from a top of each side wall 132 partially across a top of the channel to support part of the bag as the bag is placed there over. The channel 134 defined by the base wall 130, side walls 132, and ledge 136 is dimensioned to house a bale 26 therein. A bale receiving area 138 is located at a proximal portion of the chute 122 wherein receiving area sides walls 139 extend outwardly from the side walls 132 to provide a shoulder 141 and a wider channel between the side walls that acts as a funnel to direct the bale into the channel 134. Additionally, a pair of spaced parallel rotatable bars 142 extend between the receiving area side walls 139 to facilitate insertion of the bale into the chute, i.e., the bars rotate as the bale is slid over them. A pair of spaced ribs 144 may extend along an exterior of the receiving area side walls 139 to provide additional resistance to absorb the impact of a bale 26 as the bale is pushed into the chute 122, as will be described in more detail below. In another exemplary embodiment, the ribs 144 are horizontally rotatably mounted on receiving wall 139, permitting the side walls 132 to be rotated toward or away from each other. Rotating the side walls 132 toward each other would ease placing the chute 122 in to the bag 22. The bale 26 would expand the side walls 132 into the bag as the bale 26 is forced into the chute 122. Also, if the bale 26 is larger than a standard bale, the rotation of the side walls 132 would allow the bale 26 to stretch the bag by over-expanding the side walls 132.

Although a typical bale chute is described herein, the chute 122 may embody any suitable configuration, such as a single piece composed of multiple longitudinal rods or plates comprising a soft piece of plastic or fabric. For example, a single piece chute as shown in FIGS. 18 and 19 may be used, as further discussed below. Still further, any device that would allow the bag 22 to be pulled onto the bale 26 while keeping the bag from excessive dragging forces on the surfaces of the bale may be used.

With reference again to FIG. 14 and also to FIG. 14A, the chute 122 is mounted on a rail 150, preferably one on each side wall of the chute, to be moveable from an initial position (shown in phantom) to a loaded position at least partially inside the bag in which at least some of the side walls 132 of the chute are located within the bag 22 and the shoulder 141 generally abuts the open end of the bag. In the loaded position, the base wall 130 of the chute 122 is located proximate center support 224 such that when the chute is removed, the bagged bale 26 will rest on the center support. Although the side walls 132 are of a length such that they extend significantly within the bag 22, it is not necessary for the chute 122 to extend into an entire length of the bag to affect its intended purpose. Rather, the bale 26 enters the bag with enough speed to expand a portion of the bag that may not have been expanded by the chute 122. However, even when moving at a slower speed, the size of the bale relative to the size of the bag will cause the bag to expand.

Figure 16B:
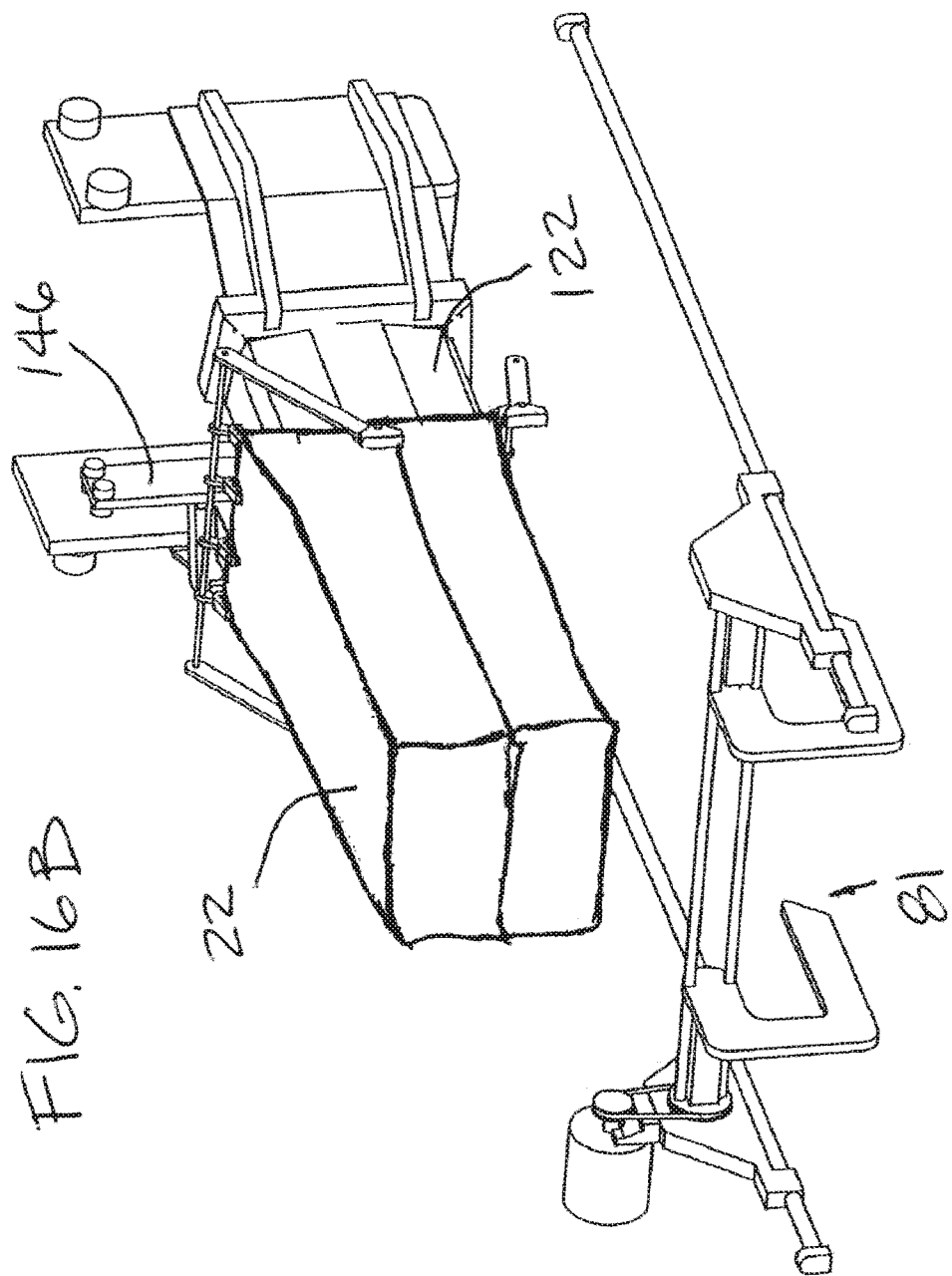
Figure 16C:
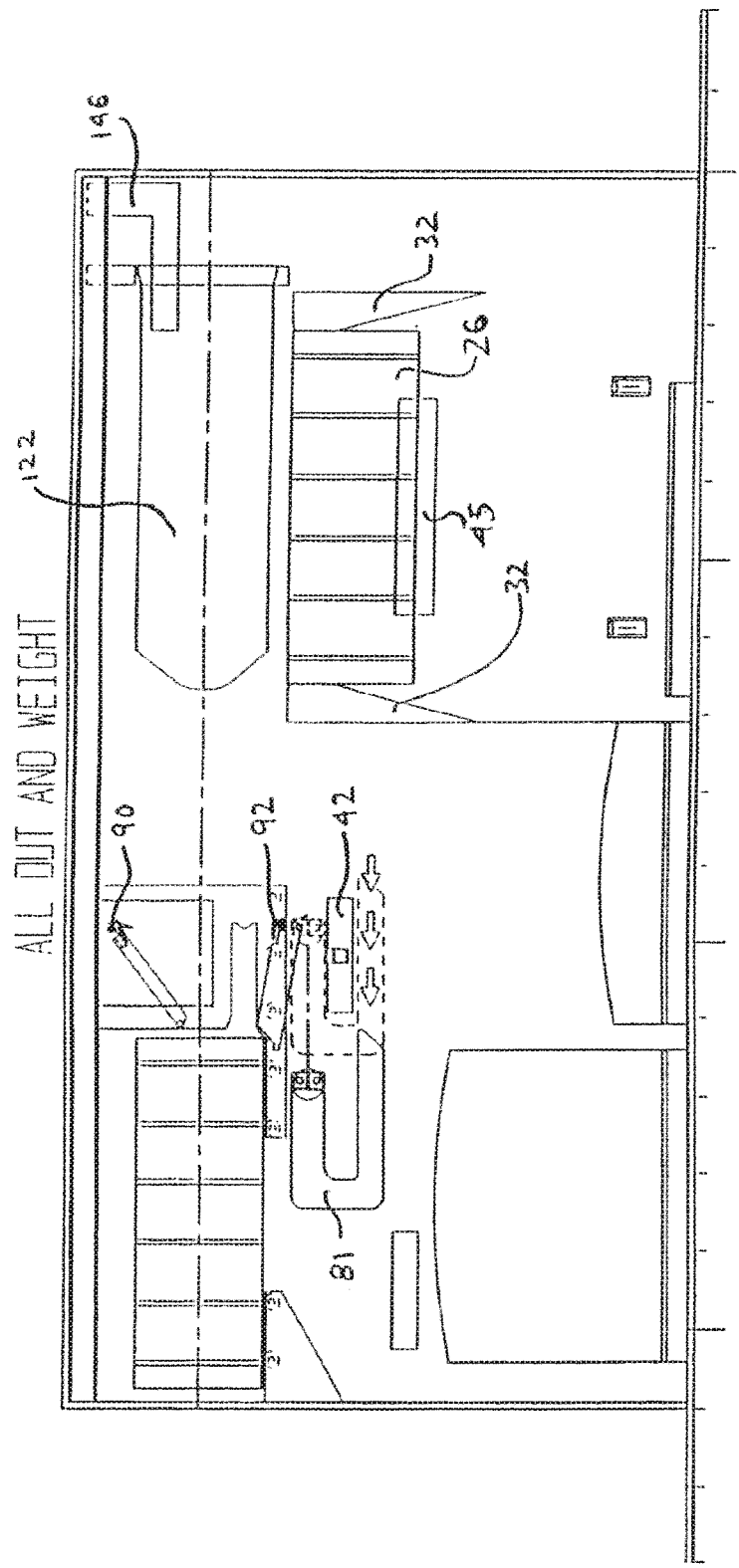
FIG. 16C is a side view of a bagging step of bagging a bale according to aspects of the present invention.

With reference now to FIG. 16-16C, as the chute 122 moves from its initial position to its loaded position, the bale elevator 45 ascends from its intermediate position to its upper delivery position. Thus, the chute may be viewed as an expander for expanding the bag and serves as a funnel to allow the bale to be stuffed into the bag. Additionally, its movement over to the loaded position provides clearance or space for the elevator to raise the bale. A stuffing arm assembly 146 is used to stuff the bale into the chute. In one exemplary embodiment, the stuffing arm assembly 146 comprises a combination motor, gear and chain system and configured to drive a generally L-shaped bracket. The L-shaped bracket is movable along a rail 150 extending along the top wall 18 housing 12. With reference again to FIGS. 1 and 3, the stuffing arm assembly 146 pushes the bale 26 from the bale elevator 45 through the bale receiving area 138 and into the channel 134 of the chute 122 (FIG. 16B), such that the entire bale is within the bag. With reference to FIG. 16C, once the bale 26 has been bagged, the chute 122 retreats to its initial position, to the right of FIG. 16C, while the stuffing arm remains in place to provide an opposing force against the retracting chute. When the chute 122 retreats to its initial position, the bagged bale 26 rests on the rear support 222 and a center support 224 so that the open end of the bag can be stapled closed.

In another exemplary embodiment, the chute 122 may be substantially stationary and the upper bag expansion assembly 90, and the lower bag expansion assembly 92, would be movable along a track, guide, or other means to pull the bag onto the chute. Once the bale 26 has been pushed into the bag, the bale pusher 146 would push the bale out of the chute 122, with the upper and lower expansion arms 90, 92, moving along a track or guide to follow the bale while continuing to grip the edge of the bag. Once clear of the chute, the stuffing arm assembly 146 would retract and the bag could be closed as described herein.

In yet another exemplary embodiment, the bale 26 may be substantially stationary and the upper bag expansion assembly 90, and the lower bag expansion assembly 92, would be movable along a track, guide, or other means to pull the bag onto the chute 122. The chute 122 and the bag, held in place by the upper and lower expansion arms 90, 92, would move together to pull the bag onto the bale 26, held in place by the stuffing arm assembly 146. The chute may then be separated from the bag while the upper and lower expansion arms 90, 92, remain attached to the bag to allow sealing of the bale as described herein once the stuffing arm assembly retracted.

In still another exemplary embodiment, the chute assembly 122 may move into the bag expanded by the upper and lower expansion arms 90, 92, then move over the bale 26, pulling the bag onto the bale 26 with the expansion arms following the bag. Then the bale may be pushed out of the chute 122 by the stuffing arm assembly 146, with the expansion arms following the bag and bale. Once the bale has exited the chute, the upper and lower expansion arms 90, 92, remaining attached to the bag on the bale, the stuffing arm assembly 146 may retract to allow the bag to be sealed as described herein.

With reference now to FIGS. 16D-16K, a sealing or enclosing assembly 160 for closing the open end of the bag 22 is provided in accordance with aspects of the present invention. With reference to FIG. 16D, a pair of opposite sealing plates 162 is laterally movable to engage an open end 58 of the bag 22, which is still held open by the upper and lower expansion assemblies 90, 92. In one exemplary embodiment, the sealing plates 162 are generally configured to have a height substantially equal to or slightly smaller than the height of the bale 26. A leading edge 164 of each sealing plate 162 may be tapered to reduce the likelihood that the sealing plate will tear the bag 22 during the sealing process, as described in more detail below. Additionally, each sealing plate 162 contains a notch or a hole 166 through which a staple 154 may be inserted during the sealing process. The stuffing arm assembly 146 includes a base arm 168 extending from the rail 150 (FIG. 16) in a first direction for moving the stuffing arm assembly, a cross arm 170 extending generally perpendicularly to the base arm from an end of the base arm in a second direction, and a pair of staplers 172 extending from the cross arm in a third direction. The staplers 172 are adapted to receive a staple magazine 174 containing a staple supply. Alternatively, a single staple may be used with each stapler, one at a time, instead of a magazine. Additionally, the staplers 172 may serve to stuff the bale into the bag or be mounted on the stuffing arm assembly 146 as described above.

Figure 16F:
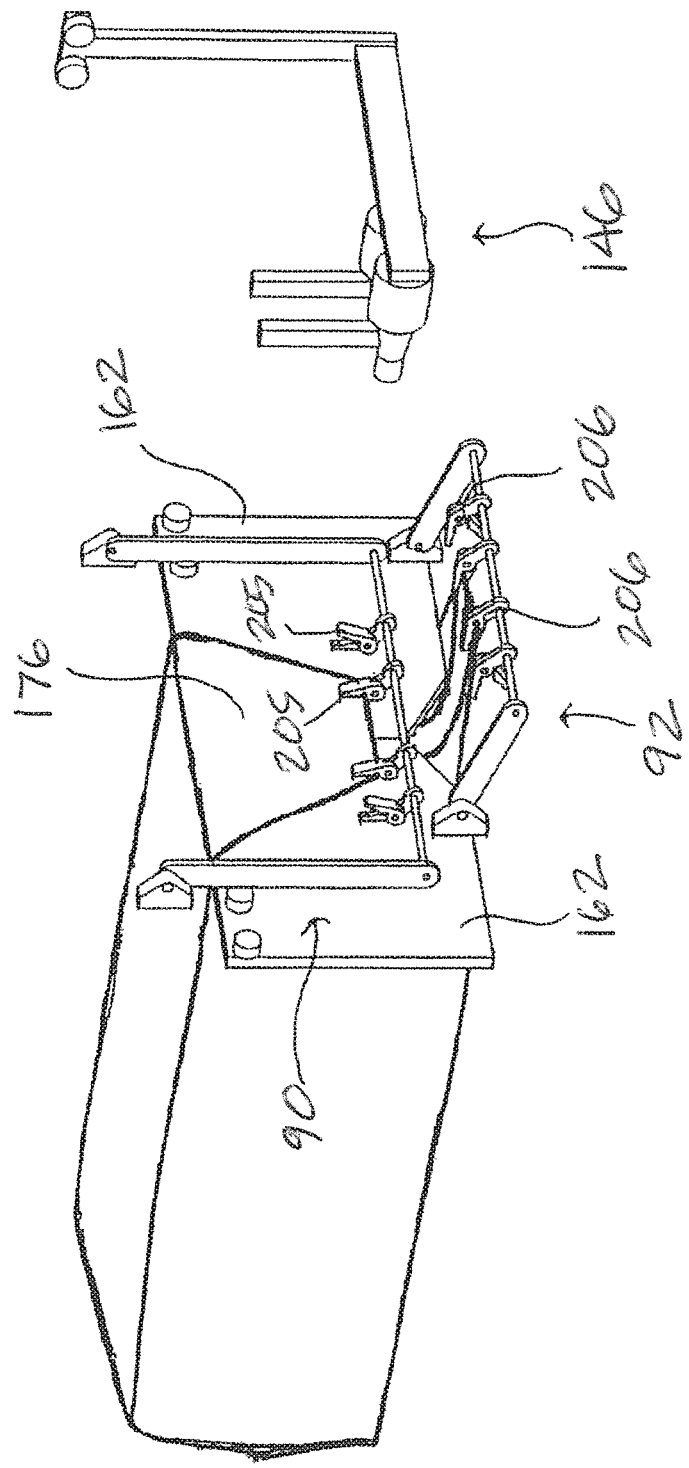
Figure 16G:
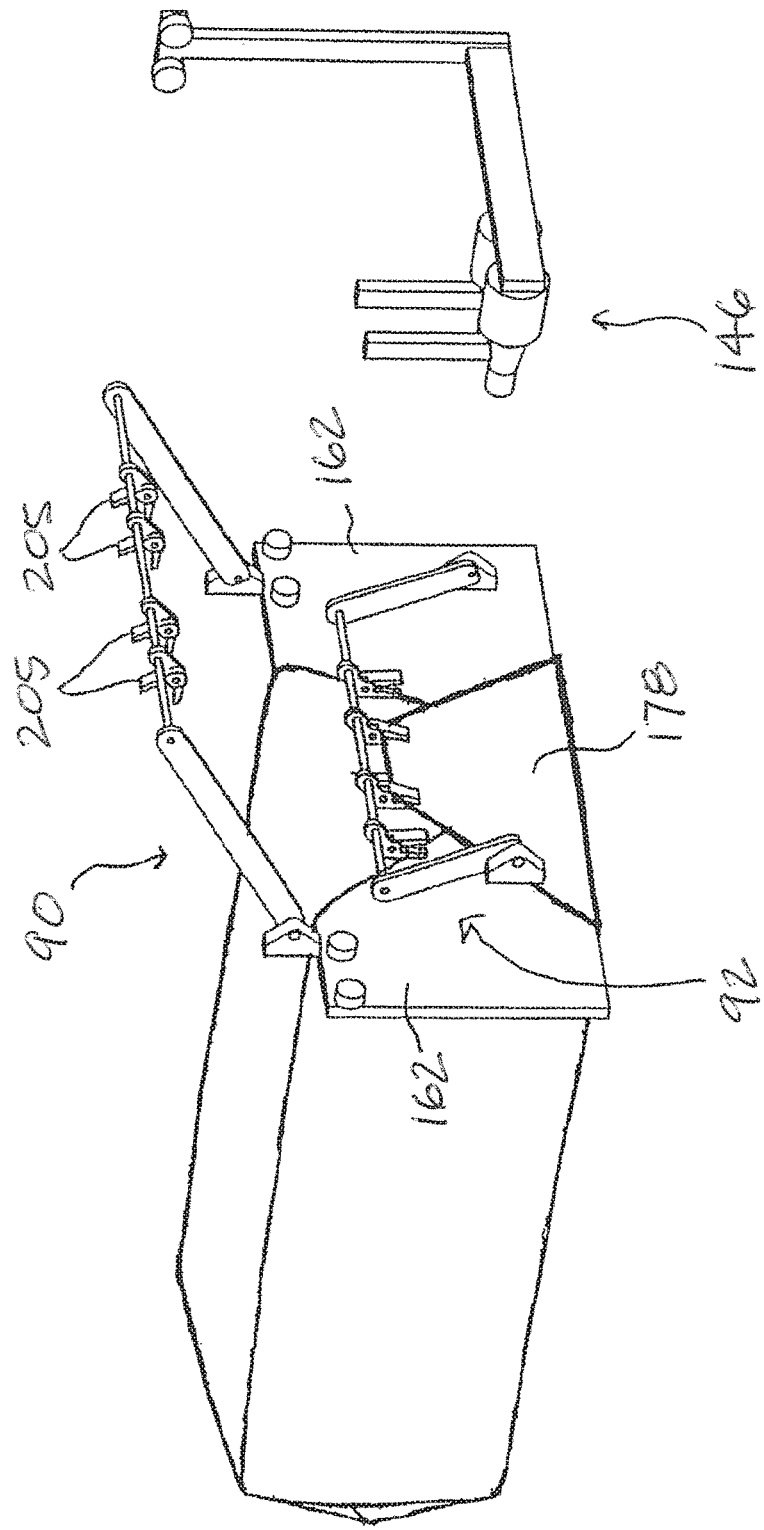

Operation of the sealing assembly 160 will now be described with reference to FIGS. 16D-16K. Generally, the open end 58 of the bag is folded similarly to wrapping a box with wrapping paper. More specifically, as shown in FIG. 16D, the upper and lower bag expansion assemblies 90, 92 are attached to edges of the bag 22 to provide an open end 58 through which the bale 26 has been inserted. The sealing plates are located laterally from the bag 22 generally aligned with an end of the bale proximate the open end 58 of the bag. Although omitted for clarity, the sealing plates 162 are laterally movable toward and away from the bag 22 on, for example, rails, guides, a track, or other known mechanical attachment devices. With reference now to FIG. 16E, the sealing plates 162 are moved toward each other such that the leading edge 164 of each plate contacts the side of the bag 22 and folds it around the bale and toward a center of the bag. In one exemplary embodiment, as the sealing plates 162 fold the sides of the bag 22 inwardly, the outermost upper and lower bag grippers 205, 206 are opened to release their grip on the bag to allow a sufficient amount of the bag to be folded, while the inner upper and lower bag grippers maintain a grip on the bag. Further, the sealing plates 162 may be moved until the leading edges 164 on each plate abut each other and the notches 166 form a single opening in substantially a center of the edge of the bag 22. As shown in FIG. 16F, the upper bag expansion assembly 90 is moved from a raised position to a lowered position such that a top edge 176 of the bag 22 is folded over the sealing plates, and more particularly, over the notches 166 in the sealing plates. With reference to FIG. 16G, the upper bag grippers 205 are released from the bag 22 and the upper bag expansion assembly 90 is moved back to the raised position as the lower bag expansion assembly 92 is moved from a lowered position to a raised position, folding a bottom edge 178 of the bag over the sealing plates 162 and over the notches 166 in the sealing plates.

As shown in FIG. 16H, the stuffing arm assembly 146 is then moved toward the bag 22 and the staplers 172 are aligned with the notches 166 located between folded sides of the bag, which as previously disclosed may be circular or have other shapes instead of notches. In one exemplary embodiment, each stapler 172 inserts one staple into the bag 22. However, one of skill in the art will appreciate that only one staple may be used, or that more than two staples may be used. With reference now to FIGS. 16I-16K, the stuffing arm assembly 146 retreats from the stapled bale 22 (FIG. 16I), the lower bag grippers 206 are opened to release their grip from the edge of the bag, and the lower bag expansion assembly 92 is moved to the lowered position (FIG. 16J), and the plates are moved laterally outwardly to be disengaged from the bag 22. Once the bag has been sealed as described above, the bag may be pushed by the bag stuffing assembly 146 out of the bale bagger onto a conveyor from where it can be further transported.

With reference now to FIGS. 17a-17f, exemplary staples 154a-154f for use with the stapling assembly 152 are shown. Staple 154a will be described in detail, but it will be understood that although certain dimensions of the staples 154 may vary, each staple has a generally similar shape. With reference to FIGS. 17a and 17b, the staple 154a may have a generally flat side profile and a tip 160 tapering to a point. In an unused state, each staple 154 comprises a base 156 from which two prongs 158 extend generally orthogonal to the base and the sharpened tip 160 is formed at an end of each prong configured to pierce the bag 122. For example, such tip 160 may include two angled sides (e.g., FIG. 17b) or a single angled side (e.g., FIG. 17e) with respect to a side of the staple. Additionally a barb 162 may be formed on each prong 158 such that the barbs face each other on an interior side of the staple. In one exemplary embodiment, the staples 154 are made from a polymeric material such as nylon or other plastics, but the staples may also be composed of metal.

In a further aspect of the present invention, a method is provided for enclosing a bag having a pressed bale positioned therein, the method comprising folding the opening of the bag so that sections of the bag near the opening overlap, and using a stapler to discharge a staple into the overlapped sections of the opening. Preferably, the staple has an elongated prong and at least one barb on the prong to hook the overlapped sections of the bag and/or the pressed bale. More preferably, the staple has a base and two elongated prongs each with at least one barb for hooking the overlapped sections of the bag and/or the pressed bale. In one embodiment, the stapling may be performed automatically as disclosed with reference to FIGS. 16D-16K or it may be done manually with a handheld or manually operated stapling gun.

With reference again to FIG. 1, after the bale is bagged and stapled, it is further pushed by the stuffing assembly 120 towards the exit end wall 16 to a lowering elevator (shown schematically only in FIG. 11). For example, the end wall may have an opening sized to permit the bagged bale to exit the bagging assembly. In one embodiment, the lowering elevator comprises a platform pivotably mounted to the housing. The platform further comprises one or more rollers to facilitate placement of the bagged bale thereon when pushed by the stuffing assembly. To lower the bagged bale from the elevated position so it can then be processed or shipped, two or more actuated cylinders are used to pivot the platform so that an edge of the platform located away from the housing is pivot downward to lower the bagged bale. A conveyor system, a palette, or other movable means may be used to then move the bagged bale away from the housing for further processing.

Referring now to FIGS. 18 and 19, an alternative chute 230 for facilitating insertion of a strapped bale into a bag for bagging the bale are shown. The alternative chute 230 may be used with the bagging assembly 10 of the present invention, for example, as a replacement for the chute 122 shown and described elsewhere herein. In one embodiment, the alternative chute or simply "chute 230" is singularly formed from a rolled metal sheet or plate 240. For example, the metal sheet or plate may be cut along various seams with pre-configured contours so that after the cut sheet or plate is rolled, it produces a chute comprising a flared receiving end 232 and a low profile exit end 234.

In a particular embodiment, the chute 230 comprises a continuously formed center section 236 and two side sections 238 formed by bending the sheet or plate 240 along two seams 242. The sheet or plate 240 also includes a plurality of cuts or notches 244 for forming flared sections of the flared receiving end 232 to facilitate alignment and reception of the strapped bale. The two side sections 238 may additionally function as mounting flanges by incorporating a bolt pattern 246 for mounting onto a bracket that is in turn mounted to a drive system for traversing the chute between a home position (FIG. 5) and a used or stuffing position (FIG. 4). The chute is preferably arranged similar to a U shape with the open channel of the U facing up and the continuous center section of the U facing down.

Referring specifically to FIG. 18, the two side sections 238 are provided with rounded corners 246 that tapered or inclined along a side edge 248 to an apex 250. The apex 250 is located on a section of the side wall 238 that is flared radially outwardly. The flared section of the side wall allows the chute to push a bag outwardly for easier insertion of the strapped bale. The flared section also creates a space or gap between the bag and the chute to further allow air to be purged from the interior cavity of the bag as the bale is pushed therein.

With reference to FIGS. 18 and 19 and also to FIGS. 12-14A for a description on the use of the alternative chute 230, the chute 230 is designed to operate with the upper and lower bagging assemblies 90, 92 to arrange a bag over the chute. As previously discussed, after the grippers 205, 206 on the upper and lower bagging assemblies 90, 92 grip the opening of the bag and expand the opening, the chute 230 is programmed to move into the bag with the grippers continuing to hold the bag open with the bag moving over a stationary chute contemplated. In a preferred embodiment, chute 230 is inserted into the bag and stops at about a point where the perimeter of the bag is at the transition or interface near the apex 250 of the flared section. This allows the strapped bale to contact the flared section of the chute before coming into contact with the bag, which reduces possible snaring. In another embodiment, due to the manner in which the chute is mounted to a movable bracket, the chute is configured to be inserted until the left bolt pattern 252 come in contact with the bag. The remaining steps for completing the bagging and stapling cycles may be repeated as discussed above.

Referring again to FIGS. 18 and 19, the chute 230 may be viewed as an insertion chute. As bales are more uniformly pressed and strapped in some markets, it is useful to simplify a bagging system by using a chute that is no more than a tray or a bale support with little or no vertical sides to facilitate inserting the bale into a bag, which is also available in bulk with consistent size. Thus, a complex chute is not required to accommodate varying bale sizes. Instead, a tray may be used to simply get an end of a bale into an open end of the bag wherein the bale comprises a support structure having a center section for supporting a pressed bale and two side walls extending upwardly therefrom.

In another embodiment, a bag may be pulled over a bale located on an insertion tray while keeping the tray and the bale stationary. As another alternative, both the bag and the combination tray and bale may be moved in unison during the bagging process. The bag only needs to be big enough to allow the bale to slip into the open end of the bag. Alternatively, the bag may be made of a material that allows it to stretch a needed amount to accommodate the bale. The insertion tray allows for a smaller cross section to be initially started into the bag to open the bag, thus reducing hang ups or snagging of the bag on the tray as the mechanism is inserted into the bag. The insertion tray allows for simplified mechanics which is desirable. Because the vertical sides are not substantially needed for bagging purposes, they can be shaped to aid placing a bag over the chute if desired. Such as a leading edge that has soft, broad contours. If side walls are employed and because they are fixed in nature with only material flexibility, identification stickers or placards may be placed thereon to be transferred to the bag before the chute is removed. Because the chute side will substantially be placed in the same location repeatedly every cycle, if desired, automatic marking equipment can be employed with simplified mechanisms.

Figure 21:
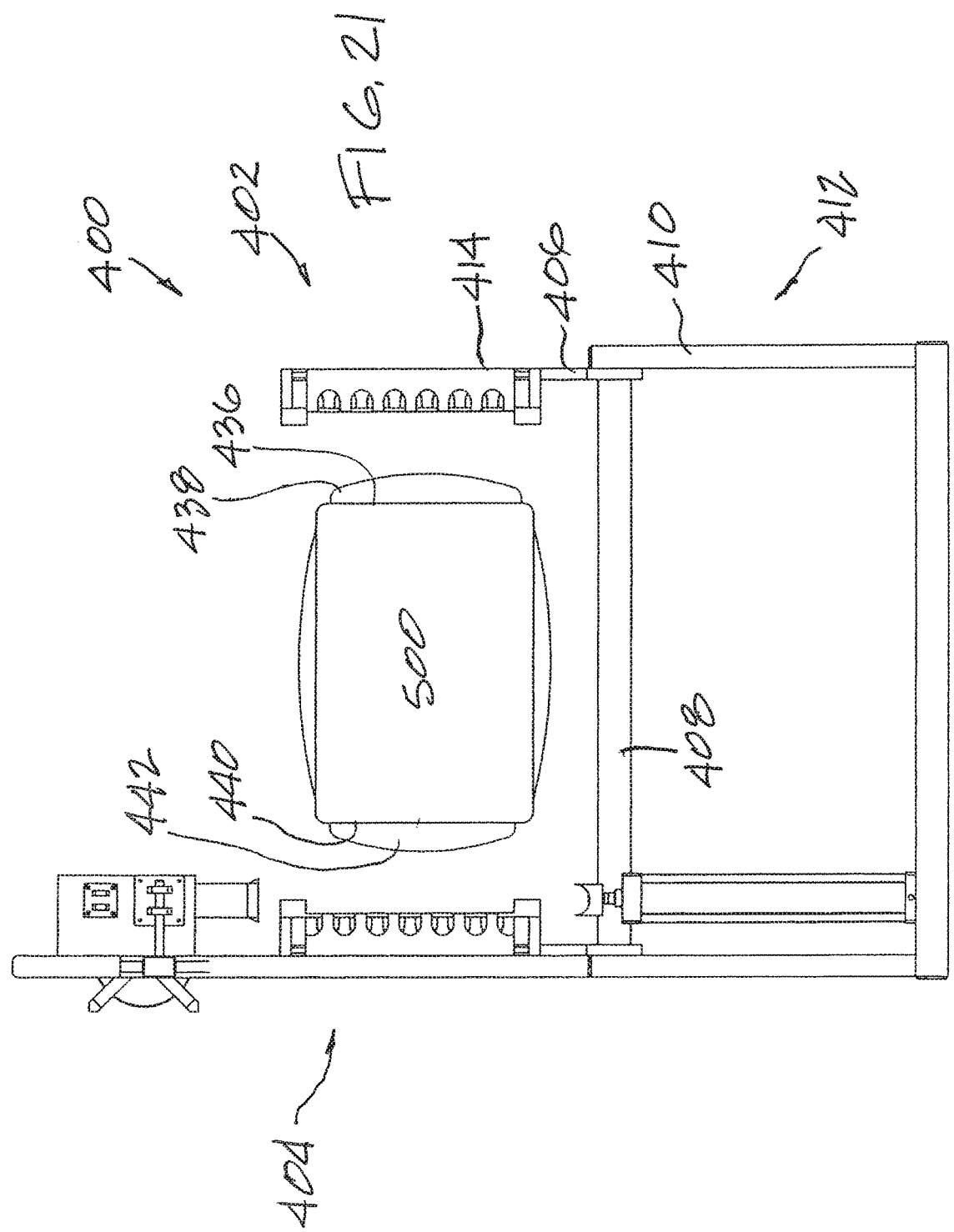
FIG. 21 is an end view of the bale sampler of FIG. 20.
Figure 22:
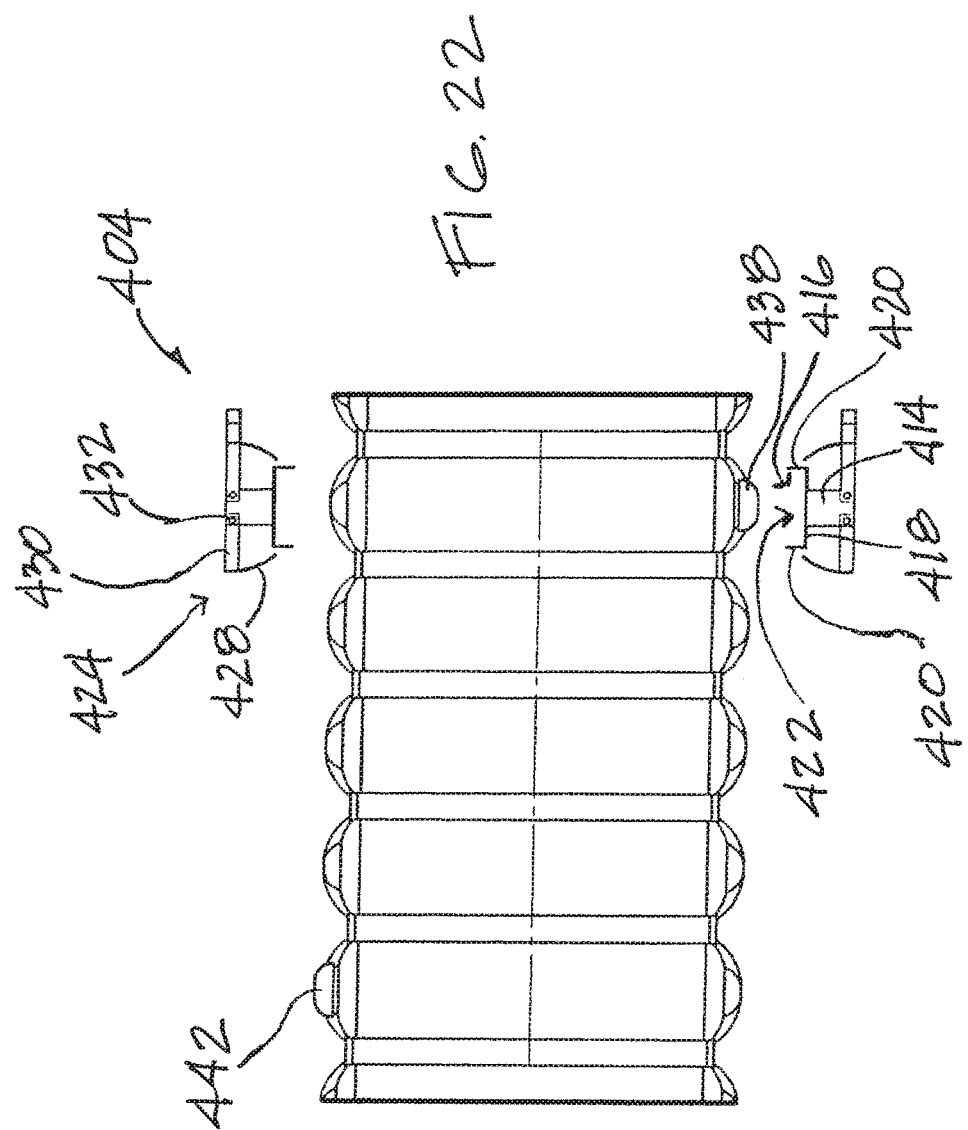
FIG. 22 is a top schematic view of a sampling assembly of the bale sampler of FIG. 20 with first and second grippers in an open position.

Furthers aspects of the bale sampling device or assembly 400 of FIG. 20 will now be discussed with reference to FIGS. 21-25. With reference initially to FIGS. 21 and 22, the sampling assembly 400 comprises a first gripper 402 and a second gripper 404 with each gripper adapted to remove a sample from a respective side of the bale 500 on the conveyor (FIG. 20). For clarity, the conveyor is not shown in FIG. 21 or 22. The first and second grippers 402, 404 face each other and have a substantially similar configuration. Therefore, only the first gripper 402 will be described in detail and it will be appreciated that the second gripper 404 will have substantially similar features. The first gripper 402 comprises a base 406 movably mounted on a track 408 traversing the two vertical frame portions 410 and extends generally parallel to the horizontal frame portion 412. In one exemplary embodiment, the base 406 has a through hole through which the track 408 extends, thereby allowing the first gripper 402 to slide along the track 408. A spine 414 extends vertically from the base 406, the spine supporting a sample bay 416 (FIG. 22) centrally disposed along a longitudinal axis of the spine. The sample bay 416 comprises a base wall 418 and two side walls 420 extending from the base wall to form a generally U-shaped channel 422 for receiving and collecting a sample of fibrous material.

Figure 23:
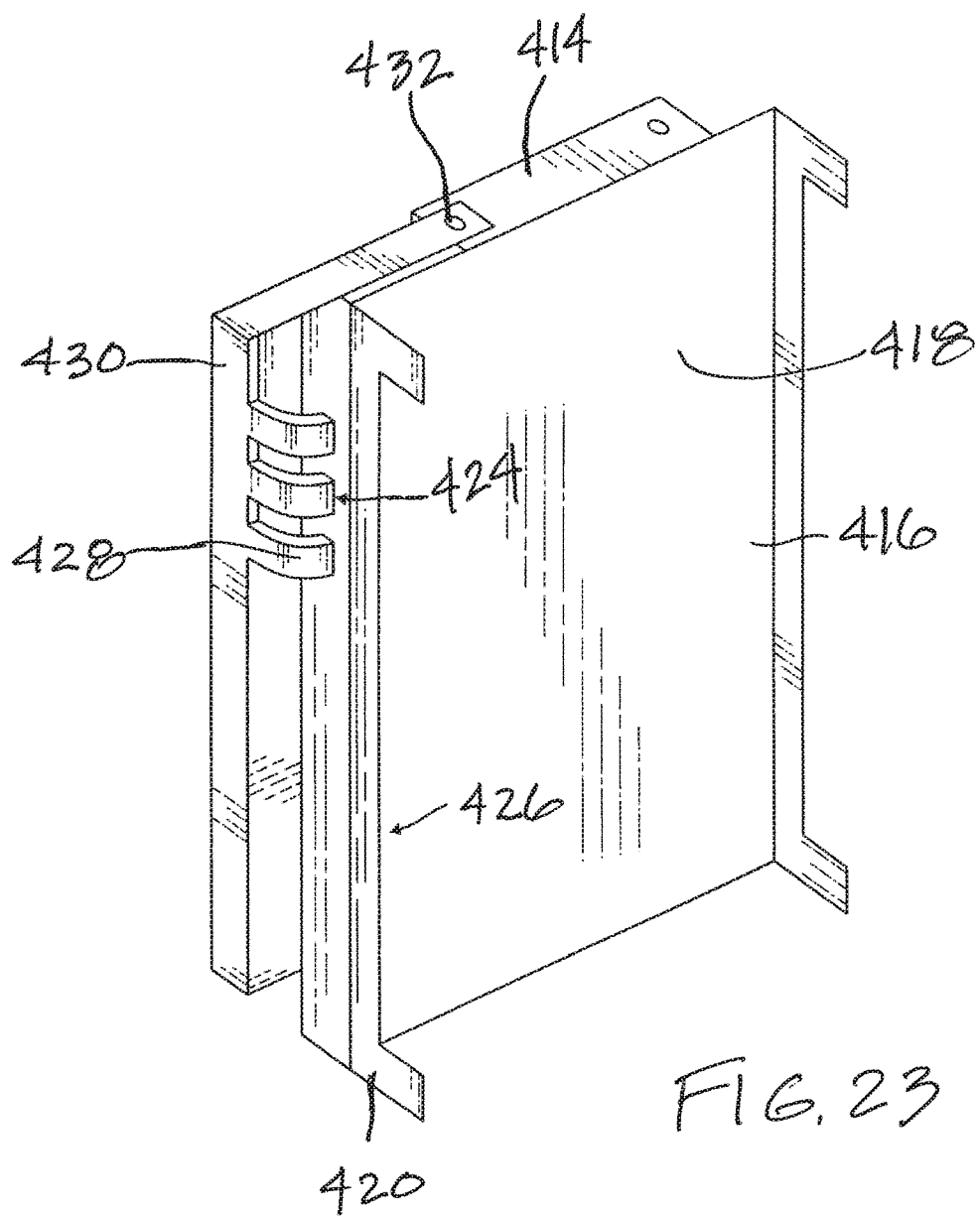
FIG. 23 is a schematic orthogonal view of an exemplary gripper according to aspects of the present invention.
Figure 24:
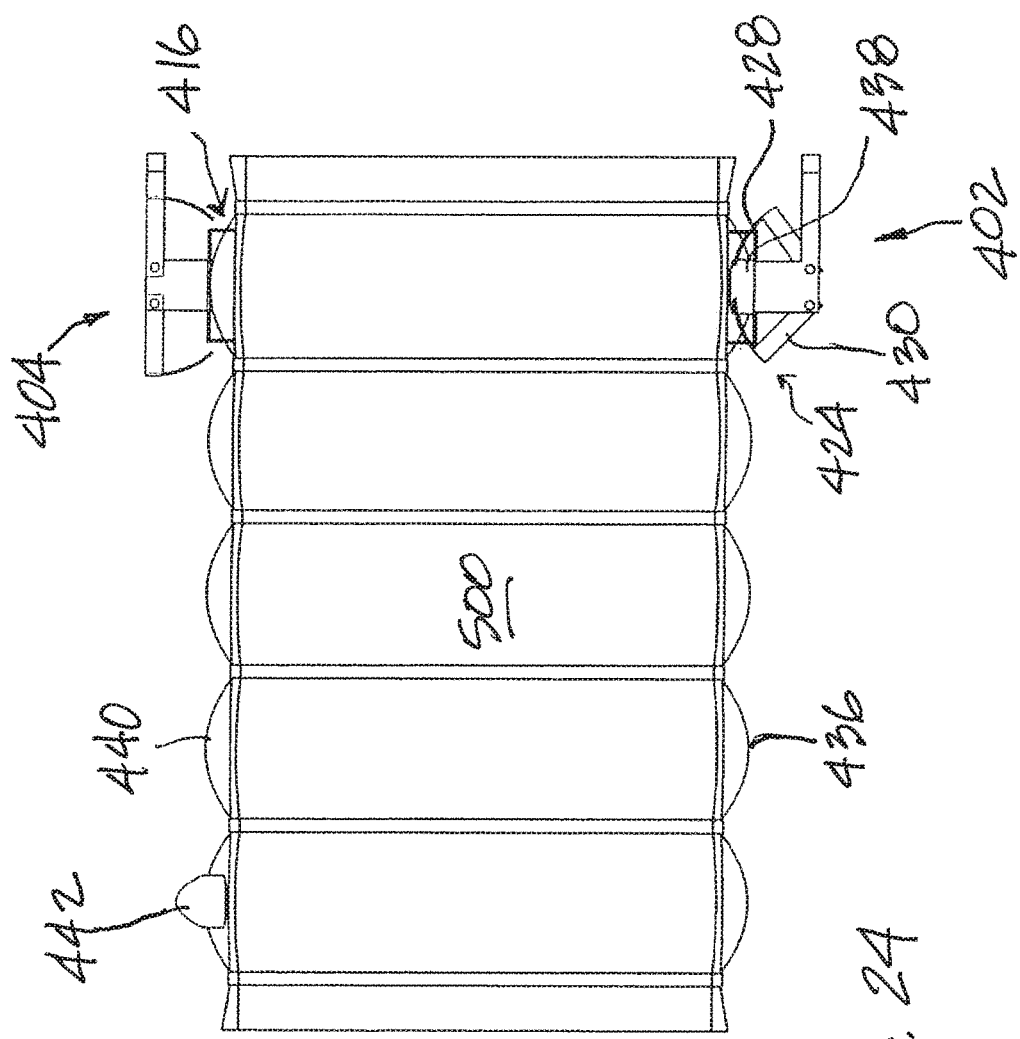
FIG. 24 is a top schematic view of a sampling assembly of the bale sampler of FIG. 20 with one gripper in a closed position and another gripper in an open position.

With reference now also to FIG. 23, the side walls 420 are dimensioned to allow fingers 424 to pass therethrough, and, in one exemplary embodiment, the side walls have a cutaway section 426 through which the fingers 424 can pass. Thus, in the embodiment shown, the side walls 420 are generally U-shaped in configuration. Each gripper 402, 404, with only one shown in FIG. 23, has two sets of fingers 424 extending along opposite sides of the sample bay 416. In one exemplary embodiment, the fingers 424 on opposing sides of the gripper 402 alternate such that in an engaged position, as described in more detail below, the fingers sequentially receive adjacent fingers similar to the manner in which the fingers on two hands of a person clasp together. The fingers 424 have an arcuate section 428 extending from a base section 430 and are rotatably secured to the spine 414 by pins 432 to allow them to be moved between an open position and the engaged position. In the open position, as shown in FIG. 22, the fingers 424 permit the sample bay 416 of the grippers 402, 404 to abut a sampling section of the bale 500 such that a sample may be taken. In one exemplary embodiment, in the open position the base section 430 of the fingers 424 is generally parallel to the base wall 418 of the sample bay 416 and the arcuate section 428 does not protrude through the cut away section 426. In the engaged position (FIG. 24), the fingers 424 are rotated radially towards the sample bay 416 such that the arcuate section 428 of each finger 424 penetrates the cut away section 426 and forms a generally enclosed area with the base wall 418 of the sample bay to house a sample, as will be described in more detail below. The present bale sampler 400 is configured to grab two samples from sides of a strapped bale that have been pre-cut during the pressing process. However, as presently contemplated, the cuts may be performed by the bale sampler 400 as taught elsewhere herein.

Figure 25:
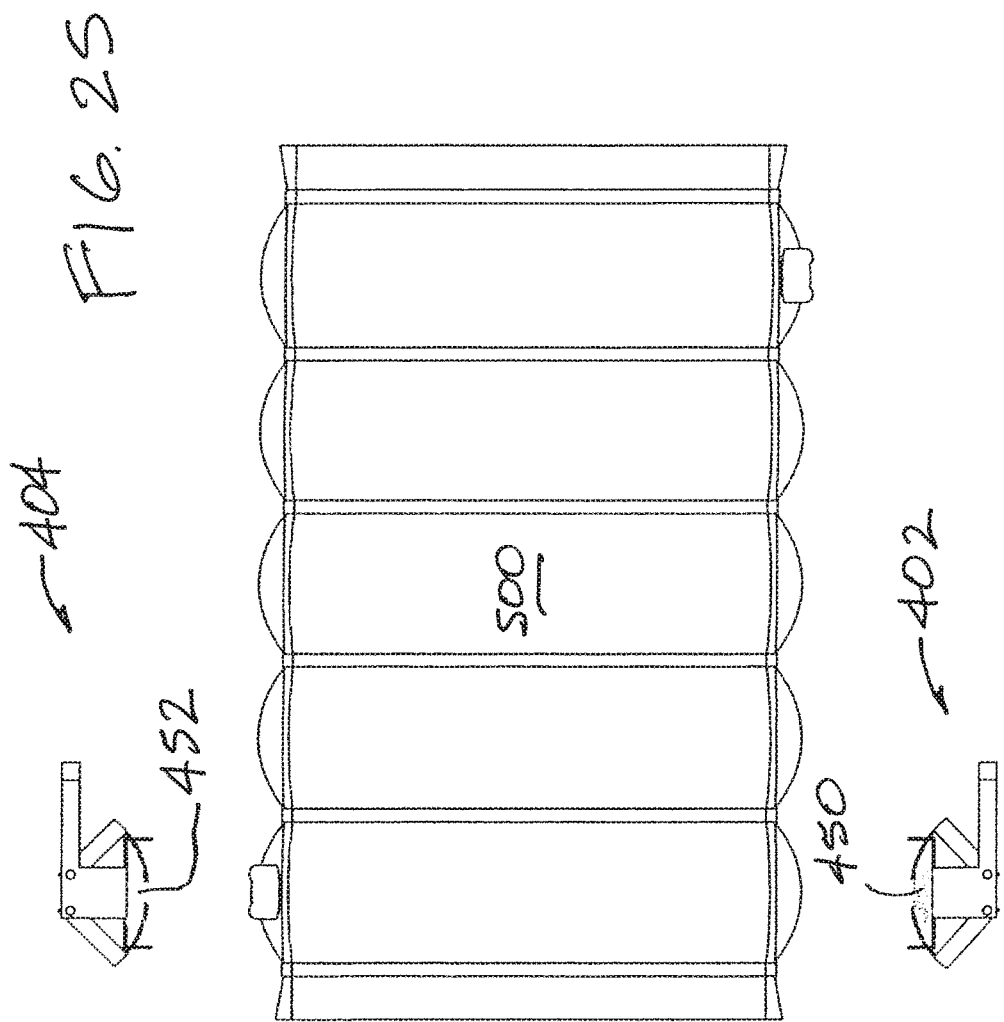
FIG. 25 is a top schematic view of a sampling assembly of the bale sampler of FIG. 20 with first and second grippers in a closed position.

The operation of obtaining a sample using the sampling assembly 400 will now be described. As shown in FIGS. 20 and 21, the strapped bale 500 is positioned on the rotating cylinders of the first conveyor. The bale 500 has a first side 436 having a pre-cut section 438 from which a sample may be taken and a second side 440 also having a pre-cut section 442 from which a sample may be taken. Since the bale 500 is compressed and strapped, the fibrous material is under relatively high pressure. As such, the pre-cut sections 438, 442 tend to protrude from the sides 436, 440, respectively, allowing them to be grasped and separated from the bale 500, as will be described in more detail below. As the rotating cylinders transport the bale toward the sampling assembly 400, but before the bale 500 reaches the sampling assembly, the first gripper 402 is moved along the track 408 such that the sample bay 416 of the first gripper faces the first side 436 of the bale 500 (FIG. 21). The bale 500 is advanced along the first conveyor until the pre-cut section 438 of the first side 436 is generally aligned with the first gripper 402 (FIG. 22), the first gripper having its fingers 424 in the open position. Bales of fibrous material are generally uniform by design to facilitate shipment, storage and usage, and therefore, a cut sample will be located in substantially the same place on each bale. Using object detection sensors, or conveyor control, or other devices commonly used for positioning, the bale is stopped with the sample generally aligned with the relevant gripper. When the pre-cut section 438 is aligned with the first gripper 402, the second gripper 404 faces and is spaced from the second side 440 of the bale 50, With reference now to FIG. 24, the first gripper 402 is then advanced toward the first side 436 of the bale 500 such that the base wall 418 of the sample bay 416 abuts or is proximate to the pre-cut section 438. Simultaneously, the second gripper 404 is advanced toward the second side 440 of the bale 500 such that the base wall 418 of the sample bay 416 abuts the second side and acts as a "backstop," preventing lateral movement of the bale on the first conveyor. When both grippers 402, 404 are abutting the bale 500, the fingers 424 of the first gripper 402 are moved from the open position to the engaged position, thereby grasping and severing the fibrous material protruding from the pre-cut section 438, and trapping the material between the arcuate section 428 of the fingers 424 and the sample bay 416 to obtain a first sample 450. Subsequently, both grippers 402, 404 retreat from the bale 500, and the bale is advanced by the rotating cylinders until the pre-cut section 442 on the second side 440 of the bale is generally aligned with the second gripper 404. Similarly to the sample-taking process described above with respect to the first sample 450, both grippers 402, 404 are again advanced toward the bale 500, and the fingers 424 on the second gripper 404 are moved from the open position to an engaged position to obtain a second sample 452 between the arcuate section 428 and the base wall 418 of the sample bay 416 of the second gripper, as shown in FIG. 25. It is noted that the first gripper 402 remains in the engaged position while acting as a backstop for the second gripper 404 such that the first gripper retains the first sample 450. In another exemplary embodiment, a bale sampler is provided that is movable to be aligned with a stationary bale, rather than the bale being moved. It will be appreciated by one of ordinary skill in the art that such a sliding or index unit would pose no significant technical issues.

Figure 26:
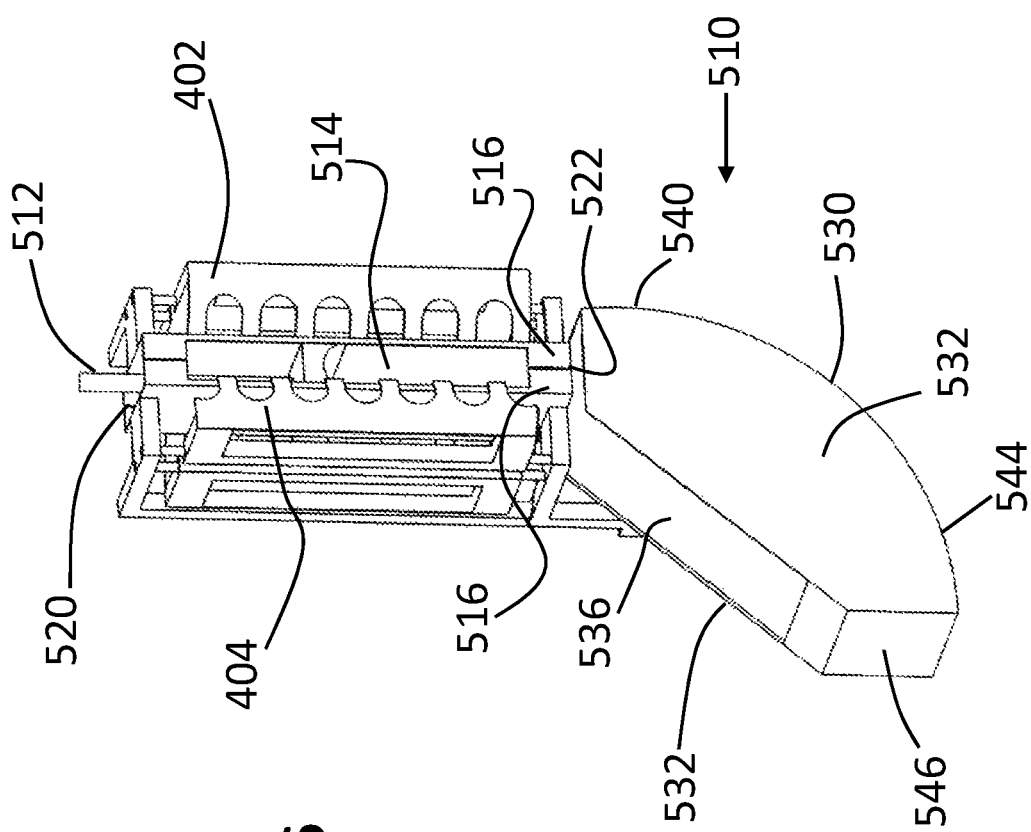
FIG. 26 is a side schematic perspective view of a collector bin for receiving a bale sample.

FIG. 26 shows a sample collector assembly 510. An ejection rod 512 having an ejection head at a distal end is adapted to slide through a channel 514 created by the sample bays 516 of the first and second grippers 402, 404 when the sample bays are abutting. As shown FIG. 26, the ejection rod 512 is configured to enter the channel 514 from a top opening 520 and push a bale sample out of a bottom opening 522 into a collector bin 510 from which the sample can be manually collected. In one exemplary embodiment, the collector bin 510 comprises an arcuate base wall 530 and two side walls 532 extending from the base wall 530 to form a generally U-shaped channel 536 into which the sample can drop into. The arcuate configuration of the wall 530 having a generally vertical section 540 near the bottom opening 522 and a generally horizontal section 544 distally from the vertical section allows the sample to slide down the base wall toward the horizontal section, where it can be easily collected. The collector bin 510 may comprise an end wall 546 extending between the side walls 532 and the base wall 530 and covering a portion of the channel 536 to prevent the sample from sliding out of the collector bin. One of ordinary skill in the art will appreciate that the collector bin 510 may also have other configurations, such as an angled base wall or a flat base wall, while remaining within the spirit and scope of present invention.

Although limited bagging assembly embodiments have been specifically described and illustrated, many modifications, combinations, and variations of the embodiments will be apparent to those skilled in the art. For example, the dimensions and positioning of the components within the housing may be modified to achieve their intended purpose. Further, although the bagging assembly is intended to run continuously and operate on multiple bags and/or bales simultaneously, the bagging assembly may operate on a single bag and bale and, to the extent possible, may prepare the bag to receive the bale and prepare the bale to be inserted into the bag sequentially rather than simultaneously. Accordingly, it is to be understood that the bagging assembly constructed according to principles of this invention may be embodied other than as specifically described herein. The invention is also defined in the following claims.

What is claimed is:

1. A bagging assembly for bagging a pressed bale comprising:
a frame having a first end, a second end, and a longitudinal length measured therebetween;
a chute having a receiving end, an outlet end, two spaced apart side sections defining a gap therebetween, and a longitudinal length aligned with the longitudinal length of the frame, said receiving end of the chute being sized and shaped to receive a pressed bale to be bagged;
a pusher plate with a rigid end surface that is movable to push a pressed bale into the receiving end of the chute, the pressed bale having a pre-cut section prior to being pushed by the pusher plate;
two or more fingers located upstream of the chute, said two or more fingers being sized and shaped and movable for separating the pre-cut section of the pressed bale from the pressed bale.

2. The bagging assembly of claim 1, further comprising at least one of movable rails, guides or tracks, said at least one of movable rails, guides or tracks being configured to move a pressed bale toward the chute.

3. The bagging assembly of claim 2, wherein an opening at the receiving end of the chute is larger than an opening at the outlet end.

4. The bagging assembly of claim 2, further comprising rotatable elements downstream of the chute, the rotatable elements being configured to move a bagged bale away from the chute.

5. The bagging assembly of claim 1, further comprising movable closing edges located downstream of the chute configured to close an open end of a bag material to enclose a pressed bale therein.

6. The bagging assembly of claim 1, wherein the chute is stationary and the pusher plate is movable relative to the stationary chute to stuff a pressed bale into the chute.

7. The bagging assembly of claim 1, wherein the two or more fingers are rotatable relative to a sample bay to grip a pre-cut section of a pressed bale to separate the pre-cut section from the pressed bale.

8. The bagging assembly of claim 1, further comprising a bale guide comprising a side surface configured to align a pressed bale before the pressed bale enters the chute.

9. The assembly of claim 1, wherein the two or more fingers comprise at least three fingers.

10. The assembly of claim 1, wherein the two or more fingers define a first set of fingers and further comprising a second set of fingers spaced from the first set of fingers.

11. An assembly for sampling and bagging a pressed bale comprising:
a frame having a first end, a second end, and a longitudinal length measured therebetween;
a chute having a receiving end, an outlet end, two spaced apart side sections defining a gap therebetween, and a longitudinal length extending between the receiving end and the outlet end and aligning with the longitudinal length of the frame structure such that the receiving end is closer to the first end than the second end of the frame and the outlet end is closer to the second end than the first end of the frame, the receiving end of the chute being sized and shaped to receive a pressed bale to be bagged;
a bale sampling device located upstream of the chute, the bale sampling device comprising at least one finger attached to a support that is configured to move the at least one finger against a pre-cut section of a pressed bale to separate the pre-cut section from the pressed bale;
a conveyor comprising rotating elements upstream of the chute configured to move a pressed bale for bagging; and
a pusher having a pusher plate with an end surface that is movable between the first end and the second end of the frame to push a pressed bale into the receiving end of the chute.

12. The assembly of claim 11, wherein the at least one finger comprises a set of fingers configured to move against a portion of a pressed bale to remove a pre-cut section of the pressed bale from the pressed bale.

13. The assembly of claim 12, further comprising a second set of fingers spaced from the first set of fingers and upstream of the chute, said second set of fingers configured to move against a portion of a pressed bale to remove a bale sample from the pressed bale.

14. The assembly of claim 13, further comprising rotatable elements downstream of the chute, said rotatable elements configured for moving a pressed bale away from the chute.

15. The assembly of claim 11, wherein the chute is positioned so that the longitudinal length of the chute is generally horizontal relative to a ground surface.

16. The assembly of claim 11, wherein the bale sampling device includes a sample bay positioned to abut a section of the bale from which pre-cut section of a pressed bale is to be removed.

17. The assembly of claim 11, further comprising a collector bin comprising a sidewall and a base wall with an opening for receiving a pre-cut section of a pressed bale after the pre-cut section is removed by the bale sampling device.

18. A method for bagging a pressed cotton bale using a bagging assembly comprising:
moving a pressed cotton bale comprising a lengthwise axis from a first position to a second position towards a chute mounted to a frame, the chute having a receiving end, an outlet end, two spaced apart sidewalls sized and shaped to receive the pressed cotton bale, and a lengthwise axis between the receiving end and the outlet end;
pushing the pressed cotton bale into the receiving end of the chute with the lengthwise axis of the pressed cotton bale aligned with the lengthwise axis of the chute, the pressed cotton bale having at least two straps, each with a center, placed around the pressed cotton bale such that the lengthwise axis of the pressed cotton bale passes through the centers of the at least two straps;
moving a surface of a sampling mechanism towards the pressed cotton bale to remove a first bale sample from the pressed cotton bale before the pressed cotton bale exits the chute; and
moving the pressed cotton bale away from the chute.

19. The method of claim 18, wherein the surface of the sampling mechanism is a first surface and the sampling mechanism further comprises a second surface, and wherein the first surface and the second surface are movable toward and away from one another.

20. The method of claim 18, wherein the sampling mechanism is a first set of sampling mechanism and further comprising a second set sampling mechanism, wherein said second set of sampling mechanism comprising a surface that is movable towards the pressed cotton bale to remove a second sample from the pressed cotton bale.

21. The method of claim 18, further comprising activating a pusher plate to push the pressed cotton bale into the receiving end of the chute.

22. The method of claim 18, wherein the pressed bale is moved away from the chute with rotatable elements.

23. The method of claim 22, wherein the pressed cotton bale is moved from the first position to the second position with at least one of movable rails, guides, or tracks.

24. The method of claim 18, further comprising folding at least two edges of the bag material over an end of the pressed cotton bale.

25. A method for bagging a pressed cotton bale using a bagging assembly comprising:
   moving a pressed cotton bale towards a chute mounted to a frame; wherein:
      the chute comprises a receiving end and an outlet end, a longitudinal length measured between the receiving end and the outlet end, and a width orthogonal to the longitudinal length;
      the pressed cotton bale comprises a top located above, elevation-wise, a bottom, a first side comprising a pre-cut section, and a second side;
   pushing the pressed cotton bale towards the chute using a push end of a pusher;
   actuating a mechanical sampler to move towards the first side of the pressed cotton bale and removing the pre-cut section from the pressed cotton bale, as a first bale sample, before the pressed cotton bale exits the chute.

26. The method of claim 25, wherein the mechanical sampler comprises a finger or an edge that contacts the pressed cotton bale to remove the section.

27. The method of claim 26, wherein the mechanical sampler is a first mechanical sampler, and further comprising actuating a second mechanical sampler towards the second side of the pressed cotton bale to remove a second bale sample from the pressed cotton bale.

28. The method of claim 26, further a sample bay comprising a surface having an edge and wherein the finger or the edge is movable across the edge of the sample bay to release the first sample.

29. The method of claim 28, further comprising folding two edges of a bag material having the pressed bale located therein.

30. The method of claim 28, further comprising moving the pressed cotton bale away from the chute using rotating elements after removal of the first sample.

* * * * *